US010696562B2

(12) United States Patent
Kronholm et al.

(10) Patent No.: US 10,696,562 B2
(45) Date of Patent: Jun. 30, 2020

(54) UPGRADE OF YTTRIUM IN A MIXED RARE EARTH STREAM USING IMINODIACETIC ACID FUNCTIONALIZED RESIN

(71) Applicant: Colorado School of Mines, Golden, CO (US)

(72) Inventors: Benjamin V. Kronholm, Las Vegas, NV (US); Corby G. Anderson, Golden, CO (US)

(*) Notice: Subject to any disclaimer, the term of this patent is extended or adjusted under 35 U.S.C. 154(b) by 440 days.

(21) Appl. No.: 14/562,430

(22) Filed: Dec. 5, 2014

(65) Prior Publication Data

US 2015/0158736 A1 Jun. 11, 2015

Related U.S. Application Data

(60) Provisional application No. 61/912,363, filed on Dec. 5, 2013.

(51) Int. Cl.
*C01F 17/00* (2020.01)
*B01D 15/38* (2006.01)
*B01D 15/36* (2006.01)

(52) U.S. Cl.
CPC .......... *C01F 17/00* (2013.01); *B01D 15/362* (2013.01); *B01D 15/3828* (2013.01)

(58) Field of Classification Search
CPC ................... C01F 17/00; C22B 59/00
See application file for complete search history.

(56) References Cited

U.S. PATENT DOCUMENTS

| 3,067,004 A * | 12/1962 | Vanderkooi | C01F 15/00 423/7 |
| 4,394,353 A | 7/1983 | Miyake et al. | |
| 4,599,175 A * | 7/1986 | Yamamizu | B01D 15/3828 210/635 |
| 2012/0245333 A1* | 9/2012 | Maisano | C07C 227/16 534/16 |

OTHER PUBLICATIONS

Gupta et al., "Extractive Metallurgy of Rare Earths," CRC Press LLC, 2005 (462 pages).

* cited by examiner

*Primary Examiner* — Melissa S Swain
(74) *Attorney, Agent, or Firm* — Dorsey & Whitney LLP

(57) ABSTRACT

Disclosed herein are methods, techniques, and processes for enhancing the purity of a mixed rare earth solution. In one embodiment the rare earth mixture may include Lanthanum, Cerium, Praseodymium, Neodymium, Promethium, Samarium, Europium, Gadolinium, Terbium, Dysprosium, Holmium, Erbium, Thulium, Ytterbium, Lutetium, Scandium, and/or Yttrium. In one embodiment, the resin is a chelating resin that interacts poorly with one or more rare earth elements. In one embodiment a rare earth is selectively excluded for example, Lanthanum (sometimes considered a transition metal), Cerium, Praseodymium, Neodymium, Promethium, Samarium, Europium, Gadolinium, Terbium, Dysprosium, Holmium, Erbium, Thulium, Ytterbium, Lutetium, Scandium, and/or Yttrium. In one embodiment, yttrium is selectively excluded from the column.

9 Claims, 17 Drawing Sheets
(16 of 17 Drawing Sheet(s) Filed in Color)

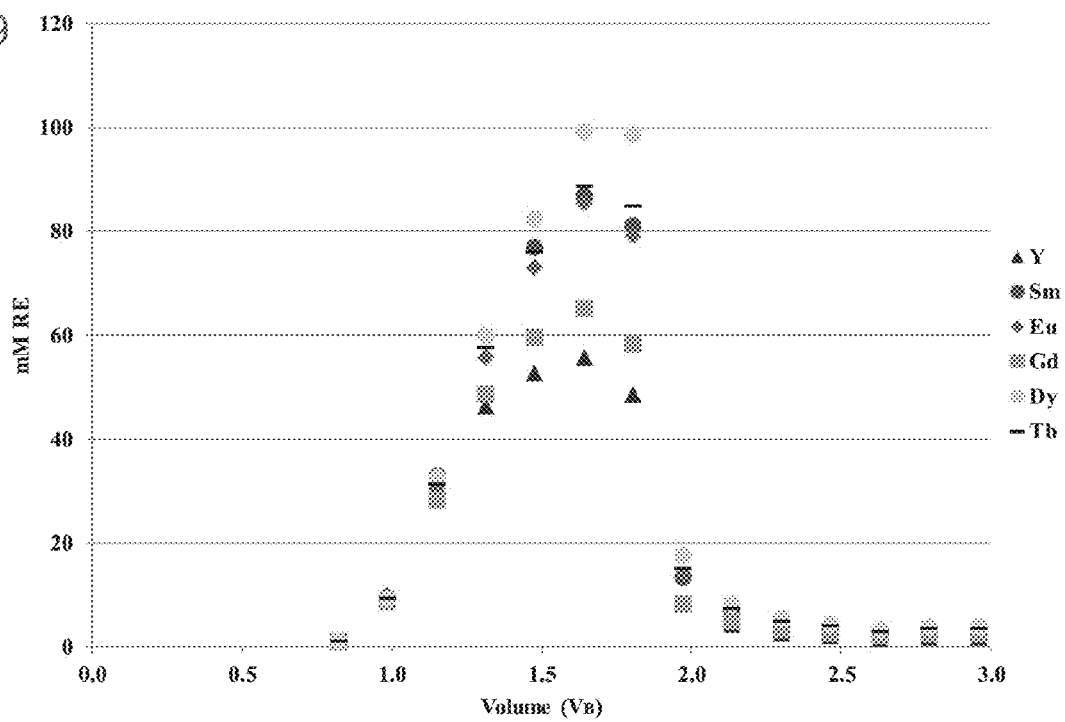
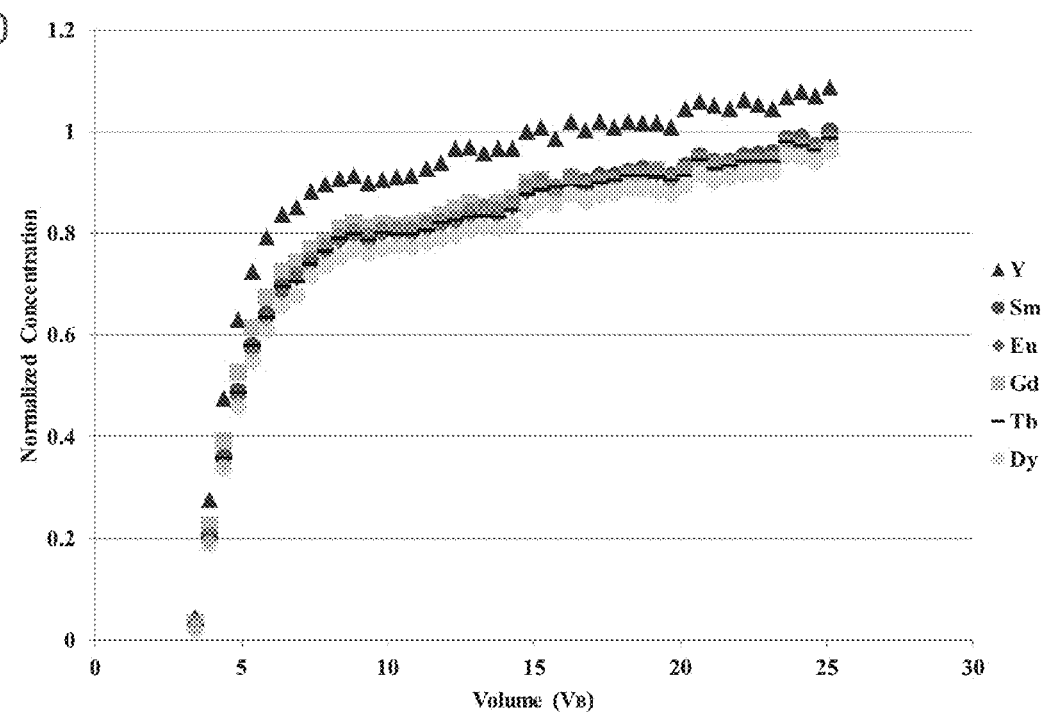

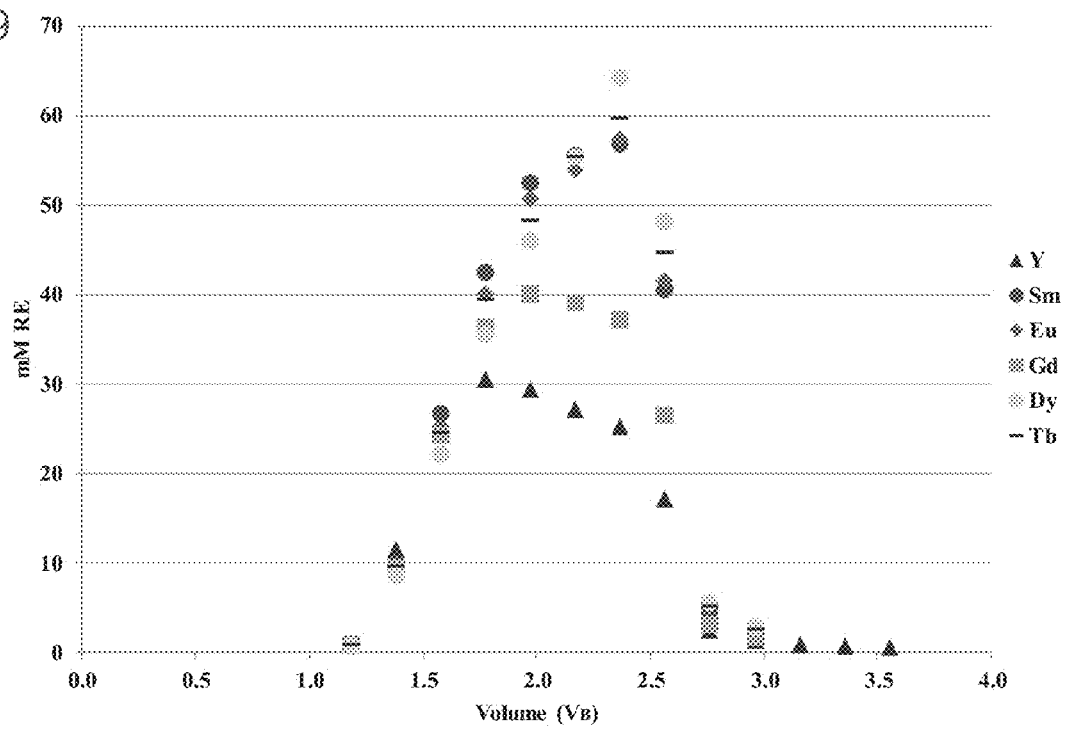

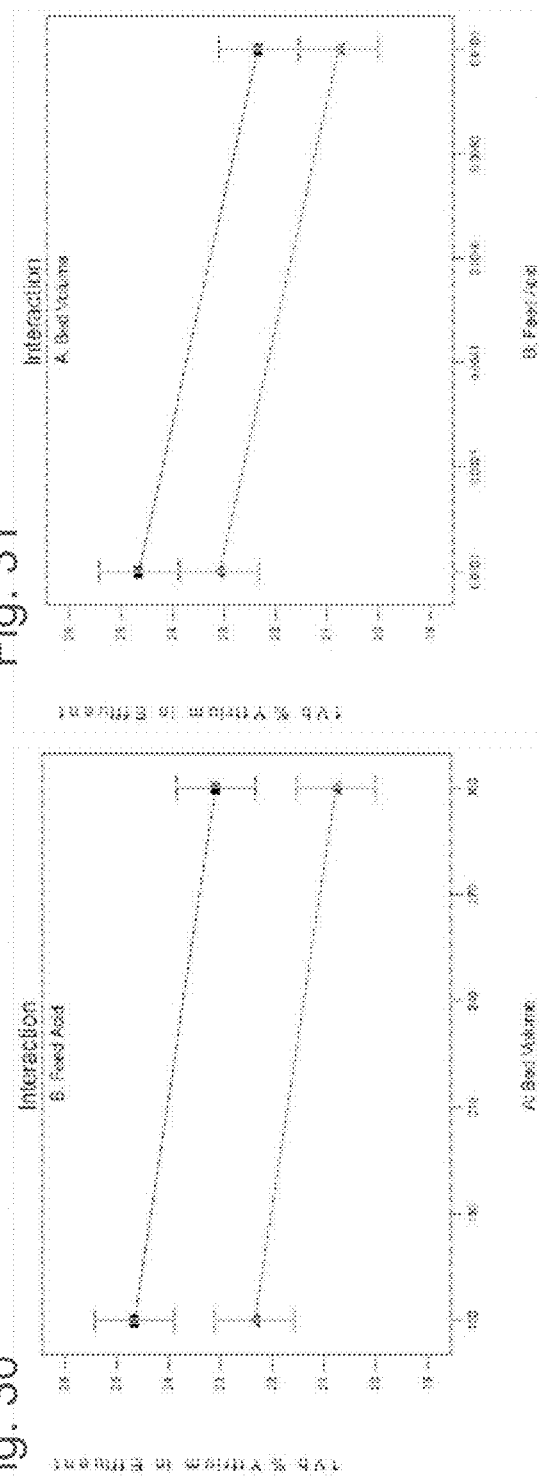
Fig. 31
Fig. 30
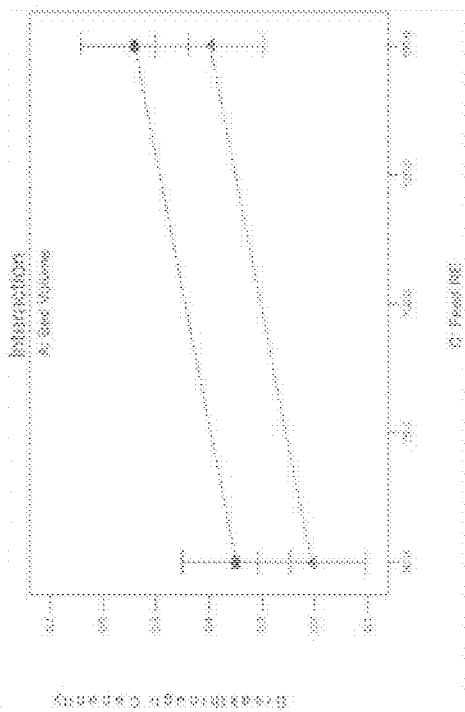
Fig. 33
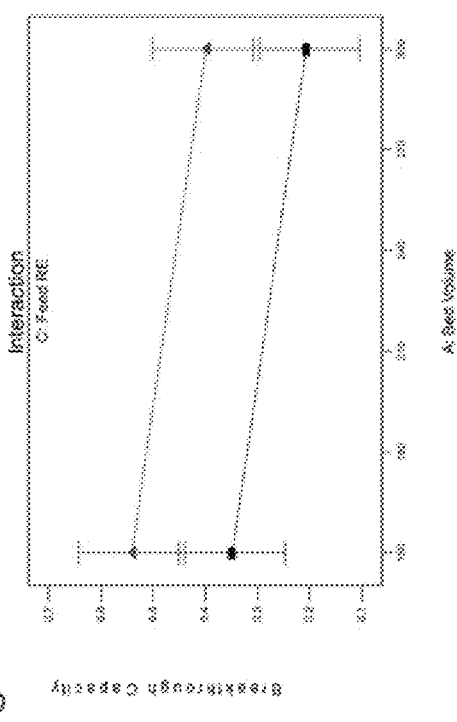
Fig. 32

UPGRADE OF YTTRIUM IN A MIXED RARE EARTH STREAM USING IMINODIACETIC ACID FUNCTIONALIZED RESIN

CROSS REFERENCE TO RELATED APPLICATIONS

This application claims the benefit of priority to U.S. Application No. 61/912,363, entitled "Upgrade of Yttrium in a Mixed Rare Earth Stream Using Iminodiacetic Acid Functionalized Resin," filed Dec. 5, 2013, the entire contents of which are hereby incorporated by reference.

FIELD

The presently claimed methods, processes, and compositions are directed to the purification and recovery of rare earths.

BACKGROUND

The rare earths are a group of 17 elements consisting of the lanthanide series as well as yttrium and scandium. One of the first rare earth mines to be commercially developed is located in Mountain Pass, Calif.; originally producing a concentrate for misch-metal and europium for color televisions. After several decades dominating the market the mine began facing competition from rare earth sources located in China, most notably mines located near Baotou. Falling prices and environmental issues led to the cessation of mining operations at Mt. Pass in 1996. More recently, amid increased demand, mining operations are scheduled to be restarted, along with an advanced processing facility producing up to 40,000 tonnes of product on a rare earth oxide (REO) basis per year. As the mine, now owned by Molycorp Inc., strives to be the low cost producer an emphasis has been placed on improving past mineral and chemical processing techniques. Though the mine will primarily produce light rare earths (defined in this context as lanthanum, cerium, praseodymium and neodymium) close to 1% of REO in the mined ore will be in the form of Sm—Lu, Y. Most modern processing facilities utilize solvent extraction to separate the chemically similar rare earth elements from one another (1). This is due to the continuous nature of solvent extraction as well as advances in extractants which have led to more efficient separations. For separations on a large scale solvent extraction has proven to be an efficient process though a case can be made for separation by ion-exchange if a lower throughput is required, as is the case with the "heavies" being produced by Molycorp. Ion-exchange offers the benefits of a smaller plant footprint, the potential for lower power requirements and a more flexible flow-sheet given skid mounted columns and ease of reconfiguration.

Separation of rare earths through ion-exchange is not a novel concept; in fact it was developed prior to solvent extraction and was the first technique to be used on a large scale. The use of column chromatography using selective eluents was first reported by Frank Spedding, working at Ames Laboratory (2). However prior attempts to purify rare earths using this method suffered significant problems, for example drawbacks of this process were the complexity of its operation and the time required to process solutions. Bands of rare earths move slowly through the columns and rare earth mixtures can require months to elute through the column height required to achieve desired purity.

SUMMARY

Disclosed herein are methods, techniques, and processes for enhancing the purity of one or more rare earth elements from a mixture of rare earth elements. In one embodiment the rare earth mixture may include lanthanum, cerium, praseodymium, neodymium, promethium, samarium, europium, gadolinium, terbium, dysprosium, holmium, erbium, thulium, ytterbium, lutetium, scandium, and/or yttrium. In one embodiment, the resin is a chelating resin that interacts poorly with one or more rare earth elements. In one embodiment the purity of lanthanum, cerium, praseodymium, neodymium, promethium, samarium, europium, gadolinium, terbium, dysprosium, holmium, erbium, thulium, ytterbium, lutetium, scandium, and/or yttrium is enhanced. In one embodiment, yttrium is purified from the mixture by selective exclusion from the resin.

Disclosed herein are methods, techniques and processes for the use of ion-exchange and/or chelating resins as a rare earth separation technique. The present disclosure evaluates developments in technology over the half century since solvent extraction has become a favored method of separation. In one embodiment, the use of chelating resin, specifically iminodiacetic acid functionalized resin, is used in the upgrade and purification of yttrium in a mixed heavy rare earth chloride solution.

Commercially available chelating ion-exchange resins were applied to the separation of a mixture of heavy rare earths. This research was performed to further the understanding of lanthanide separations and improve upon current separation techniques. Separation coefficients of several rare earths were calculated based on their degree of adsorption in batch isotherm experiments. Yttrium showed particularly high separation coefficients compared to Sm, Eu, Gd, Tb and Dy which made up the balance of the mixture studied. Initial column experiments identified resin having iminodiacetic acid functionality as the most promising resin for yttrium upgrade. In the treatment of heavy rare earth feed from a known process stream, yttrium was found to behave similarly to non-ionic components in ion-exclusion chromatography. This resin failed to separate the rare earth mixture used when elution chromatography was attempted. Further experiments were conducted to determine conditions which optimize ion-exclusion behavior. Analysis of variance was utilized to determine significant response across the conditions considered. It was found that conditions conducive to increased absorption kinetics favored yttrium upgrade.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 19 depicts an Amberlite IRC748I desorption curve (column 3, 2 m hcl, 0.03 vb/min)

FIG. 20 depicts an Na+ Amberlite IRC748I breakthrough curve; column 4 (50 mm rare earth, 150 cm$^3$ resin, pH 2, 0.03 vb/min, 30° C.).

FIG. 29 Amberlite IRC748I desorption curve (column 8, 2 m hcl, 0.03 vb/min)

FIG. 30 depicts a one bed volume yttrium upgrade feed acid interaction.

FIG. 31 depicts a one bed volume yttrium upgrade bed volume interaction.

FIG. 32 depicts a breakthrough capacity feed acid interaction.

FIG. 33 depicts a breakthrough capacity bed volume interaction.

DETAILED DESCRIPTION

Figure 1:
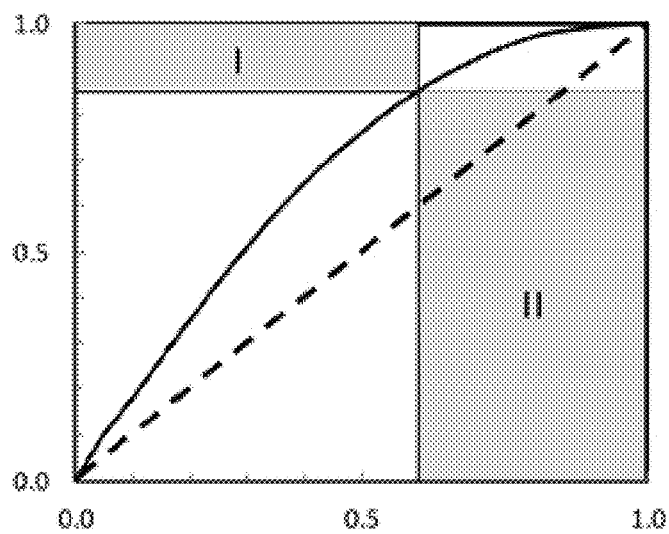
FIG. 1 depicts an ion-exchange isotherm and separation factor diagram

This section is divided into two sub-sections; the first will provide an overview of lanthanide mineralogy and uses of heavy lanthanides. The second will be a brief description of lanthanide separations.

1.1 Heavy Lanthanide Mineralogy and Uses

The rare earths (RE), including the previously mentioned "heavy" rare earths, have useful materials properties primarily arising from their f-orbital chemistry and oxide stability (1). The heavy elements find uses in phosphors, magnets, ceramics, specialty alloys and electronics.

Following the use of light rare earths in misch-metal lighter flints and thorium in lamp mantles, one of the first commercial uses of lanthanides was that of europium in red phosphors for color televisions. The rare earths have unique optical emission properties due to the presence of f-orbital electrons. These electrons are very well shielded and participate very little in bonding, this results in little effect on little effect from the surrounding environment on the energy of f-f transitions (3). Several resulting emission spectra are confined to narrow bands of the visible spectrum and thus suited for emission of specific colors. Two prevalent rare earth phosphors are $Y_2O_3{:}Eu^{3+}$ (611 nm) and $(Ce,Tb)MgAl_{11}O_8$ (546 nm). Yttrium is also paired with neodymium in the production of Nd:YAG or neodymium doped yttrium aluminum garnet lasers. These powerful solid state lasers are used in manufacturing, medical care and spectroscopy. Much like the $Y_2O_3{:}Eu^{3+}$ phosphor a small amount neodymium replaces yttrium in within a crystal structure and emits a specific wavelength when excited by an external source. Similar lasers using erbium and holmium have also been developed to generate lasers at alternate wavelengths (1).

Another driving force in the rare earth market is their use in powerful permanent magnets, first $SmCo_5$ followed by Nd—Fe—B. Samarium cobalt magnets are five to ten times more powerful than ferrite and alnico magnets and Nd—Fe—B magnets are close to three times more powerful than $SmCo_5$ (1). Rare earth elements contain f-orbitals which can have up to seven unpaired electrons, this coupled with the geometry of the rare earth-transition metal alloy results in a large magnetic moment and strong magnetic field. As neodymium is more abundant than samarium, iron is more abundant than cobalt and the neodymium magnets are more powerful, the light rare earth magnets have become favored over $SmCo_5$. There are some applications which still favor the use of the heavy RE magnets, most notably high temperature applications. The Curie temperature, the temperature at which a permanent magnet is demagnetized, is 700° C. in samarium cobalt as opposed to 350° C. in neodymium iron boron. Heavy REs, specifically dysprosium, can be used as dopants to Nd—Fe—B to increase the Curie temperature (4). Dysprosium addition also has an effect on the reversible temperature coefficient which describes how a magnets field strength is affected by changing temperatures. It has been shown that a $(Nd_{0.4}Dy_{0.6})(Fe_{0.7}Co_{0.3})_{78}B_6$ alloy has a reversible temperature coefficient of zero which can be advantageous in applications that require constant magnetic fields. Dysprosium has also been shown to increase the anisotropy of an Nd—Fe—B magnet which in turn increases the coercivity or resistance to demagnetization (5).

The stability of $RE_2O_3$ results in difficulties producing their metals but contributes to their utility in ceramic materials. Rare earth oxides have been used to stabilize the crystal structures of zirconia and alumina. Most notably the addition of $Y_2O_3$ to $ZrO_2$ has shown to prevent phase transformations of the zirconia crystal structure and result in stability over a range of temperatures; addition has also improved zirconia's bending strength and toughness (6). $Y_2O_3$ has also been used as a refractory material due to its thermal stability. Aside from the use of yttria, little use of heavy RE in ceramic materials is seen. Rare earth containing ceramics primarily use lanthanum and cerium (1).

Heavy REs have also found use in alloys of steel, magnesium, superalloys and magnetostrictive materials (1). Light rare earths, primarily cerium, are added to steel to improve the mechanical properties and lower the sulfur content through the formation of rare earth sulfides and sulfates. Addition of yttrium to alloys of magnesium has been shown to improve corrosion resistance, strength and workability. Similarly yttrium has been used in superalloys to improve corrosion resistance, once again taking advantage of the stability of the oxides of rare earths. A unique application of the heavy rare earths terbium and dysprosium is the production of Terfenol-D, an alloy whose shape changes depending on the applied magnetic field. This material has applications in the manufacture of high energy, fast response sensors and actuators (7).

There is a cliché that the rare earths themselves are not actually rare but quite abundant. This is generally true, aside from promethium which is not found in nature. Table 2.1 gives the abundance of the lanthanides in the earth's crust (8). To put this in perspective some elements that are thought of as common exist at similar levels or lower levels: Ni (70 parts per million [ppm]), Zn (60 ppm), Cu (55 ppm), Sn (3 ppm), Pb (20 ppm) and Hg (0.1 ppm) (1).

TABLE 2.1

Natural Abundance of Rare Earths

| Element | Concentration in Earth's Crust (ppm) |
| --- | --- |
| Lanthanum (La) | 50 |
| Cerium (Ce) | 83 |
| Praseodymium (Pr) | 13 |
| Neodymium (Nd) | 44 |
| Promethium (Pm) | NA |
| Samarium (Sm) | '7.7 |
| Europium (Eu) | 2.2 |
| Gadolinium (Gd) | 6.3 |
| Terbium (Tb) | 1.0 |
| Dysprosium (Dy) | 8.5 |
| Holmium (Ho) | 1.6 |
| Erbium (Er) | 3.6 |
| Thulium (Tm) | 0.5 |
| Ytterbium (Yb) | 3.4 |
| Lutetium (Lu) | 0.8 |

Though this is the average abundance, depending on the mineralization of a deposit the ratio of RE's can change. The most common rare earth containing minerals are phosphates (monazite, xenotime, ningyoite, florencite and rhabdophane) followed by carbonates (bastnasite, synchysite, lanthanite and parasite). It has been observed that light rare earths, with coordination numbers of 8-10, concentrate in carbonates and phosphates; while heavies, with coordination numbers of 6-8, concentrate in phosphates and oxides (8). The Mountain Pass deposit is a carbonatite deposit containing primarily bastnasite, a flourocarbonate mineral whose RE distribution is shown in Table 2.2 (1).

TABLE 2.2

Abundance of Rare Earths in Bastnasite

| Element | Mountain Pass Bastnasite (w.r.t 100% REO) |
| --- | --- |
| Lanthanum (La) | 33.200 |
| Cerium (Ce) | 49.100 |
| Praseodymium (Pr) | 4.3400 |
| Neodymium (Nd) | 12.000 |
| Promethium (Pm) | N/A |
| Samarium (Sm) | 0.7890 |
| Europium (Eu) | 0.1180 |
| Gadolinium (Gd) | 0.1660 |
| Terbium (Tb) | 0.0159 |
| Dysprosium (Dy) | 0.0312 |
| Holmium (Ho) | 0.0051 |
| Erbium (Er) | 0.0035 |
| Thulium (Tm) | 0.0009 |
| Ytterbium (Yb) | 0.0006 |
| Lutetium (Lu) | 0.0001 |
| Yttrium (Y) | 0.0913 |

1.2 Lanthanide Separations

As discussed, the rare earths are relatively abundant, the "rare" originates from the difficulty in isolating individual lanthanide elements. Chemically the rare earth elements are very similar, most exist solely in the 3+ oxidation state with the exceptions of Ce(IV), Pr(IV), Tb(IV), Sm(II), Eu(II) and Yb(II) (1). Of the elements with multiple oxidations states Ce(IV) and Eu/Sm/Yb(II) have low enough redox potential to exist in aqueous solution without decomposing water. Separation based on selective oxidation/reduction followed by precipitation has been implemented in the production of cerium and europium. Rare earths exhibit little difference from one another in covalent bonding as they are f-block elements; f-orbitals fall within the 4d, 5s and 5p orbitals and are therefore largely unreactive (9). The primary difference between the lanthanides that can be exploited for their separation is the lanthanide contraction.

The lanthanide contraction relates primarily to the poor shielding of nuclear charge by the f-orbitals. One must consider shielding when thinking about an atom with more than one electron. When more than one electron is present in an atom, electrons are not only affected by the charge of the nucleus but also the charge of other electrons. In the case of helium one could imagine a moment in the electron cloud where both electrons in the 1s orbital and the nucleus form a line. In this instant, the electron between the outer electron and the nucleus would be shielding the outer electron from the charge of the nucleus. A well shielded electron would not feel as much "pull" from the charge of the nucleus and would be expected to be able to be found farther from the nucleus. How well electrons from a molecular orbital can shield other electrons depends on how close they can get to the nucleus or their "penetration". An orbital that keeps electrons highly concentrated at the nucleus will shield electrons more effectively. The electrons in f-orbitals provide poor shielding to higher orbitals even though looking at graphical representations of probability functions it can be seen that as one goes from s→p→d→f, much of the f-orbitals fall within the orbitals that make up the Xe core (9). As the f-block molecular orbitals of lanthanides are filled, each additional electron is poorly shielded from the nucleus by any preceding f electrons. The addition of f electrons also incompletely shields existing s, p, and d electrons. As a result of this incomplete shielding there is an overall increase in the effective nuclear charge felt by the electrons and a decrease in radius across the period of the lanthanides. This size difference results in differing formation constants for complexes as one moves across the lanthanide series and is the primary difference exploited in their separation.

The first separations of trivalent rare earths were accomplished using fractional crystallization techniques. Exploiting differing solubility of rare earth nitrate, bromate and sulfate complexes rare earths could be isolated after much iteration of crystallization, decantation and washing. This process was used on an industrial scale to purify lanthanum, gadolinium, terbium and dysprosium (1). It was more difficult as one moved from left to right in the lanthanide series, according to Gupta the fractional crystallization of thulium as a bromate salt was still impure after thousands of recrystallizations.

Ion exchange (IX) separations were the next techniques employed in RE separations and were the dominant commercial process in the 50's and 60's (1). Ion exchange consists of an exchange of ions from solution to a solid phase or resin. These separations will be discussed at length in the following sections as well as several underlying fundamentals of ion exchange as reviewed in the work of Helfferich (10).

Solvent extraction (SX) is currently the preferred separation method in large quantities due to its continuous nature and the development of efficient phosphoric acid based extractants. Similar to ion exchange solvent extraction involves a selective transfer of a metal ion between two phases. Instead of a liquid-solid transfer solvent extraction is a transfer between two immiscible liquid phases. An aqueous phase containing RE is mixed with an organic phase containing phosphoric acid ligands. Certain rare earths are selectively transferred to the organic phase and the phases are allowed to separate. The identity of the extracted rare earth is controlled by the activity of H$^+$. Higher H$^+$ activity results in a cut point further to the right on the periodic table. This process is repeated many times and the resulting aqueous stream, or "raffinate", contains light RE and the organic stream, or "pregnate", contains heavy RE. The pregnate is contacted with high H$^+$ concentration aqueous solution and the RE transfers back to the aqueous phase. The resulting stripped organic is recycled to the front of the circuit to extract more RE. A single solvent extraction circuit can make one "cut" in the lanthanide series and this cut point is determined by controlling pH. There are four primary methods of solvent extraction: anion exchange, cation exchange, solvation and chelation. Rare earth SX primarily uses a phosphoric acid based extractant which operates using a cation exchange method. Generally pure extractants are not used; instead they are mixed with diluents. The reason for this is the high cost and poor physical properties of most extractants. Many extractants are viscous and do not easily separate from an aqueous phase. Extractants can also be much more water soluble without addition of diluent, this results in losses to raffinate and strip solutions if diluents are not used. Diluents are long chain organics: aliphatic, aromatic or naphthenic. Kerosene, an aliphatic compound with a carbon chain of $C_6$-$C_{16}$, is used as a diluent at Mountain Pass.

Solvent extraction and the efficacy of separation can be described mathematically by assigning values to the degree that a component is extracted from one phase to the other. In solvent extraction of rare earths the cation exchange equilibrium can be described with the following equation.

$$3(HX)_2 + RE^{3+} \leftrightarrow (HX)_3X_3RE + 3H^+ \quad \text{Eq. 2.1}$$

HX represents the acidic form of the cation exchanger used in the solvent extraction of rare earths, as stated earlier these tend to be phosphoric acid. These exist as dimers which are represented as (HX)2 in Eq. 2.1. Three of these dimeric complexes are required to extract one trivalent rare earth from aqueous solution. This has been confirmed by loading experiments performed at Molycorp as well as results discussed in literature (11). A value of the degree of extraction can be determined and described by the following equation.

$$K = \frac{[(HX)_3X_3RE]_o}{[RE^{3+}]_a} \quad \text{Eq. 2.2}$$

This ratio has the concentration of rare earth in the organic phase in the numerator and concentration of rare earth in the aqueous phase in the denominator. The variable K is referred to as the distribution coefficient and a large value of K represents a scenario where the majority of rare earth in solution resides in the organic phase. The distribution coefficient can be plotted $$\beta = \frac{K_{Heavy\ RE}}{K_{Light\ RE}} \quad \text{Eq. 2.3}$$

against acid concentration to give a graphical representation of the extractability of rare earths in by an extractant. Given a multicomponent system, one containing more than one REE, a relationship between the extraction coefficients of REEs can be described using the following equation.

β, often referred to as a beta factor, offers a quantification of selectivity that the extractant has for one element over another. The ratio of distribution coefficients between two cations at a given acidity is calculated. The distribution coefficient of the heavier rare earth is placed in the numerator and the K value for the lighter element in the denominator; this results in β>1 if separation is possible and a beta factor of unity if there is no selectivity. Beta factors from 1-12 are expected for RE pairs using 2-ethylhexyl phosphonic acid (PC88A), in comparison the same extractant has a beta factor close to 100 when used to separate nickel and cobalt (12). This difference exemplifies the difficulties faced when purifying solutions of rare earths.

Ion Exchange

The ion exchange section reviews existing ion exchange techniques. This will be split into two sections; the first section will briefly discuss the fundamentals of ion exchange. The second section will discuss the current state of literature involving rare earth separations using ion exchange. This will be split into three subcategories; use of a chelating eluent, functionalized resin and resin supported extractants.

1.3 Ion Exchange Fundamentals

Ion exchange is the process by which a resin or other stationary phase with attached, charged functional groups (co-ions) and oppositely charged molecules (counter-ions) exchanges these counter-ions for similarly charged ions in an electrolyte solution. The control of this exchange reaction is at the heart of any ion-exchange process. The principles and practice of ion-exchange have been thoroughly reviewed by Friedrich Helfferich (10). There are several key factors which are important to the application of ion exchange to separation and purification of rare earths. The first factor to be addressed will be the equilibrium reactions involved in ion exchange. The second will be the parameters that determine and affect the rate of exchange. The final factor to be discussed will be selective adsorption and chromatographic separation to achieve separation.

1.3.1 Ion Exchange Equilibria $$\overline{A} + B \leftrightarrow \overline{B} + A \qquad \text{Eq. 3.1}$$

The aforementioned exchange reaction can be described by the following equation.

An ion bound to the resin is represented with a bar and one in the electrolyte without. When a resin or support structure with A as the counter-ion is added to an electrolyte solution containing B, A is exchanged for B until at equilibrium the ion exchanger and solution contain both A and B. This is a reversible exchange and the resulting equilibrium conditions are identical regardless of the starting form of the resin, i.e. equilibrium will be the same if a resin in the A form is added to an electrolyte containing B or a resin in the B form is added to an electrolyte containing A. The rare exception to this is a resin which forms a metastable complex with respect to thermodynamic equilibrium; in this case the direction that equilibrium is approached from can affect the final equilibrium (10). Much like the solvent extraction equilibria, that of ion-exchange can be described by several key concepts: the ion exchange isotherm, distribution coefficient and separation factor.

An example of an ion-exchange isotherm is presented in FIG. 1, wherein the equivalent ionic fraction of a component in solution is plotted against the equivalent ionic fraction of the same component on the resin. The equivalent ionic fraction of the component as it exists in an electrolyte is defined by the following equation.

$$x_A \equiv \frac{z_A m_A}{z_A m_A + z_B m_B} \qquad \text{Eq. 3.2}$$

This can be simplified to the following equation, which applies to electrolytes of any number of components.

$$x_A \equiv \frac{z_A m_A}{\sum z_i m_i} \qquad \text{Eq. 3.3}$$

Given components of equivalent valence, in this context the trivalent rare earths, it could prove convenient to remove the ion charge term from this equation. In this case equivalent ionic fraction would be identical to mole fraction. In the case where there is no selectivity between the ions in the system the isotherm would be expected to be linear as represented by the dashed line in the figure. In practice this is not observed and the isotherm is represented by a curved line (10). If the ion assigned to A in FIG. 1 is preferred by the resin, the isotherm will be a convex curve and appear above the line with a slope of unity. If some other ion in the system is more favorably sorbed by the resin than A the isotherm will be a concave curve and fall below the diagonal. The termini of the isotherm must lie at the origin and top right corner of the plot. This is due to an equivalent ionic fraction of zero on the resin requiring the complete absence of component A. The terminus at 1.1 represents an equivalent ionic fraction of unity on the resin, requiring the complete absence of any other component this results in the equivalent ionic fraction in the electrolyte to be unity as well.

The partition of a species between the resin and electrolyte can also be described using a distribution coefficient. The distribution coefficient is described by the following equation.

$$\lambda' \equiv \frac{\overline{C_i}}{C_i} = \frac{\overline{x_i} \overline{C}}{x_i C} \qquad \text{Eq. 3.4}$$

This value is concentration dependent and as such appropriate considerations mu be taken when using this value to compare the affinity of different counter-ions to a specific resin. The distribution coefficient will increase with a decrease in concentration though given electrolytes of constant concentration these values can be used to determine the preference of an ion-exchanger to a counter-ion. This preference is quantified as a separation factor which is defined by the following equation.

$$\alpha_B^A \equiv \frac{\overline{m_A} m_B}{\overline{m_B} m_A} = \frac{\overline{C_A} C_B}{\overline{C_B} C_A} = \frac{\overline{x_A} x_B}{\overline{x_B} x_A} = \frac{\lambda'_A}{\lambda'_B} \qquad \text{Eq. 3.5}$$

This value is similar to the previously discussed separation factor used to predict solvent extraction performance. It can be used to predict column performance and compare the separation performance of different resins. The factor is unitless and as such not affected by choice of units as long as they are consistent throughout the calculation. The separation factor is not constant and is affected by the overall concentration of the electrolyte or resin, temperature and the equivalent fraction of the counter-ion being compared. Because of this, if comparisons between resins and counter-ions are to be made, care must be taken to perform experiments under controlled conditions (10).

1.3.2 Fundamentals of Separation

The use of ion-exchangers to separate and purify components in solution arises from the differences in selectivity in counter-ions. These differences in selectivity arise from differences in ionic valences, ionic solvation and specific interactions between the ion exchanger and counter-ions (10).

The valence of the counter-ion affects the preference of the ion-exchanger, as a rule the ion-exchanger prefers a counter-ion of higher valence. This preference is increased with increased dilution of the electrolyte. This preference is generally referred to as electro-selectivity and is reflected by the separation factor. As an example, given equivalent amounts of NaCl and $CaC_2$, the theoretical separation factor of between $Ca^{2+}$ and $Na^+$ on a cation exchanger containing 8 milli-equivalents per milliliter would be 40 (10). This means that the concentration of $Ca^{2+}$ and $Na^+$ on the resin would be at a 40:1 ratio. The use of ion exchange to soften water is a prime example of exploiting this phenomenon.

Another factor that affects the selectivity of an ion-exchanger is the size of the counter-ions and the corresponding swelling pressure of the ion-exchanger. It has been observed that the larger the solvated volume of the counter-ion, the more swelling pressure occurs in the ion exchange resin occurs after the exchange takes place. The resin is an elastic matrix made up of polymer chains and has the tendency to contract when stretched; a rubber band would be the obvious analogy. This tendency to contract leads smaller counter-ions to be favored over large ones as smaller counter-ions lead to a more relaxed ion-exchanger matrix. Increasing the strain in the resin matrix will increase selectivity; therefore increasing crosslinking has been shown to increase separation factors. Though separation factors are highest in highly cross-linked resins, capacities can be dramatically reduced as crosslinking increases forcing a compromise between the benefits of increased selectivity and drawbacks of decreasing capacity.

Selectivity can also be influenced by specific interactions between the ion-exchanger and counter-ion (10). An ion-exchanger will favor the counter-ion which forms the most stable ion-pair or bond with its co-ion functionality. An example of this is the use of resin with dipicrylamine functionality as selective potassium sorbent. Dipicrylamine is known to form a sparingly soluble salt with potassium while its salts of sodium, calcium and magnesium are soluble. This principle has also been exploited by using chelating resins to achieve selectivity among transition metals. Properties exhibited in complex formation in solution can be applied to ion-exchange if resins can be made with the appropriate functionality.

There are several modes of column operation that can be used to employ the previously discussed causes of selectivity (10). Columns can be operated conventionally by either ion displacement, ion retardation or selective displacement. Columns can also be operated chromatographically which is slightly more complex; chromatographic separations can be achieved through displacement development, elution development, or frontal analysis.

Conventional operation in involves exchanging counter-ions in solution for those on the ion-exchanger. A solution containing an ion B are flowed through a column containing an ion-exchanger containing an ion A, B replaces A and the solution flowing out of the column contains only A. The flow is stopped on detection of B in the column effluent and the column can be stripped of B and regenerated with A. Given a mixture of two components in solution, these components can be separated in several ways using conventional column operation.

The first of these methods is ion-exclusion (13). In this procedure a non-ionic solute is separated from an ionic one by selective adsorption of the non-ionic component. According to the Donnan principle the concentration of a counter-ion in solution is higher than that in an ion-exchanger. The driving force in a column is to exclude the counter-ions from an ion-exchanger. Given a solution of a non-ionic component and an ionic component with a counter-ion identical to that of the ion-exchanger's counter-ion, the non-ionic component will be better able to exist in the ion-exchanger. If this mixture is added to a column and then eluted, the ionic component will exit the column first, followed by the non-ionic component. This has been utilized in the separation of ionic salts from glycol in sugar production.

A similar technique is named ion retardation (10). Ion retardation employs a polyelectrolyte exchanger which includes anionic and cationic functional groups in a single ion-exchanger. This type of ion-exchanger favors sorption of ionic groups over non-ionic. This results in a reversed elution profile compared to ion-exclusion, the non-ionic components appear first in the effluent followed by ionic components.

Separation of two or more ions in an electrolyte solution can also be achieved through selective displacement (10). Selective displacement requires a large difference in the affinity of the ions to be separated for the ion-exchanger. An example of this technique would be a mixture of counter-ions B and C which have a large difference in affinity for a given ion-exchanger, C being the most readily sorbed. The ion exchanger would be in the A form, A having an intermediate affinity for the ion-exchanger. The mixture would be loaded until breakthrough of C and then eluted with a solution of A. A would exchange preferentially for B, excluding it from the column. C could then be eluted from the column using a complexing agent with affinity for C. This technique has been shown effective in separation of a number of pairs of bivalent cations.

Column chromatography differs from conventional column operation in that the solution to be separated or purified is first introduced to a small fraction of the overall ion exchanger and then eluted through the remaining ion-exchange bed using a suitable eluent. The mixture separates into distinct bands due to differences in migration rates through the ion-exchanger and if executed properly, the components appear as distinct peaks in the effluent. There are three primary techniques used to perform column chromatography; these are: elution development, displacement development and frontal analysis (10).

Elution development chromatography uses an eluent which has less affinity toward an ion-exchanger than the components to be separated. Once a solution containing the mixture has been added to the top of a column the eluent is flowed and almost immediately overruns the mixture. The mixture migrates through the column slowly and the components of the mixture move at different rates, separating as they travel the length of the column. The boundary between the eluent and mixture is non-sharpening; meaning that as the mixture migrates through the column, the amount of resin that it occupies expands (10). This can result in wide and shallow elution peaks depending on the conditions used. This technique is often employed in quantitative analysis and is analogous to gas chromatography.

Figure 2:
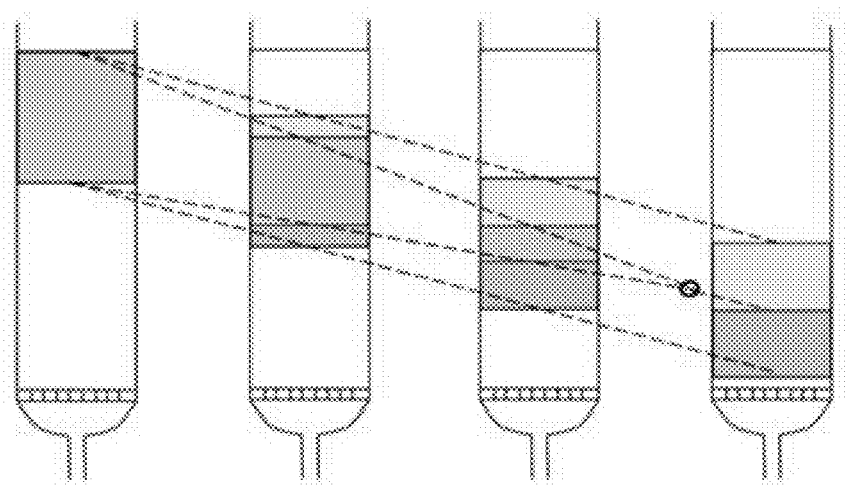
FIG. 2 depicts an displacement chromatography in a two component system

Displacement development differs from elution development in that it uses an eluent with greater affinity to the ion-exchanger than the components of the mixture being separated (10). This results in the eluent not outpacing the mixture and self-sharpening boundaries forming between components in the mixture. The initial band height of the mixture added to the column remains constant throughout elution and the components of the mixture appear in the effluent in decreasing order of the components affinity toward the ion-exchanger. In practice, complete peak resolution is not possible as there is no gap generated between bands as they move through the column; their movement is only different relative to the band representing the bulk of the mixture, as seen in the following figure. FIG. 2 is a graphical representation of displacement chromatography phenomena.

Small amounts of bi-component mixtures are generated between each peak and must be discarded or recycled in practice. However, due to peak sharpening the concentration of components in the effluent are higher compared to elution development and the column and eluent requirements are lower. These factors lead displacement development to be favored in preparative, large scale chromatography including rare earths which will be discussed at length in the following section.

Frontal analysis chromatography represents a process more closely related to conventional ion-exchange techniques. The mixture to be separated is continuously fed to a column instead of being added in a small portion and then eluted using a separate solution (10). The result of this is an effluent which initially contains a purified portion of the component least favored by the ion-exchanger followed by a mixture of the components found in the influent. Typically, few or one component can be separated from the mixture, with the advantage being ease of operation. The boundaries of the leading band of pure component and the following mixed bands are self-sharpening. Due to the limitations in component resolution frontal analysis finds little use in analytical or preparative methods.

1.3.3 Ion Exchange Kinetics

The rate of exchange in ion-exchange is governed by three primary factors: diffusion of ions at the interface of the ion-exchanger and solution (film diffusion), diffusion of ions through the ion-exchanger (particle diffusion) and, in certain cases, the chemical change on the ion-exchanger. These rate limiting steps as well as the factors that influence them will be discussed in the following section.

Film diffusion is described by the transfer of counter-ions from the bulk solution to the surface of an ion-exchanger and visa-versa. In a simplified system where the bulk solution is assumed to be perfectly mixed there is still a layer of liquid surrounding the ion-exchanger which, along with the interior of the ion-exchanger, is not mixed (10). This liquid layer is referred to as "film"; diffusion of ions across this boundary establishes a concentration gradient throughout the film. The flux of ions through the film layer is proportional to solution concentration and inversely proportional to film thickness.

The void inside the ion-exchanger also represents an area where mixing is not present. Diffusion of counter-ions through this void (particle diffusion) is time dependent and can influence the rate of ion-exchange. The flux of ions through a particle is proportional to the concentration of fixed co-ions on the ion-exchanger and inversely proportional its diameter.

The rate of the chemical exchange reaction can also affect overall exchange rates (15). Generally speaking, ion-exchange is a diffusion controlled process though there are several instances where slow exchange reactions control the rate. This primarily the case when the fixed co-ion is a chelating group. Experiments using resin with an iminodiacetic acid functionality have shown little dependence of particle size on exchange rates, suggesting neither film nor particle diffusion control (15).

If the rate of one of the discussed exchange mechanisms (film diffusion, particle diffusion and chemical reaction) is slower than the other two, the rate is said to be "controlled" by that mechanism. There are a number of factors that determine which mechanism will control the rate. Film diffusion is expected in ion-exchangers with a high concentration of fixed co-ions, small ion-exchanger volume, low degree of crosslinking, low solution circulation and low solution concentration (10). Helfferich has stated that the rate determining step can be predicted using the following equation.

$$\frac{X\bar{D}\delta}{CDr_0}(5 + 2\alpha_B^A) \quad \text{Eq. 3.6}$$

Where X is the concentration of fixed co-ions, $\bar{D}$ the diffusion coefficient in the ion-exchanger, $\delta$ the film thickness, C the concentration of counter-ions in solution, D the diffusion coefficient of the film, r0 the ion-exchanger radius. If this value is much less than one the rate determining step is expected to be particle diffusion and greater than one the rate determining step is expected to be film diffusion.

1.4 Existing Ion Exchange Techniques

When approaching the use of ion-exchange techniques to separate rare earth elements there are three paths to be considered. The first being a chelating eluent which is selective between individual lanthanides, combined with a non-selective resin. The second and third are extraction with a selective stationary phase; one case where the resin has been chemically modified at a molecular level and one where a resin's surface is coated with an existing extractant. These methods are discussed at length in literature and have advantages and drawbacks.

1.4.1 Chelating Eluent

The chelating eluent technique was the first discovered and the first method to achieve separation of rare earths on the kilogram and pound scale. Spedding first describes the use of ammonium citrate/citric acid to selectively elute RE's loaded onto Amberlite IR-100 sulfonic acid cation exchange resin (16). The principle behind this method is that RE's are loaded onto cation exchange resin with little order of preference; then as a dilute solution of ammonium citrate or citric acid is pumped through the column an exchange of the RE takes place between the resin and the citrate anion. The citrate anion can be represented as $Y^{3-}$ and the citrate-RE complex as YM where M represents the trivalent RE cation. The metal, when coordinated to citrate in the mobile phase is able to flow through the column without interacting with the resin. The RE coordinates and dissociates from the resin many times as it moves down the column and because the formation of some citrate-RE complexes are favored over others, bands of RE begin to develop in the column. Much like RE separations performed by solvent extraction these separations take advantage of the changing stability of coordinated RE's based on the change in ionic radius due to the lanthanide contraction. As one progresses from left to right on the periodic table the ionic radii of elements get smaller and the complexes formed become more stable due to better overlap of molecular orbitals (17). As a result of this, RE's elute from right to left as they appear on the periodic table, the heavier elements first. Yttrium tends to be an exception to this; the position where it elutes is dependent on the mobile phase used. Though citric acid was the first eluent used it was replaced by acids that are stronger chelators. Aminopolyacetic acids including ethylenediaminetetraacetic acid (EDTA), n-(2-hydroxyethyl) ethylenedinitrilo-n,n',n'-triacetic acid (UEDTA), nitrilotriacetic acid (NTA), ethylenebis (oxyethylenenitrilo) tetraacetic acid (EGTA) and diethylenetrinitrilopentaacetic acid (DTPA) have shown increased heavy RE selectivity and also can be used to elute higher concentrations of RE (18). Table 3.1 gives formation constants for rare earths with several common chelators (19).

TABLE 3.1

| | log K at 20° C., 0.1M RE and polyacetic acid | | | | | |
|---|---|---|---|---|---|---|
| | Citric Acid | DTPA | EDTA | EGTA | HEDTA | NTA |
| $Y^{3+}$ | 7.87 | 22.05 | 18.08 | 17.16 | 14.75 | 11.42 |
| $La^{3+}$ | 7.63 | 19.48 | 15.46 | 15.84 | 13.56 | 10.47 |
| $Ce^{3+}$ | 7.39 | 20.33 | 15.94 | 16.06 | 14.21 | 10.70 |
| $Pr^{3+}$ | 7.95 | 21.07 | 16.36 | 16.17 | 14.71 | 10.87 |
| $Nd^{3+}$ | 7.96 | 21.60 | 16.56 | 16.59 | 14.96 | 11.10 |
| $Sm^{3+}$ | 8.04 | 22.34 | 17.10 | 17.25 | 15.38 | 11.32 |
| $Eu^{3+}$ | 7.91 | 22.49 | 17.32 | 17.77 | 15.45 | 11.32 |
| $Gd^{3+}$ | 7.83 | 22.56 | 17.35 | 17.50 | 15.32 | 11.35 |
| $Tb^{3+}$ | 7.75 | 22.81 | 17.92 | 17.80 | 15.42 | 11.50 |
| $Dy^{3+}$ | 7.79 | 22.92 | 18.28 | 17.84 | 15.40 | 11.63 |

TABLE 3.1-continued log K at 20° C., 0.1M RE and polyacetic acid

| | Citric Acid | DTPA | EDTA | EGTA | HEDTA | NTA |
|---|---|---|---|---|---|---|
| $Ho^{3+}$ | 7.84 | 22.88 | 18.60 | 17.90 | 15.42 | 11.76 |
| $Er^{3+}$ | 7.86 | 22.83 | 18.83 | 18.00 | 15.52 | 11.90 |
| $Tm^{3+}$ | 8.00 | 22.80 | 19.30 | 17.96 | 15.69 | 12.07 |
| $Yb^{3+}$ | 8.10 | 22.70 | 19.48 | 18.22 | 15.98 | 12.21 |
| $Lu^{3+}$ | 8.12 | 22.60 | 19.80 | 18.48 | 15.98 | 12.32 |

Several parameters have been found to affect degree and ease of separation of REE's using complexing eluents. Adjusting the pH has been shown to change the stability of the complexes that the RE forms with the eluent. A low pH weakens the complex formed by the eluent with the RE giving good separation due to more exchanges of RE between the resin and eluent, but at the cost of long elution times and dilute RE effluent streams. Higher pH causes more stable complexes to be formed allowing for more concentrated bands of RE to be generated in the effluent but requiring the use of "retaining ions" (20). Retaining ions are loaded onto the resin at the leading edge of the RE bands and form more stable complexes with the eluent than REEs; this acts to hold back the RE bands and prevents them from eluting too quickly before separation is achieved. HEDTA allows for $H^+$ to be used as the retaining ion which is a benefit over EDTA since forms precipitates on the resin when completely protonated and thus is usually used with the cupric ion to retain the RE (21). The eluent used affects the process conditions and efficacy of the separation. There are many choices of eluent (22) but the most current available literature suggests that EDTA and HEDTA are still the most widely used eluents for macro scale cation exchange separations (1). In addition to pH, temperature can improve the characteristics of RE separations. Increased temperature has shown to improve production rates due to increased solubility of RE/aminopolyacetic acid complexes; at too high of concentrations the eluent can form an insoluble precipitate with the REEs (23). Increasing the solubility of these complexes allows more concentrated RE solutions to be separated which reduces process water use and elution times. Columns run at increased pressure have exhibited improved kinetics, resulting in faster elution times of RE bands (24).

Though the original selective eluent research was done on separation using cation exchange resin, later work explored the use of anion exchange resin. As discussed previously, many chelating molecules (EDTA, HEDTA, etc.) coordinate with RE's to form anionic complexes of the type $YM^-$. This complex will load on an anion exchange resin and when the complex dissociates to $Y^{4-}$ and $M^{3+}$ the metal cation, in this case RE, is free to move through the resin bed. This is essentially the opposite of what occurs in the cationic resin separation and as such it would be expected to see the opposite order of elution in the rare earths but this is not the case (25) (26). The order of elution shows two distinct regimes; lighter elements (La—Eu) which elute in the expected order from light to heavy and heavier elements (Gd—Lu) which elute in order from heavy to light. This can be explained by the differing coordination numbers between these two groups, a result of the lanthanide contraction. The lighter group has a coordination number of 9 and the heavier group a coordination number of 8, with Sm and Gd showing a mixed number. This results in the lanthanide/eluent complex ($YM^-$) not having a consistent effective charge as one goes from La to Lu across the periodic table. The lighter elements exhibit a consistent effective charge but the heavier elements seem to decrease in charge as their atomic number increases. This can help to explain the unexpected elution sequence of the heavier elements; the heavier complexes have decreasing effective charge, are less strongly bound to the resin and thus the heavier elements elute more quickly. It seems that in order to use anion exchange resin the rare earths must first be split the two portions, heavy and light. Work by Hubicka shows the use of anionic exchange resin using iminodiacetic acid (IMDA) as an eluent to successfully separate La from a mixture of La, Pr, and Nd (27). It is suggested that this could be an easy route to high purity $La_2O_3$ as La elutes first. It is however, an example of frontal elution meaning that after the first component elutes there is a mixture eluting with no more separation. This, coupled with the micro-scale of the experiment limits its usefulness on an industrial scale 1.4.2 Functionalized Resins More recent work has focused on the use of resins which have been modified to be RE selective. Using resins with selective functional groups or so called extraction resins which are impregnated with the same extractants used in liquid-liquid extraction, researchers have been able to achieve separations.

There are several papers describing resins which have been chemically modified with covalent bonds to selective functional groups. An example of this is the use of Tulsion CH-96 and T-PAR resins which contain phosphinic and phosphoric acid functional groups respectively (28). Separation of the RE's from Dy—Yb has been attempted using these resins. Tulsion CH-96 has shown separation coefficients comparable to those in seen in (SX) using DEHPA and EHEHPA (1). These separation coefficients can be seen in Table 3.2

TABLE 3.2

Separation Factors of Selected Heavy RE
Separation Factors (β) Between Lu and Several Heavy Lanthanides

| | Tb | Dy | Ho | Y | Er |
|---|---|---|---|---|---|
| Tulsion CH-96 | 5.1 | 4.6 | 3.9 | 2.7 | 2.4 |
| EHEHPA | 8.8 | 5.5 | 2.1 | 1.7 | 1.3 |
| DEHPA | 5.9 | 4.2 | 3.4 | 2.0 | 1.3 |

T-PAR shows poor separation with separation factors being close to unity for the elements analyzed. It should be noted that the CH-96 experiments are being performed in a phosphoric acid stream and the data from SX comes from experiments performed in a hydrochloric acid stream. The synthesis of an azacrown ether functionalized resin has been described using Amberlite XAD-4 as a starting material (29). Crown ethers consist of a ring of alternating carbon/oxygen molecules which create a coordination site for metals that can be size selective. In this case the azacrown ether used was able to separate binary mixtures of Nd/La and Sm/La. Another example of this type of resin is the functionalization of a silica resin with an aminopolyacetate, namely iminodiacetic acid (30). This resin was able to resolve a mixture of all 14 lanthanides from La to Lu using an HNO3/KNO3 solution as an eluent. All elements with the exception of the Gd/Eu and Dy/Ho pairs achieved distinct separation; unfortunately the concentration of each element was only 4 ppm. The concentrations of RE used in all of these experiments were on the order of mg/L or lower; much lower than those desired in any production scenario. While these techniques are novel in their approach they seem to be reserved to applications of RE analysis and not macro-scale production.

1.4.3 Resin Supported Extractants

An area which has received more attention than functionalized resins recently are resins which have been impregnated with cation exchange extractants. These resins haven't had functional groups covalently bonded to their structure but are used as a support for the extractants currently used in RE SX processes. The extractants used to impregnate these resins include DEHPA, EHEHPA, HEOPPA, Cyanex 272, Cyanex 923, and Cyanex 302 (31). The resins appear to be prepared by mixing a non-ionic resin with extractant diluted in a polar solvent under vacuum and then drying. The benefit of these resins is that the chemistry is generally the same as found in solvent extraction, allowing the same reagents to be used. All of the experiments are in chloride solution and use HCl as a stripping solution with no specialized eluent needed. The capacities observed range from 20 mg/g RE loading of a Tm—Yb—Lu mixture using Cyanex 205/P507 (32) impregnated resin to 120 mg/g loading of Er onto a Cyanex 272 (33) impregnated resin. Ultimately loading will depend upon the acid concentration of the loading solution and the amount of extractant impregnating the resin. The theoretical maximum loading of RE on the resin will be 1 mole of RE to every 3 moles of impregnated extractant as it has been observed experimentally that each mole of rare earth displaces 3 moles of $H^+$ (34). In experiments separating the heavies from Ho—Lu using resin supported Cyanex 272 and HEOPPA (35), separation factors have been found in both cases to be ~3 for the Tm/Er and Yb/Tm separations. These are higher than those reported using both DEHPA and EHEHPA in SX. Perhaps more importantly the author reports resolution, a common description of how distinct the elution peaks are, of greater than 1.5 in both separations using HEOPPA and the Yb/Tm separation using Cyanex 272, depending on the flow and acid concentration of the effluent. A resolution of greater than 1.5 is typically desired for 99% baseline separation. Much like the research done using functionalized resins the solutions of RE's used in these experiments are generally very dilute (0.005-0.05 g/L on an REO basis). There is one example of resins being used successfully on a higher concentration feed (36) (10-30 g/L $La_2O_3$) unfortunately this is in the context of already highly purified La being separated from less than 1% Ce, Pr, Nd and other impurities. The separation is successful but does not give much insight into the potential separation between equal portions of RE's at higher concentrations.

Experimental Methods

This section is divided into four sub-sections. These will be discussions of the procedures used in experiments. The first section will discuss the selection and preparation of resins to be used for isotherm and column experiments. The next section will deal with the parameters and conditions employed during the course of experiments. The third section will cover the analysis techniques utilized to quantify experimental results. The final section is a discussion of the statistical analysis performed on experimental data.

1.5 Resin Selection and Preparation

Amberlite IRC748I (iminodiacetic acid) and Amberlite IRC747 (aminophosphonic acid) were selected for screening for rare earth selectivity. They were selected due to their cation-exchange capability as well as their chelating functional groups. The iminodiacetic functionality of IRC748I was expected to be selective toward rare earths given it's similarity to EDTA, a proven chelator in displacement ion exchange chromatography. The aminophosphonic functionality was expected to be effective in separations as phosphonic acids have historically been used as extractants in the solvent extraction of rare earths.

Amberlite IRC748I and Amberlite IRC747 were purchased from Dow Chemical and received in $Na^+$ form. Amberlite IRC748I has a reported size between 0.500 and 0.650 mm with a mean of 0.565 mm and a reported capacity in $Na^+$ form of 1.28 eq/L. Amberlite IRC747 has a reported size between 0.520 and 0.660 mm with a mean of 0.597 mm and a reported capacity in $Na^+$ form of 1.80 eq/L. As received resin was washed with 6 M HCl three times, using 0.5 L acid to wash 0.5 L resin. If it was to be converted to the $Na^+$ form resin was treated with three portions of 2 M NaOH. Each of these portions used 0.5 L caustic solution and 0.5 L resin. Both acid and caustic washing were accomplished by first agitating the resin and acid/base mixture on an elliptical shaker, followed by decanting, filtering and rinsing with $D-H_2O$. An elliptical shaker was used to prevent attrition of the resin beads as it was found that beads were broken when a magnetic stirrer was used.

Columns were loaded at the temperature at which they were to be run. The resin was slurried in $D-H2O$ and added to a dropping funnel with a ground glass joint sized to fit the top joint of the column. The column was filled with $D-H_2O$ and the dropping funnel fitted to the top of the column. Upon opening the stopcock of the dropping funnel, resin flowed into the column, displacing water. The column was periodically tapped using a rubber stopper to ensure tight packing. After the appropriate volume of resin had been added glass beads were added to occupy the remaining void space in the column. Upon completion of packing, 10 bed volumes of $D-H_2O$ were flowed through the column at the flow rate which the experiment was to be run at. Due to resin volume change between $Na^+$ and $H^+$ forms, resin was removed from the columns after each run and not generated in-situ. For example, conversion from the $H^+$ form of IRC748I to the $Na^+$ form resulted in a 20% volume increase. Several attempts at conversion of $H^+$ resin to $Na^+$ in the column resulted in a buildup of pressure and eventual rupture of the column.

1.6 Experimental Parameters

All columns and isotherms were performed using solutions of rare earth chlorides. 99.9% $Y_2O_3$, $Sm_2O_3$, $Eu_2O_3$, $Gd_2O_3$, $Tb_4O_7$, and $Dy_2O_3$ were purchased from Alfa Aesar. Appropriate amounts of each oxide were weighed using an analytical balance, accurate to ±0.2 mg. The oxide was then dissolved using 10% stoichiometric excess analytical grade 12.1 M HCl and 20-50 ml $D-H_2O$ at 90° C. The distilled water used was prepared using a Barnstead Mega-Pure automatic still, capable of producing 1.7 MΩ/cm water. The pH of the resulting solution of rare earth chloride was adjusted using 1 M NaOH and 1 M HCl, and then diluted to an appropriate volume. Columns were stripped using 2 M HCl, prepared using analytical grade 12.1 M HCl and $D-H_2O$.

Flow of influent to columns was accomplished using a variable speed Cole-Parmer Masterflex peristaltic pump. Flexible, size 16, Masterflex brand Tygon tubing was used to transport influent and effluent. Flow rates were periodically monitored using a lab timer and graduated cylinder to measure effluent flow; pump speed was adjusted as needed to maintain the desired flow rate. Fractions were collected using a Varian Prostar 704 fraction collector. The collector was fitted with a 17 mm, 72 position, test tube rack which had been modified using funnels and Tygon tubing to direct fractions into 125 ml polypropylene bottles. The collector was programed to collect timed fractions representing approximately 40% of a bed volume for each fraction.

Figure 3:
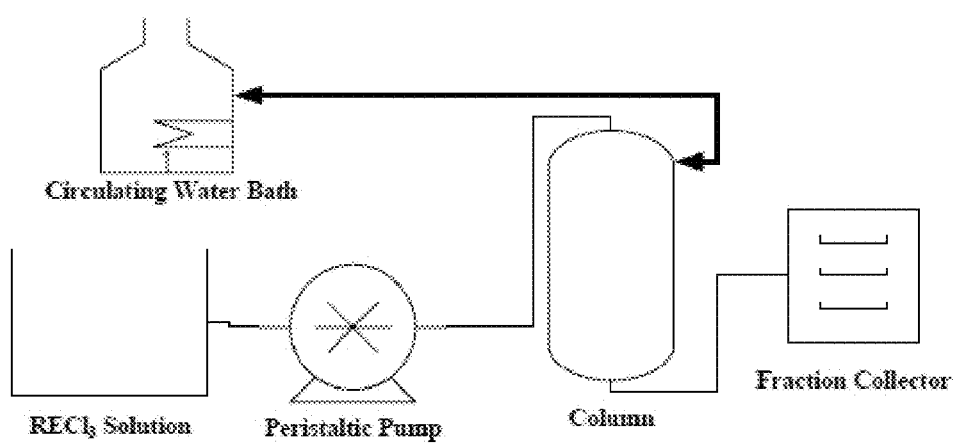
FIG. 3 is a column schematic.

Two columns were used in the experiments performed. One of these columns had a height of 40 cm and one a height of 100 cm. Both had an inside diameter of 2.54 cm. The columns had 24/40 ground glass joints on both ends, 24/40 ground glass adapters with 7 mm barbed hose fittings were attached to these. The resin was held in place in each column with a plug of fritted glass. The columns were jacketed to allow cooling or heating water to be flowed around the column. Temperature control was achieved using a hot water bath equipped with a recirculating pump. A schematic of the column arrangement can be seen in FIG. 3.

1.7 Sample Analysis

Samples collected from isotherm and column experiments were measured for rare earth concentration using a colorimetric EDTA titration. A 5 ml aliquot of rare earth containing solution was pipetted into a conical flask and buffered to a pH of 4.5 by adding 25-35 ml sodium acetate buffer. The buffer was made by dissolving 200 g sodium acetate trihydrate in 2 L D-H2O followed by addition of 20 ml glacial acetic acid. Several drops of 1% wt. xylenol orange were added to the buffer solution turning the rare earth solution a deep purple. The resulting solution was titrated with a 0.05 M EDTA standard which had been purchased from BDH. The EDTA standard was added to the solution from a graduated burette until the endpoint was reached. The endpoint was identified by the change in color of the rare earth solution from purple to yellow and the titration was complete when further addition of EDTA resulted in no $$\text{Vol. EDTA (ml)} \times \text{Conc. EDTA (M)} / \text{Rare Earth Aliquot (ml)} = \text{Conc. Rare Earth (M)} \quad \text{Eq. 4.1}$$

change in color. The following calculation was used to determine rare earth concentration in the analyzed solution.

The $H^+$ activity of the isotherm and column feed solutions were measured using a pH meter. The electrode was calibrated using a three point calibration curve with buffers of pH 1, 4, 7 and 10 depending on the range of measurements needed. Buffer solutions were purchased from VWR. Measurements were reported in millivolts which were then converted to pH using a linear calibration equation.

Analysis of all isotherm and column feed and product samples was performed using inductively coupled plasma mass spectrometry (ICP-MS). The ICP-MS used was an Agilent 7500a, equipped with a CETAC ASX-500 autosampler. Calibration standards for the rare earths being analyzed were made from a 10 ppm multi-element standard containing all lanthanides as well as scandium and yttrium purchased from SPEX CertiPrep. The instrument was calibrated using a blank and standards of 20 parts per billion (ppb), 200 ppb and 2 ppm. This was expected to generate a linear calibration and this was verified after each calibration. The method used was programmed with an internal bismuth standard and each standard and sample was prepared to contain 20 ppb Bi. Samples were prepared using Eppendorf auto-pipets and done on an analytical balance to confirm volumetric addition. The sample to be analyzed was added to a test tube along with the appropriate amount of 2 ppm bismuth solution, the sample was then diluted to the appropriate volume using 2% vol. nitric acid. Nitric acid was made from analytical grade 16 M $HNO_3$ and D-$H_2O$. Dilutions up to 700:1 were possible with a single dilution; serial dilutions were performed for samples benefiting from a higher dilution.

Though the instrument was calibrated using solutions containing all lanthanides only those in solution were included in the method. Yttrium was analyzed at atomic mass number 89; samarium was analyzed at 147 and 149; europium was analyzed at 151 and 153; gadolinium was analyzed at 157; terbium was analyzed at 159; dysprosium was analyzed at 162 and 163. Those elements which were analyzed at two different mass numbers were reported as an average of the two values. The instrument was tuned using three elements representing a wide range of mass and each having a single isotope. These elements were: scandium at 45; holmium at 165; thorium at 232. During tuning instrument parameters were adjusted to maximize the ratio of signal to noise. Given that the multi-element lanthanide standard contained all elements used in tuning the 20 ppb standard doubled as a tuning solution.

Quality of analyses was determined using spiked samples and continuing calibration verification (CCV). For every ten samples analyzed one sample was spiked with a known amount of 10 ppm multi rare earth standard. The 200 ppb multi rare earth standard was also re-analyzed after every ten samples. The expected spike contribution was calculated and the results deemed acceptable if the reported results were 10% of expected values. The same was true for the CCV analysis. Given a CCV or spike recovery failure analysis the instrument was re-tuned, recalibrated and the samples were run again. If failures continued the torch and spray chambers were cleaned with 5% nitric acid, the skimming and sampling cones were cleaned with cotton swabs and the peristaltic pump tubing was replaced.

1.8 Statistical Analysis

Results of optimization experiments were analyzed using Stat-Ease software in order to determine significant effects of variables. State-Ease uses analysis of variance (ANOVA) calculations. In ANOVA, variance is measured as a function of the overall data set as well as within specific variables. The variance seen in the overall data set is compared to the variance attributed to a specific variable. Variance is calculated as the square of the standard deviation. The F test is used to determine whether variance within a variable is significant when compared to the variance of all data from the mean. Data is thought to be significant when the ratio of squared standard deviation falls outside of the 95% confidence interval. This data is thought to be attributable to more than experimental noise (37).

Experimental Results

This section will present the data gathered from performed experiments and be divided into four sections. The first section will discuss isotherm experiments performed to determine separation coefficients of two of the resins to be considered. The second section will cover several initial column experiments which explore separation of a rare earth feed derived from a current Molycorp production stream and show the effect of temperature on column performance. The third section will cover data gathered from an elution chromatography experiment. The fourth and final section will present data collected from a two level, three factor optimization test which attempts to determine the effects of column height, feed rare earth concentration and feed acid concentration on separations.

1.9 Isotherms

Figure 4:
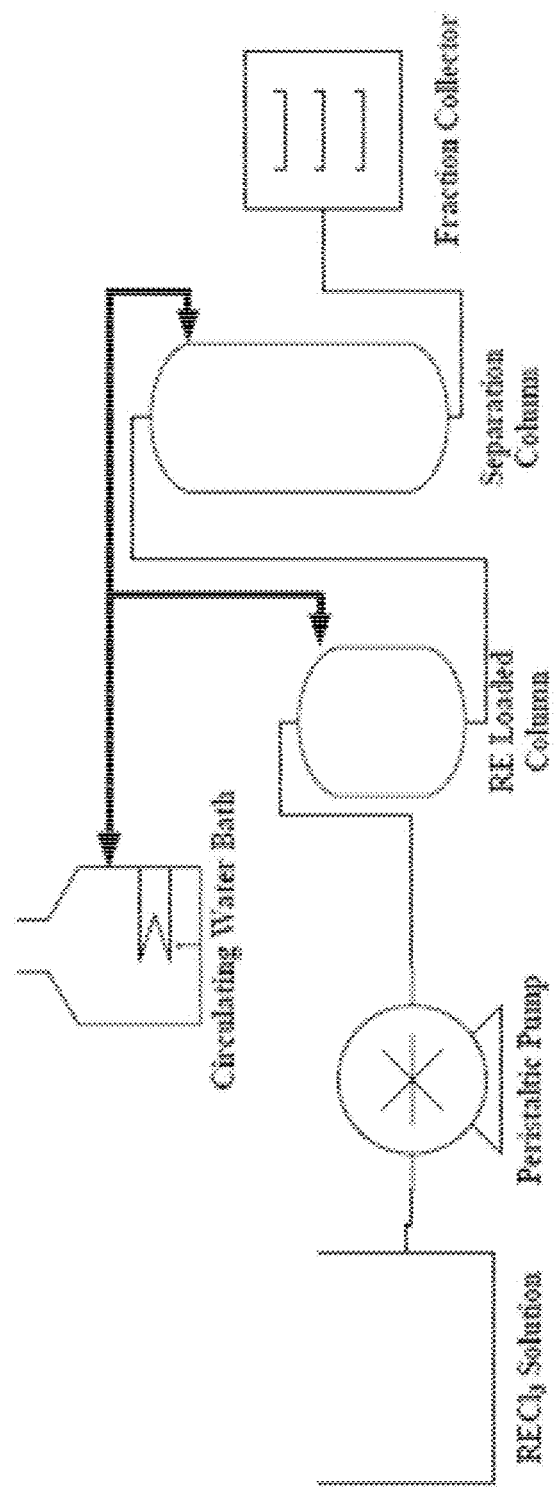
FIG. 4 is an elution chromatography schematic.
Figure 5:
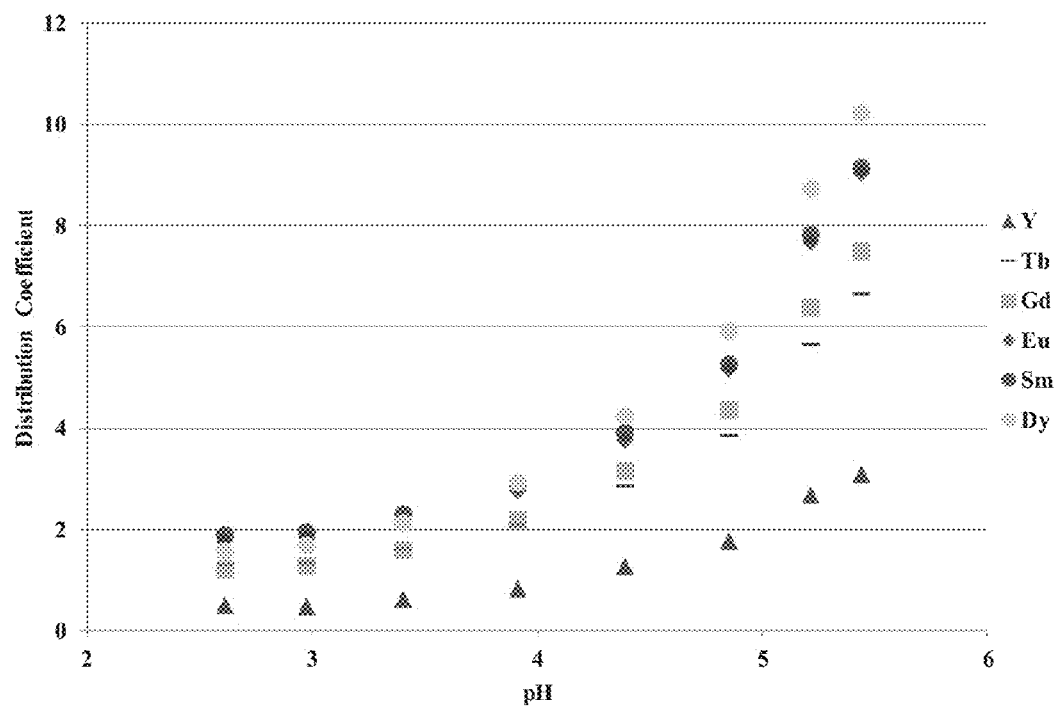
FIG. 5 depicts an Amberlite IRC748I isotherm

Table 5.1 and Table 5.2 describe the conditions under which the isotherm experiments were performed. FIG. 4 and FIG. 5 show loading vs. pH curves in each resin. Given this data, separation coefficients can be calculated and will be discussed in the following section.

TABLE 5.1

Amberlite IRC748I Isotherm Conditions

| Resin (g) | Feed Solution (ml) | 6M HCl (ml) | D-H$_2$O (ml) | Loading (meq/g) | pH | REO in Solution (mM) |
|---|---|---|---|---|---|---|
| 2.5042 | 50.00 | 0.05 | 4.95 | 3.14 | 5.4 | 7.0 |
| 2.5137 | 50.00 | 0.10 | 4.90 | 3.07 | 5.2 | 8.0 |
| 2.4997 | 50.00 | 0.20 | 4.80 | 2.87 | 4.9 | 11.0 |
| 2.5008 | 50.00 | 0.30 | 4.70 | 2.67 | 4.4 | 14.0 |
| 2.4993 | 50.00 | 0.40 | 4.60 | 2.41 | 3.9 | 18.0 |
| 2.5013 | 50.00 | 0.50 | 4.50 | 2.18 | 3.4 | 21.5 |
| 2.5016 | 50.00 | 0.60 | 4.40 | 1.98 | 3.0 | 24.5 |
| 2.5032 | 50.00 | 0.70 | 4.30 | 1.95 | 2.6 | 25.0 |

TABLE 5.2

Amberlite IRC747 Isotherm Conditions

| Resin (g) | Feed Solution (ml) | 6M HCl (ml) | D-H$_2$O (ml) | Loading (meq/g) | pH | REO in Solution (mM) |
|---|---|---|---|---|---|---|
| 2.5015 | 50.00 | 0.60 | 4.40 | 3.23 | 2.9 | 6.0 |
| 2.5073 | 50.00 | 0.70 | 4.30 | 3.04 | 2.6 | 9.0 |
| 2.5075 | 50.00 | 0.90 | 4.10 | 2.84 | 2.2 | 12.0 |
| 2.5093 | 50.00 | 1.00 | 4.00 | 2.64 | 1.9 | 15.0 |
| 2.5033 | 50.00 | 5.00 | 0.00 | 1.55 | 0.5 | 31.5 |

Isotherm experiments were carried out in 125 ml polypropylene bottles. Conditioned resin was weighed on an analytical balance. Aliquots of rare earth solution were added using Type-A volumetric pipettes. The rare earth solution used contained equimolar (7.5 mM) amounts of Y, Sm, Eu, Gd, Tb and Dy. The acidity of the isotherms was adjusted using 6 M HCl which was made from analytical grade HCl and D-H$_2$O. Aliquots of acid and D-H$_2$O were added to the isotherm using adjustable volume Eppendorf auto-pipettes. Each isotherm was made to contain the same solution volume and resin weight. Isotherms were agitated on an elliptical shaker for 24 hours before being sampled. Hydronium activity measurements, EDTA titration and ICP-MS analysis were performed on the samples taken. Loading was expressed in units of milliequivalents per gram of resin; an equivalent representing one mole of charge. One mole of a trivalent lanthanide in solution would represent three charge equivalents.

1.10 Frontal Analysis

Upon isotherm experiments exhibiting evidence of rare earth selectivity, preliminary frontal analysis chromatography experiments were performed. A solution derived from a Molycorp solvent extraction circuit containing primarily heavy rare earths was used. The makeup of this solution can be seen in Table 5.3. This solution was adjusted to a pH of 4.5 and flowed through an 86 cm$^3$ bed at 0.06 bed volumes per minute (V$_B$/min). The breakthrough curves for Amberlite IRC747 and IRC748I can be seen in FIGS. 6 and 7 respectively.

Amerberlite IRC748I (iminodiacetic acid) showed the most promise for separation of yttrium from this mixture in both isotherm and preliminary column experiments; from this point forward research efforts were focused solely on the use of this resin. Amberlite IRC747 (aminophosphonic acid) showed little selectivity and the composition of the effluent was similar to the composition of the influent. It was suggested that increase in temperature of column operation would positively influence performance and as such experiments were performed at elevated temperature (about 70° C.) and compared to those close to ambient temperature (about 30° C.). At both temperatures a synthetic solution containing equimolar (8.6 mM) parts Y, Sm, Eu, Gd, Tb and Dy was flowed through a 90 cm$^3$ bed of Amberlite IRC748I at 0.05 V$_B$/min. There were some difficulties with gas formation in the columns at elevated temperature. Decrease in gas solubility resulted in formation of air bubbles in the column at 70° C. These bubbles disrupted flow and therefore these experiments were discontinued. This problem was combated through heating and helium degassing of influent prior to addition as well as the installation of a pressure regulator on the outflow to induce elevated pressure inside the column. The breakthrough curves for these experiments can be seen in FIGS. 7 and 6. Desorption curves can be seen in FIG. 8 and FIG. 10. Comparison of these columns will be made in the Analysis section though it should be noted that all further experiments were performed at 30° C. Other experiments may be performed about 25° C. or higher, for example about 30° C., 40° C., 50° C., 60° C., or 70° C.

TABLE 5.3

Composition of Heavy RE Enriched Feed

| Element. | Y | La | Ce | Pr | Nd | Sm | Eu | Tb |
|---|---|---|---|---|---|---|---|---|
| Conc. (mM) | 14.22 | 2.02 | 2.78 | 0.25 | 5.47 | 79.67 | 12.18 | 1.30 |
| % of RE | 9.74% | 1.38% | 1.91% | 0.17% | 3.75% | 54.57% | 8.34% | 0.89% |

| Element | Gd | Dy | Ho | Er | Tm | Yb | Lu | Total |
|---|---|---|---|---|---|---|---|---|
| Conc. (mM) | 21.89 | 4.35 | 0.63 | 1.02 | 0.05 | 0.10 | 0.06 | 146.0 |
| % of RE | 14.99% | 2.98% | 0.43% | 0.70% | 0.03% | 0.07% | 0.04% | 100.00% |

1.11 Elution Chromatography

A separation was attempted using an elution chromatography approach. Two columns were arranged in the manner shown in FIG. 12. A 150 cm$^3$ portion of resin was loaded to capacity using a 152 mM rare earth solution containing equal parts Y, Sm, Eu, Gd, Tb and Dy. This column was then connected to a column containing 460 cm$^3$ Amberlite IRC748I in the Na$^+$ form. The rare earth that had been loaded was eluted using 0.1 M HCl at 30° C. and 0.01 VB/min. through the unloaded resin in the hopes that the rare earths would separate and elute as distinct peaks. FIG. 4 is a flow diagram representing the experimental setup used in this experiment. The chromatogram generated can be seen in FIG. 13. The column flow of influent was stopped after 17.5 hours (8.7 VB) and the column left for eight hours before being re-started the following morning. This is accompanied by a decrease in the concentration of rare earth in the effluent. This is suspected to be a result of re-adsorption of desorbed rare earth. Possible reasons for this will be discussed in the Analysis section. A common measure of the efficacy of chromatography is peak resolution; this data will be used to calculate resolution which will be discussed in the following section.

1.12 Multi-Factor Response

A series of experiments were designed using Stat-Ease software to explore the effects of three parameters on column performance. Bed volume, influent pH and rare earth concentration of the feed were chosen as the design factors. Bed volume was chosen as an extension of column height. It has been shown that in chromatographic separations, increased bed height can increase peak resolution at the expense of peak broadening (10). The column height was increased but the flow in $V_B$/min was kept constant. Influent pH was chosen to explore the effect of competing ions, in this case $H^+$, on separation efficiency. Feed concentration was chosen as the last factor; decreased feed concentration could have the effect of slowing the rate of adsorption and allow slower moving bands of ions, thus increasing ion-exchange (10). On the other hand increased feed concentration could improve exclusion of yttrium by competing ions. These three factors were evaluated for several performance characteristics at two levels each. Eight columns were run using a three factor-two level design. Table 5.4 describes the experimental conditions used in these columns. FIGS. 14-29 are loading and stripping curves generated from these experiments.

TABLE 5.4

Experimental Parameters for Multi-Factor Response

| | Influent pH | Column Vol. (cm³) | Feed RE Conc. (mM) |
|---|---|---|---|
| Column 1 | 4 | 150 | 50 |
| Column 2 | 4 | 150 | 150 |
| Column 3 | 4 | 300 | 150 |
| Column 4 | 2 | 150 | 50 |
| Column 5 | 2 | 300 | 50 |
| Column 6 | 4 | 300 | 50 |
| Column 7 | 2 | 150 | 150 |
| Column 8 | 2 | 300 | 150 |

Analysis of Results 1.13 Isotherms

The isotherms performed with both resins showed signs of selectivity among the rare earths observed. The distribution of rare earths between mobile and stationary phases was calculated and from this separation coefficients were calculated. Equation 6.1 describes the calculation of distribution coefficients which is defined by the ratio of the amount of a given rare earth element found to the amount remaining in solution at a given hydronium activity.

$$k_{RE} = \frac{[RE^{3+}]_M}{[RE^{3+}]_S} \qquad \text{Eq. 6.1}$$

Adsorption of rare earth was calculated by comparing the concentration in solution in a given isotherm to a control in which no resin was added. The difference in rare earth concentration was assumed to be the adsorbed amount.

Once distributions coefficients had been calculated for all six rare earth elements in the isotherms separation coefficients could be calculated. The separation coefficient is a ratio of distribution coefficients for two elements at a given hydronium activity and is calculated, with respect to yttrium, using the following equation.

$$\beta_Y^{RE} = \frac{k_{RE}}{k_Y} \qquad \text{Eq. 6.2}$$

The aminophosphonic acid and iminodiacetic acid resin show slightly different order of preference to the six rare earths observed.

Amberlite IRC748I—Dy>Sm>Eu>Tb>Gd>Y

Amberlite IRC747—Dy>Eu>Tb>Sm>Gd>Y

Both resins favor extraction of dysprosium and have lowest affinity toward yttrium. Neither extractant exactly follows the order expected from the lanthanide contraction; gadolinium in particular deviates from its expected position. This can be partially explained by a characteristic known as the "gadolinium break". This abnormality is a result of the half-filled f orbital of trivalent gadolinium (4f7), which affects both ionic radius and bonding (38). The observed ionic radius of trivalent gadolinium is larger than europium and terbium, its neighboring lanthanides.

It has also been found that EDTA complexes of gadolinium are less stable than predicted by ionic radius alone. This arises from poor electron sharing from the ligand to the stabilized f-orbitals of gadolinium. Aminophosphonic acid functionalized resin shows little separation of gadolinium from yttrium and separation coefficients of less than two between all rare earths considered and yttrium. This makes it a poor candidate to separate yttrium from this rare earth mixture. Iminodiacetic resin shows greater capacity to separate yttrium from this mixture as it has a separation coefficient greater than two in all elements considered. Iminodiacetic acid also improves on separation coefficients found in other selective extractants. Table 6.1 shows separation coefficient results calculated with respect to yttrium as well as those for two well-known solvent extraction reagents; tributyl phosphate and versatic acid.

TABLE 6.1

Separation Coefficients w.r.t Yttrium in Selected Extractants

| Extractant | Gd/Y | Sm/Y | Tb/Y | Eu/Y | Dy/Y |
|---|---|---|---|---|---|
| IRC747 | 1.0 | 1.2 | 1.3 | 1.3 | 1.4 |
| IRC748I | 2.4 | 3.0 | 2.2 | 2.9 | 3.3 |
| TBP (1) | 2.3 | 2.8 | N/A | N/A | 2.1 |
| Versatic Acid (1) | 0.77 | 0.39 | N/A | N/A | 1.5 |

1.14 Frontal Analysis

Frontal analysis chromatography using aminophosphonic acid resin shows no upgrade. The makeup of both the effluent collected as well as what was desorbed from the column is identical to the makeup of the loading solution. The combination of this and poor separation coefficients in isotherms led to the cessation of experimentation with this resin. Though it has functional groups similar to effective solvent extraction reagents it shows little capacity for separation of rare earths.

Frontal analysis experiments using iminodiacetic acid resin exhibited an upgrade of yttrium in the loading effluent and a decrease of yttrium in the strip solution. Yttrium went from 9.7% in the feed to 14.3% in the effluent; the strip effluent showed a decrease in yttrium to 3.1%. One encouraging factor in this resins ability to separate yttrium is the loading profile exhibited by yttrium in FIG. 7. The shape, showing concentration relative to the feed greater than one, is characteristic of ion-exclusion. As previously discussed ion-exclusion occurs when a mixture of non-ionic and ionic elements is separated as resin has little affinity to non-ionic elements and they are excluded from the column, appearing first in the effluent. A similar effect seems to be occurring in the case of yttrium. It is known from isotherms that it has a lower affinity for the resin being used than the other rare earths observed and though it is an ionic (+3) component it is being excluded from sorption. This is a promising characteristic though the effluent is still a mixture of rare earths and no fractions collected exhibit highly purified (>90%) yttrium.

Amberlite IRC748I columns were run at 30° C. and 70° C. in an attempt to determine the effect of temperature on separations. It was found that capacity increased with increasing temperature, going from 0.88 meq/ml to 0.98 meq/ml. Separation capability was less clearly affected. Increasing temperature led to increased upgrade of yttrium during loading as yttrium was increased to 19.5% of rare earth at 70° C. versus 19.2% at 30° C., compared to the starting concentration of 16.7%. The opposite effect was seen when comparing the strip solution in each column; in the strip solution yttrium was reduced to 6.0% of rare earths at 70° C. versus 5.4% at 30° C. These conflicting results, a difference of less than 10%, suggest that separation is minimally affected by changes in temperature. All subsequent experiments were performed at 30° C.

1.15 Elution Chromatography

Figure 12:
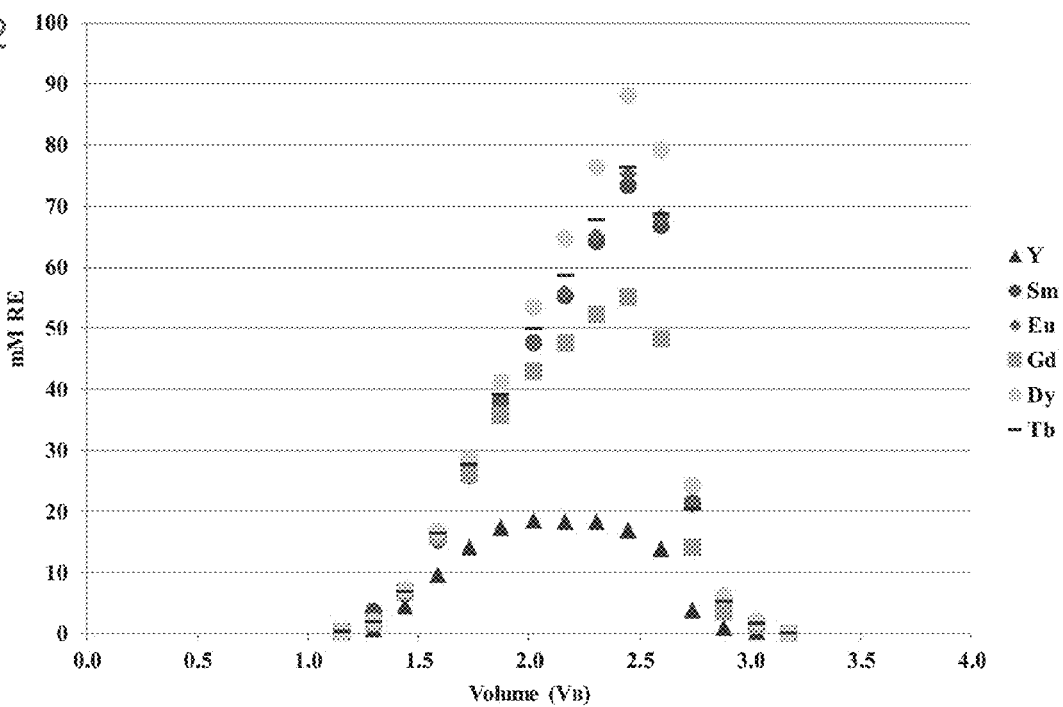
FIG. 12 depicts an Amberlite IRC748I desorption curve (2 m hcl, 0.06 vb/min).

Visual inspection of FIG. 12 confirms little resolution of any peaks. The amount of peak separation can be quantified using a so-called resolution factor. The resolution factor calculation is shown in the below equation.

$$R = \frac{2(t_b - t_a)}{(W_b + W_a)} \quad \text{Eq. 6.3 (39)}$$

R represents the resolution factor while t and W represent the elution time at the peak and width of the base of the peak respectively. The subscripts a and b represent separate peaks in which a elutes prior to b. In this case a constant flow rate is used and bed volumes eluted is equivalent to elution time, as such bed volumes will replace time in the calculations. The resolution factor for Sm, Gd, Eu, Tb and Dy will be calculated with respect to yttrium as it has first peak to elute. Table 6.2 shows the calculated values with respect to yttrium.

The resolutions calculated were much less than one which is required for complete separation and 1.5 which is generally accepted as the minimum for baseline separation (39). The column could be repeated using lower concentration eluent in an attempt to improve band separation. At lower concentration the bands or peaks of ions will move more slowly through the column, increasing the amount of exchange taking place, therefore improving separation. The tradeoff of decreased eluent concentration is decreased concentration of effluent and peak broadening. Decreased concentration can lead to difficulties in precipitation and recovery of rare earths from solutions. Decreased eluent concentration would also result in increased water usage which must be treated and reused or collected in evaporation ponds which have limited capacity. A slower flow-rate could also improve separation. From the chromatograph it appears that the adsorption is particle diffusion control. A pause in addition of eluent results in a drop in effluent concentration or "relaxation" of the column. This is expected from columns in which adsorption is controlled by particle diffusion as opposed to film diffusion. A drawback of decreasing flow-rate is increased development time. The flow-rate used in this experiment is 1% of a bed volume per minute, a relatively slow rate to begin with. This experiment resulted in low concentration effluent as well as an eluent usage of 14 bed volumes. Chromatographic separation of a mixture of 14 lanthanides has been reported using silica supported iminodiacetic acid (40). This is, however, achieved using high performance chromatographic techniques. This involves comparatively small diameter resin (6 μm), highly elevated pressure (~6000 psi) and low concentrations (4 ppm). In order to achieve desired separation in the system used the exchange kinetics would need to be vastly improved.

TABLE 6.2

Iminodiacetic Acid Resolution Factors

|   | Sm | Eu | Gd | Tb | Dy |
|---|---|---|---|---|---|
| R | 0.11 | 0.05 | 0.05 | 0.04 | 0.02 |

1.16 Multi-Factor Response

Several factors were considered in a multi-factor optimization experiment. These were column height, feed concentration and acid concentration. An experimental matrix was designed which can be seen in Table 5.4. Several performance markers were considered when analyzing the data generated from these experiments; these are contained in Table 6.3.

Focusing on the stated goal of yttrium separation, the concentration of yttrium at several stages of the process were considered. The total concentration of yttrium in the effluent and concentration after 1 and 3 bed volumes after breakthrough were considered. The concentration of yttrium in the stripped solution was also considered. More generally the capacity of the resin at breakthrough, as well as the equilibrium capacity, was looked at. Why were these factors chosen? This data was analyzed using stat-ease to determine the effects that each of the three factors had on the performance markers. Unfortunately, only two of the performance markers were altered by the factors considered in a statistically significant manor. Both the breakthrough capacity and the yttrium percentage were significantly impacted by model terms. These interactions have been graphically represented in FIG. 30-FIG. 33.

TABLE 6.3

Key Parameters in Multi-Factor Rare Earth Separation

|  | Effluent (% Yttrium) | 1 $V_B$ (% Yttrium) | 3 $V_B$ (% Yttrium) | Strip (% Yttrium) | Capacity (meq/ml) | Breakthrough Capacity (meq/ml) |
|---|---|---|---|---|---|---|
| Column 1 | 19.6% | 24.2% | 22.4% | 11.7% | 0.92 | 0.39 |
| Column 2 | 17.9% | 24.8% | 19.7% | 11.2% | 0.95 | 0.66 |
| Column 3 | 19.7% | 23.1% | 20.7% | 13.2% | 1.06 | 0.44 |
| Column 4 | 18.9% | 21.7% | 20.2% | 12.1% | 0.90 | 0.29 |
| Column 5 | 19.3% | 19.7% | 19.2% | 11.8% | 0.90 | 0.27 |
| Column 6 | 19.2% | 23.4% | 21.4% | 13.0% | 0.99 | 0.16 |

TABLE 6.3-continued

Key Parameters in Multi-Factor Rare Earth Separation

|  | Effluent (% Yttrium) | 1 $V_B$ (% Yttrium) | 3 $V_B$ (% Yttrium) | Strip (% Yttrium) | Capacity (meq/ml) | Breakthrough Capacity (meq/ml) |
|---|---|---|---|---|---|---|
| Column 7 | 18.7% | 23.3% | 20.2% | 11.6% | 0.99 | 0.44 |
| Column 8 | 18.7% | 21.5% | 19.8% | 11.1% | 0.93 | 0.34 |

One bed volume after breakthrough, yttrium composition in the effluent is affected by both acid composition and column height. Increasing column height and increasing acid concentration in the feed decreases selectivity toward yttrium. Breakthrough capacity is positively impacted by feed concentration and negatively influenced by column height. All of these effects speak to the importance of kinetics on adsorption. Factors which are expected to positively affect the kinetics of adsorption also have a positive effect on the separation of yttrium from a mixture of rare earths. Increase of feed concentration is shown to improve breakthrough capacity; this is an expected result. In both upgrade of yttrium and breakthrough capacity, increased bed volume has a negative effect. The columns were run at identical flow rate in terms of bed volumes per minute, meaning that increasing bed volume requires increasing volumetric flow rate. An increase in velocity of the eluent is expected to negatively impact particle diffusion if that is in fact the rate controlling mechanism. Flow rate should have been used as a design factor or if not used, the columns should have been run at or below the equilibrium flow rate. The equilibrium flow rate being the rate at which mass transfer is not improved by lowing the flow rate. Increasing feed acid acts to decrease the upgrade of yttrium. The addition of a competing ion should negatively affect the rate of adsorption; this is another example of poor kinetics resulting in decreased separation. None of the optimization experiments exhibited the ion-exclusion behavior seen in the initial experiments using feed from a Molycorp process stream. It had been hoped that the optimization would identify conditions which promoted this effect. What was found was that conditions which promoted the rate of adsorption also helped to promote separation. Low acid concentration, flow rate and increased rare earth concentration should be considered beneficial to separation.

Other effects which might help promote separation are decreased resin diameter, decreased crosslinking and increasing concentration of fixed ionic groups. Further experiments should be performed using a smaller diameter resin, several of which are commercially available

CONCLUSIONS

The use of two commercially available chelating cationic exchange resins for rare earth separation has been evaluated. Initial isotherm experiments showed selectivity toward rare earth in both iminodiacetic acid and aminophosphonic acid resins. In solutions containing Y, Sm, Eu, Gd, Tb and Dy; yttrium was the least adsorbed element. Selectivity did not follow the pattern expected from the lanthanide contraction; in particular gadolinium had less than expected affinity toward resin. This was explained by the so called "gadolinium break" in which the unique electronic properties of gadolinium, a half-filled f-orbital, results in non-uniform behavior. Separation coefficients were calculated with respect to yttrium in both resins and they were favorably compared to existing solvent extraction reagents. Though both resins showed selectivity, iminodiacetic acid had the largest separation coefficients. Large separation factors of yttrium with respect to the other heavy rare earths evaluated led to optimism that chelating resin could be used to separate yttrium from mixtures of heavy rare earths.

Preliminary column experiments were performed using both resins using Molycorp heavy rare earth concentrate as feed. Aminophosphonic acid resin showed effluent throughout the experiment with little deviation from initial feed. On the other hand, iminodiacetic acid showed a large peak of yttrium, eluting at nearly twice the concentration in the feed. This type of profile is associated with ion-exclusion. Based on these results it was decided that concurrent experiments would be performed using iminodiacetic acid resin. Preliminary experiments were also performed to determine the effect of temperature on column experiments. Identical iminodiacetic acid columns were run at 30° C. and 70° C. There was a small improvement in separation one bed volume after breakthrough as well as a higher breakthrough capacity. The eluent collected one bed volume after breakthrough contained 19.5% yttrium at 70° C. and 19.2% yttrium at 30° C.; this is an upgrade over the 16.7% yttrium in the feed solution. The breakthrough capacity increased from 0.88 meq/ml to 0.98 meq/ml with increased temperature. All subsequent column experiments were performed at 30° C. due to ease of operation though it is evident that elevated temperature improves column performance.

An elution chromatography experiment was conducted using pH 1 eluent to develop a loaded rare earth across a bed of Na+ iminodiacetic acid resin. Very little separation was achieved. Yttrium was the first element to elute and resolution factors were calculated with respect to yttrium. All resolution factors calculated were less than 0.1; a resolution factor of 1.5 is generally considered typically desired for baseline separation. The column also exhibited a re-adsorption of rare earth after the column was halted in the middle of the experiment. A marked improvement of rate of exchange would be needed to improve separation. Several ideas discussed to improve exchange kinetics were lower eluent flow rate, lower eluent concentration and smaller resin size. Lowering the resin size is the most immediately applicable solution and future experiments should be performed using smaller diameter resin. Though benefitting column performance these factors would have negative effects on other aspects of the process including waste water, column capacity, pressure drop and rare earth recovery.

Optimization experiments were performed on iminodiacetic acid resin in an attempt to isolate conditions which promote ion-exclusion of yttrium. A two-level, three factor experiment was developed to determine the effect of bed volume, eluent acid concentration and eluent rare earth concentration on yttrium upgrade. Yttrium upgrade at several points in these experiments as well as overall resin capacity was analyzed using ANOVA and the significant factors were reported. It was found that the factors observed had a significant effect on yttrium upgrade in eluent one bed volume after breakthrough as well as the resin's overall breakthrough capacity. Decreasing acid concentration, increasing rare earth concentration and decreasing bed volume all had a positive effect on rare earth separation. Decreasing bed volume had the effect of decreasing linear flow rate as flow rate with respect to bed volume was kept constant. Optimization experiments showed that factors expected to improve exchange kinetics also improved yttrium upgrade.

Ultimately, the ion-exclusion behavior observed using feed from Molycorp was not repeated by any of the optimization experiments. This technique might be best suited for situations where there is a large excess of yttrium or in trying to separate a small amount of yttrium from a rare-earth mixture. Using equimolar solutions of rare earth it is unclear how frontal analysis can provide highly purified yttrium. Future experiments should focus on improving the exchange and adsorption kinetics and developing a flow diagram to achieve continuous column operation.

Additional Experiments

Resin Selection and Preparation

Amberlite IRC748I (iminodiacetic acid) was selected for screening for rare earth selectivity. It was selected for its cation-exchange capability as well as its chelating functional group. The iminodiacetic functionality of IRC748I was selected because of its similarity to EDTA, a proven chelator in displacement ion exchange chromatography.

Amberlite IRC748I was purchased from Dow Chemical and received in Na+ form. Amberlite IRC748I has a reported size between 0.500 and 0.650 mm with a mean of 0.565 mm and a reported capacity in Na+ form of 1.28 eq/L. As received resin was washed with 6 M HCl three times, using 0.5 L acid to wash 0.5 L resin. If it was to be converted to the Na+ form resin was treated with three portions of 2 M NaOH. Each of these portions used 0.5 L caustic solution and 0.5 L resin. Both acid and caustic washing were accomplished by first agitating the resin and acid/base mixture on an elliptical shaker, followed by decanting, filtering and rinsing with D-$H_2O$. An elliptical shaker was used to prevent attrition of the resin beads as it was found that beads were broken when a magnetic stirrer was used.

Columns were loaded at the temperature at which they were to be run. The resin was slurried in D-H2O and added to a dropping funnel with a ground glass joint sized to fit the top joint of the column. The column was filled with D-H2O and the dropping funnel fitted to the top of the column. Upon opening the stopcock of the dropping funnel, resin flowed into the column, displacing water. The column was periodically tapped using a rubber stopper to ensure tight packing. After the appropriate volume of resin had been added glass beads were added to occupy the remaining void space in the column. Upon completion of packing, 10 bed volumes of D-H2O were flowed through the column at the flow rate which the experiment was to be run at. Due to resin volume change between Na+ and H+ forms, resin was removed from the columns after each run and not generated in-situ. For example, conversion from the H+ form of IRC748I to the Na+ form resulted in a 20% volume increase. Several attempts at conversion of H+ resin to Na+ in the column resulted in a buildup of pressure and eventual rupture of the column.

Experimental Parameters

All columns and isotherms were performed using solutions of rare earth chlorides. 99.9% $Y_2O_3$, $Sm_2O_3$, $Eu_2O_3$, $Gd_2O_3$, $Tb_4O_7$, and $Dy_2O_3$ were purchased from Alfa Aesar. Appropriate amounts of each oxide were weighed using an analytical balance, accurate to ±0.2 mg. The oxide was then dissolved using 10% stoichiometric excess analytical grade 12.1 M HCl and 20-50 ml D-$H_2O$ at 90° C. The distilled water used was prepared using a Barnstead Mega-Pure automatic still, capable of producing 1.7 MΩ/cm water. The pH of the resulting solution of rare earth chloride was adjusted using 1 M NaOH and 1 M HCl, and then diluted to an appropriate volume. Columns were stripped using 2 M HCl, prepared using analytical grade 12.1 M HCl and D-$H_2O$.

Flow of influent to columns was accomplished using a variable speed Cole-Parmer Masterflex peristaltic pump. Flexible, size 16, Masterflex brand Tygon tubing was used to transport influent and effluent. Flow rates were periodically monitored using a lab timer and graduated cylinder to measure effluent flow; pump speed was adjusted as needed to maintain the desired flow rate. Fractions were collected using a Varian Prostar 704 fraction collector. The collector was fitted with a 17 mm, 72 position, test tube rack which had been modified using funnels and Tygon tubing to direct fractions into 125 ml polypropylene bottles. The collector was programmed to collect timed fractions representing approximately 40% of a bed volume for each fraction.

Two columns were used in the experiments performed. One of these columns had a height of 40 cm and one a height of 100 cm. Both had an inside diameter of 2.54 cm. The columns had 24/40 ground glass joints on both ends, 24/40 ground glass adapters with 7 mm barbed hose fittings were attached to these. The resin was held in place in each column with a plug of fritted glass. The columns were jacketed to allow cooling or heating water to be flowed around the column. Temperature control was achieved using a hot water bath equipped with a recirculating pump. A schematic of the column arrangement can be seen in FIG. 3.

Sample Analysis

Samples collected from isotherm and column experiments were measured for rare earth concentration using a colorimetric EDTA titration. A 5 ml aliquot of rare earth containing solution was pipetted into a conical flask and buffered to a pH of 4.5 by adding 25-35 ml sodium acetate buffer. The buffer was made by dissolving 200 g sodium acetate trihydrate in 2 L D-H2O followed by addition of 20 ml glacial acetic acid. Several drops of 1% wt. xylenol orange were added to the buffer solution turning the rare earth solution a deep purple. The resulting solution was titrated with a 0.05 M EDTA standard which had been purchased from BDH. The EDTA standard was added to the solution from a graduated burette until the endpoint was reached. The endpoint was identified by the change in color of the rare earth solution from purple to yellow and the titration was complete when further addition of EDTA resulted in no change in color. The following calculation was used to determine rare earth concentration in the analyzed solution.

$$\text{Vol. } EDTA \text{ (ml)} \times \frac{\text{Conc. } EDTA \text{ }(M)}{\text{Rare Earth Aliquot (ml)}} = \text{Conc. Rare Earth }(M) \quad \text{Eq. 4.1}$$

The H+ activity of the isotherm and column feed solutions were measured using a pH meter. The electrode was calibrated using a three point calibration curve with buffers of pH 1, 4, 7 and 10 depending on the range of measurements needed. Buffer solutions were purchased from VWR. Measurements were reported in millivolts which were then converted to pH using a linear calibration equation.

Analysis of all isotherm and column feed and product samples was performed using inductively coupled plasma mass spectrometry (ICP-MS). The ICP-MS used was an Agilent 7500a, equipped with a CETAC ASX-500 autosampler. Calibration standards for the rare earths being analyzed were made from a 10 ppm multi-element standard containing all lanthanides as well as scandium and yttrium purchased from SPEX CertiPrep. The instrument was calibrated using a blank and standards of 20 parts per billion (ppb), 200 ppb and 2 ppm. This was expected to generate a linear calibration and this was verified after each calibration. The method used was programed with an internal bismuth standard and each standard and sample was prepared to contain 20 ppb Bi. Samples were prepared using Eppendorf auto-pipets and done on an analytical balance to confirm volumetric addition. The sample to be analyzed was added to a test tube along with the appropriate amount of 2 ppm bismuth solution, the sample was then diluted to the appropriate volume using 2% vol. nitric acid. Nitric acid was made from analytical grade 16 M HNO3 and D-H2O. Dilutions up to 700:1 were possible with a single dilution; serial dilutions were required for samples requiring a higher dilution.

Though the instrument was calibrated using solutions containing all lanthanides only those in solution were included in the method. Yttrium was analyzed at atomic mass number 89; samarium was analyzed at 147 and 149; europium was analyzed at 151 and 153; gadolinium was analyzed at 157; terbium was analyzed at 159; dysprosium was analyzed at 162 and 163. Those elements which were analyzed at two different mass numbers were reported as an average of the two values. The instrument was tuned using three elements representing a wide range of mass and each having a single isotope. These elements were: scandium at 45; holmium at 165; thorium at 232. During tuning instrument parameters were adjusted to maximize the ratio of signal to noise. Given that the multi-element lanthanide standard contained all elements used in tuning the 20 ppb standard doubled as a tuning solution.

Quality of analyses was determined using spiked samples and continuing calibration verification (CCV). For every ten samples analyzed one sample was spiked with a known amount of 10 ppm multi rare earth standard. The 200 ppb multi rare earth standard was also re-analyzed after every ten samples. The expected spike contribution was calculated and the results deemed acceptable if the reported results were 10% of expected values. The same was true for the CCV analysis. Given a CCV or spike recovery failure analysis the instrument was re-tuned, recalibrated and the samples were run again. If failures continued the torch and spray chambers were cleaned with 5% nitric acid, the skimming and sampling cones were cleaned with cotton swabs and the peristaltic pump tubing was replaced.

Isotherms

Figure 35:
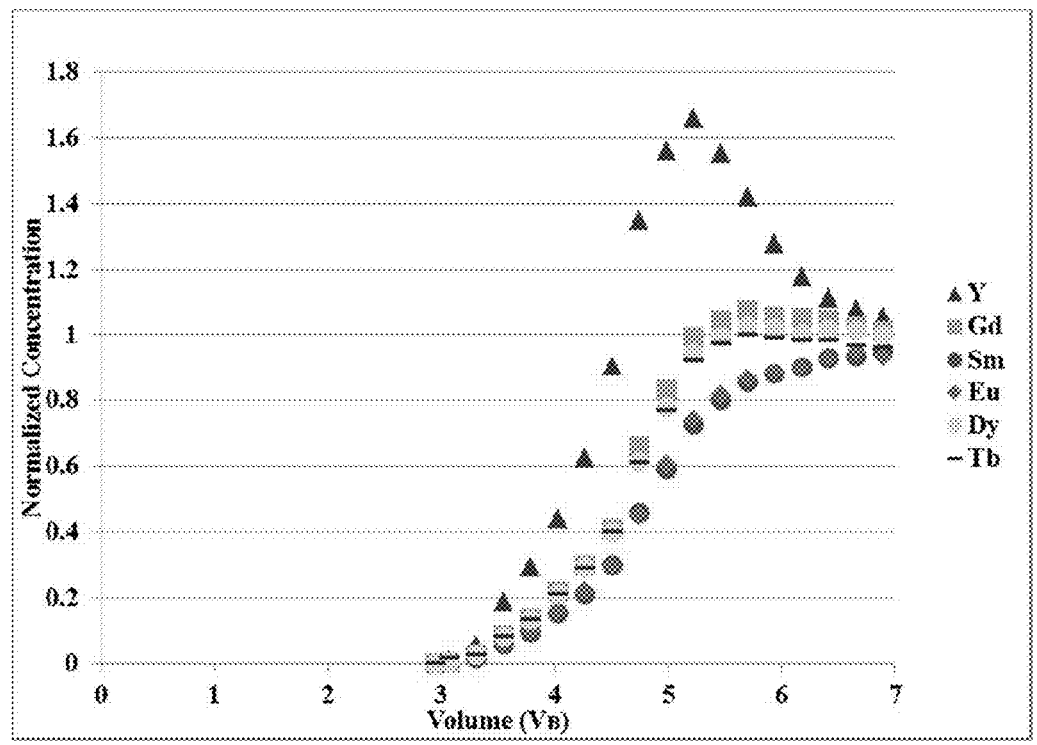
FIG. 35 depicts an Na+ Amberlite IRC748I breakthrough curve (146 mm rare earth, 86 cm$^3$ resin, pH 4, 0.06 vb/min, 30° C.).

Table 6.4 describes the conditions under which the isotherm experiments were performed. FIG. 35 shows loading vs. pH curves. Given this data, separation coefficients can be calculated.

TABLE 6.4

Amberlite IRC748I Isotherm Conditions

| Resin (g) | Feed Solution (ml) | 6M HCl (ml) | D-H$_2$O (ml) | Loading (meq/g) | pH | REO in Solution (mM) |
|---|---|---|---|---|---|---|
| 2.5042 | 50.00 | 0.05 | 4.95 | 3.14 | 5.4 | 7.0 |
| 2.5137 | 50.00 | 0.10 | 4.90 | 3.07 | 5.2 | 8.0 |
| 2.4997 | 50.00 | 0.20 | 4.80 | 2.87 | 4.9 | 11.0 |
| 2.5008 | 50.00 | 0.30 | 4.70 | 2.67 | 4.4 | 14.0 |
| 2.4993 | 50.00 | 0.40 | 4.60 | 2.41 | 3.9 | 18.0 |
| 2.5013 | 50.00 | 0.50 | 4.50 | 2.18 | 3.4 | 21.5 |
| 2.5016 | 50.00 | 0.60 | 4.40 | 1.98 | 3.0 | 24.5 |
| 2.5032 | 50.00 | 0.70 | 4.30 | 1.95 | 2.6 | 25.0 |

Isotherm experiments were carried out in 125 ml polypropylene bottles. Conditioned resin was weighed on an analytical balance. Aliquots of rare earth solution were added using Type-A volumetric pipettes. The rare earth solution used contained equimolar (7.5 mM) amounts of Y, Sm, Eu, Gd, Tb and Dy. The acidity of the isotherms was adjusted using 6 M HCl which was made from analytical grade HCl and D-H$_2$O. Aliquots of acid and D-H$_2$O were added to the isotherm using adjustable volume Eppendorf auto-pipettes. Each isotherm was made to contain the same solution volume and resin weight. Isotherms were agitated on an elliptical shaker for 24 hours before being sampled. Hydronium activity measurements, EDTA titration and ICP-MS analysis were performed on the samples taken. Loading was expressed in units of milliequivalents per gram of resin; an equivalent representing one mole of charge. One mole of a trivalent lanthanide in solution would represent three charge equivalents.

Frontal Analysis

Figure 34:
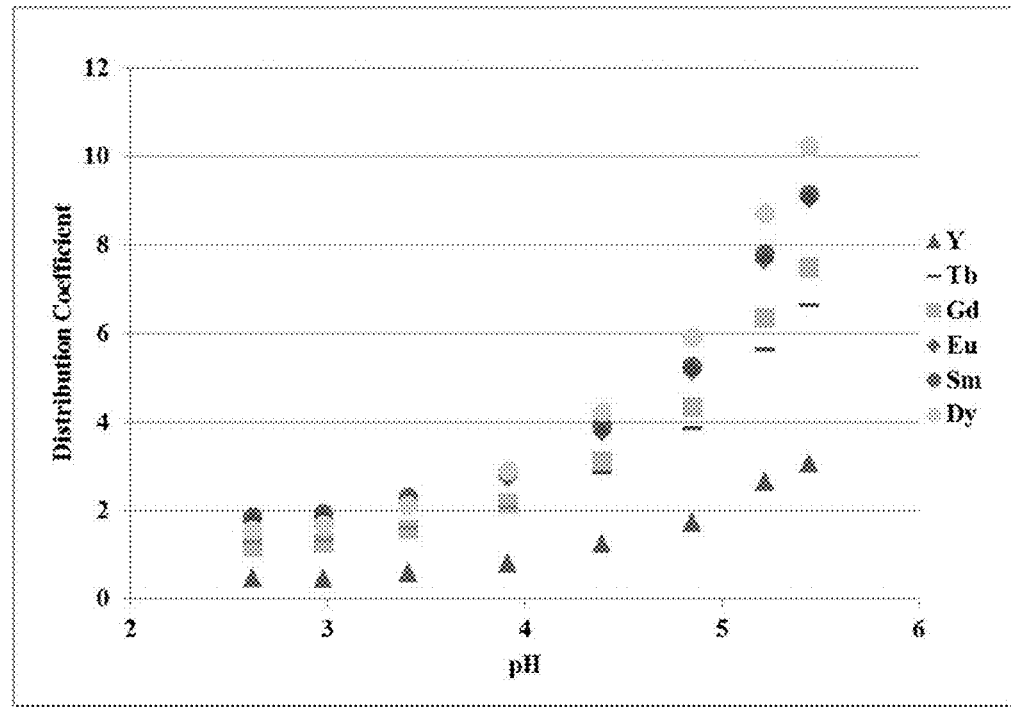
FIG. 34 depicts an Amberlite IRC748I isotherm.

Upon isotherm experiments exhibiting evidence of rare earth selectivity, preliminary frontal analysis chromatography experiments were performed. A solution derived from a Molycorp solvent extraction circuit containing primarily heavy rare earths was used. The makeup of this solution can be seen in Table 6.5. This solution was adjusted to a pH of 4.5 and flowed through an 86 cm3 bed at 0.06 bed volumes per minute (VB/min). The breakthrough curve for IRC748I can be seen in FIG. 34.

TABLE 6.5

Composition of Heavy RE Enriched Feed

| Element | Y | La | Ce | Pr | Nd | Sm | Eu | Tb |
|---|---|---|---|---|---|---|---|---|
| Conc. (mM) | 14.22 | 2.02 | 2.78 | 0.25 | 5.47 | 79.67 | 12.18 | 1.30 |
| % of RE | 9.74% | 1.38% | 1.91% | 0.17% | 3.75% | 54.57% | 8.34% | 0.89% |

| Element | Gd | Dy | Ho | Er | Tm | Yb | Lu | Total |
|---|---|---|---|---|---|---|---|---|
| Conc. (mM) | 21.89 | 4.35 | 0.63 | 1.02 | 0.05 | 0.10 | 0.06 | 146.0 |
| % of RE | 14.99% | 2.98% | 0.43% | 0.70% | 0.03% | 0.07% | 0.04% | 100.00% |

Although the present disclosure has been described with a certain degree of particularity, it is understood the disclosure has been made by way of example, and changes in detail or structure may be made without departing from the spirit of the disclosure as defined in the appended claims.

Following are a tables describing experimental conditions and selected data for many of FIGS. 6-29.

TABLE A1

EXPERIMENTAL CONDITIONS AND DATA FOR AMBERLITE IRC748I ISOTHERMS

Experimental Conditions

| | |
|---|---|
| Temperature | 25° C. |
| Reaction Time | 24 hr |
| Weight of Resin | 2.5 g |

Distribution Coefficient Data

| pH | Y | Gd | Sm | Tb | Eu | Dy |
|---|---|---|---|---|---|---|
| | | | Distribution Coefficient (k) | | | |
| 5.4 | 3.09 | 7.49 | 9.14 | 6.62 | 9.03 | 10.22 |
| 5.2 | 2.66 | 6.35 | 7.81 | 5.63 | 7.65 | 8.71 |
| 4.9 | 1.75 | 4.34 | 5.25 | 3.85 | 5.16 | 5.90 |
| 4.4 | 1.27 | 3.12 | 3.91 | 2.85 | 3.76 | 4.22 |
| 3.9 | 0.81 | 2.16 | 2.88 | 2.08 | 2.75 | 2.90 |
| 3.4 | 0.61 | 1.59 | 2.29 | 1.61 | 2.15 | 2.12 |
| 3.0 | 0.47 | 1.27 | 1.93 | 1.33 | 1.81 | 1.67 |
| 2.6 | 0.50 | 1.19 | 1.86 | 1.28 | 1.75 | 1.56 |

TABLE A2

EXPERIMENTAL CONDITIONS AND DATA FOR AMBERLITE IRC747 ISOTHERMS

Experimental Conditions

| | |
|---|---|
| Temperature | 25° C. |
| Reaction Time | 24 hr |
| Weight of Resin | 2.5 g |

Distribution Coefficient Data

| pH | Y | Gd | Sm | Tb | Eu | Dy |
|---|---|---|---|---|---|---|
| | | | Distribution Coefficient (k) | | | |
| 2.9 | 6.88 | 6.90 | 8.08 | 8.89 | 8.86 | 9.77 |
| 2.6 | 4.42 | 4.28 | 5.08 | 5.47 | 5.44 | 6.03 |
| 2.2 | 3.07 | 3.03 | 3.56 | 3.82 | 3.82 | 4.17 |
| 1.9 | 2.39 | 2.23 | 2.64 | 2.77 | 2.83 | 3.03 |
| 0.5 | 0.64 | 0.70 | 0.87 | 0.75 | 0.88 | 0.75 |

TABLE B1

Figure 6:
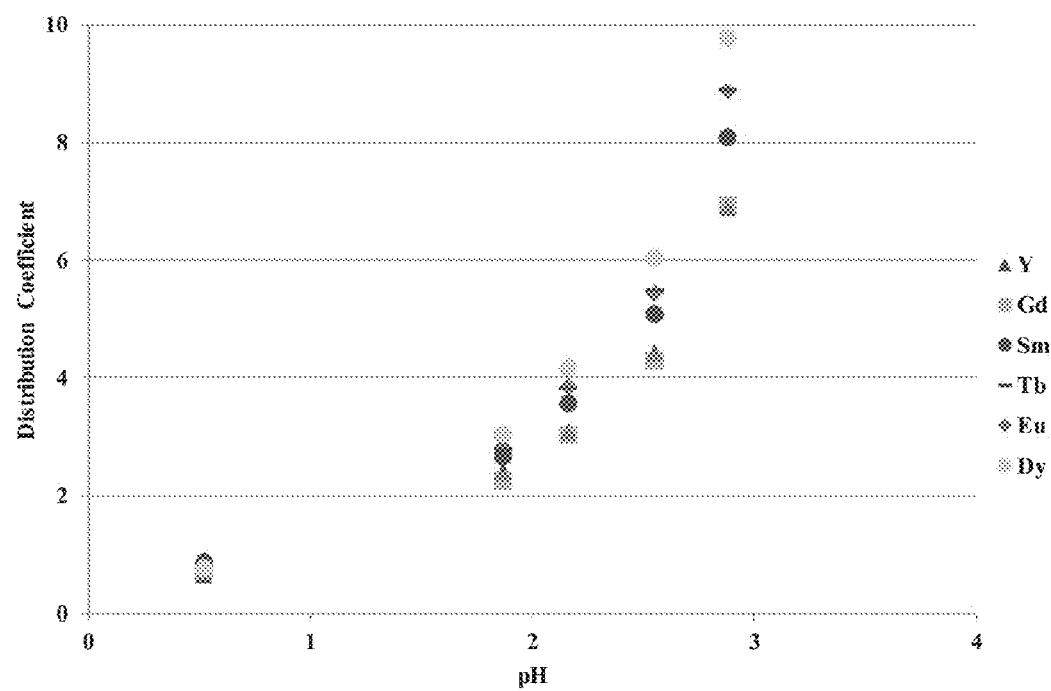
FIG. 6 depicts an Amberlite IRC747 isotherm

EXPERIMENTAL CONDITIONS AND DATA FOR FIG. 6—AMBERLITE IRC747 HEAVY RARE EARTH LOADING CURVE

Experimental Conditions

| | |
|---|---|
| Temperature | 30° C. |
| Flow Rate | 0.06 $V_B$/min |
| Volume of Resin | 86 cm$^3$ |

TABLE B1-continued

EXPERIMENTAL CONDITIONS AND DATA FOR FIG. 6—AMBERLITE IRC747 HEAVY RARE EARTH LOADING CURVE

Distribution Coefficient Data

| $V_B$ | Y | Sm | Eu | Tb | Gd | Dy | Total RE |
|---|---|---|---|---|---|---|---|
| | | | Concentration (mM) | | | | |
| Feed | 14.20 | 79.55 | 12.11 | 1.39 | 21.33 | 4.32 | 146.0 |
| 4.2 | 0.23 | 0.97 | 0.14 | 0.02 | 0.28 | 0.05 | 2.0 |
| 4.4 | 0.34 | 1.53 | 0.22 | 0.02 | 0.43 | 0.08 | 3.0 |
| 4.7 | 0.80 | 3.59 | 0.52 | 0.06 | 1.04 | 0.20 | 7.0 |
| 4.9 | 1.55 | 6.92 | 1.03 | 0.11 | 2.03 | 0.38 | 13.5 |
| 5.2 | 2.28 | 10.72 | 1.56 | 0.17 | 3.05 | 0.57 | 20.5 |
| 5.4 | 3.03 | 14.43 | 2.11 | 0.22 | 4.03 | 0.81 | 27.5 |
| 5.7 | 4.17 | 16.47 | 2.40 | 0.31 | 4.58 | 1.13 | 33.0 |
| 5.9 | 4.77 | 21.19 | 3.07 | 0.36 | 5.82 | 1.31 | 41.0 |
| 6.2 | 5.29 | 26.21 | 3.72 | 0.39 | 7.05 | 1.43 | 49.0 |
| 6.4 | 6.49 | 33.08 | 4.73 | 0.40 | 8.86 | 1.48 | 60.0 |
| 6.7 | 7.86 | 39.86 | 5.66 | 0.58 | 10.75 | 2.11 | 74.0 |
| 6.9 | 9.36 | 46.66 | 6.74 | 0.70 | 12.74 | 2.55 | 87.5 |
| 7.2 | 11.11 | 55.31 | 8.03 | 0.84 | 15.35 | 2.88 | 104.0 |
| 7.4 | 12.45 | 62.73 | 9.09 | 0.87 | 17.44 | 3.25 | 116.5 |
| 7.7 | 13.35 | 67.83 | 9.85 | 1.03 | 18.83 | 3.51 | 127.0 |
| 7.9 | 14.40 | 73.67 | 10.73 | 1.08 | 20.35 | 3.85 | 137.0 |
| 8.1 | 14.45 | 75.64 | 11.08 | 1.17 | 20.84 | 3.93 | 141.0 |
| 8.4 | 14.47 | 76.35 | 11.17 | 1.06 | 20.84 | 3.94 | 140.0 |
| 8.6 | 14.64 | 77.36 | 11.43 | 1.07 | 21.22 | 4.02 | 142.0 |

TABLE B2

Figure 7:
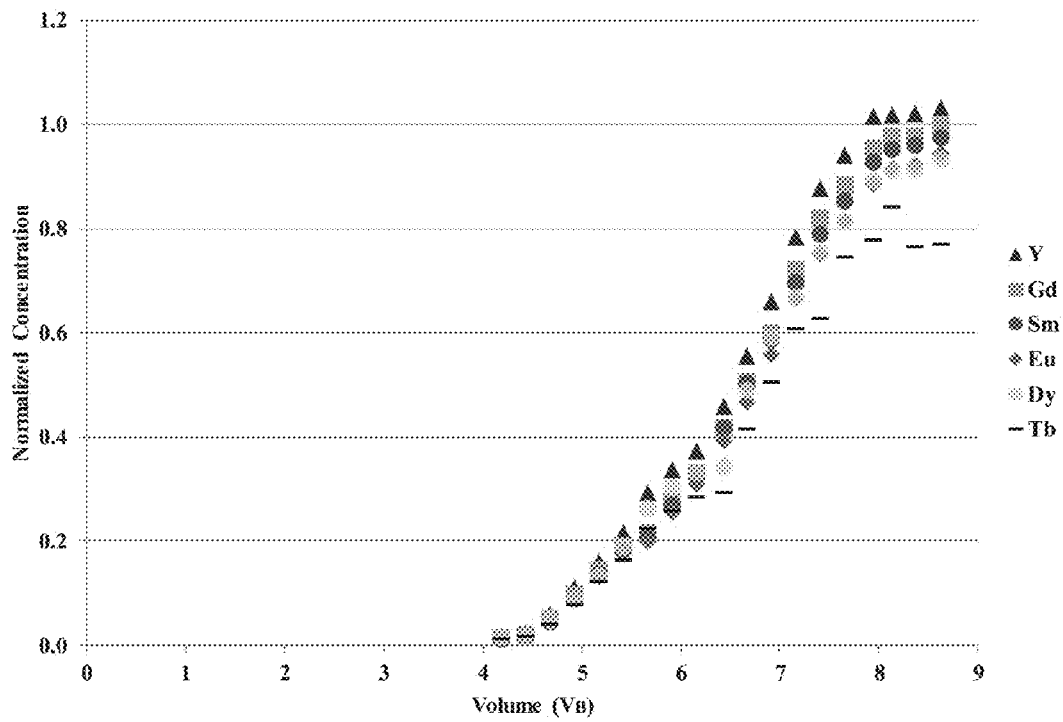
FIG. 7 depicts an Na+ Amberlite IRC747 breakthrough curve (146 mm rare earth, 86 cm$^3$ resin, pH 4, 0.06 vb/min, 30° C.).

EXPERIMENTAL CONDITIONS AND DATA FOR FIG. 7—AMBERLITE IRC748I HEAVY RARE EARTH LOADING CURVE

Experimental Conditions

| | |
|---|---|
| Temperature | 30° C. |
| Flow Rate | 0.06 $V_B$/min |
| Volume of Resin | 86 cm$^3$ |

Distribution Coefficient Data

| $V_B$ | Y | Sm | Eu | Tb | Gd | Dy | Total RE |
|---|---|---|---|---|---|---|---|
| | | | Concentration (mM) | | | | |
| Feed | 14.22 | 79.67 | 12.18 | 1.30 | 21.89 | 4.35 | 146.0 |
| 3.0 | 0.00 | 0.00 | 0.00 | 0.00 | 0.00 | 0.00 | 0.0 |
| 3.1 | 0.14 | 0.28 | 0.04 | 0.02 | 0.10 | 0.02 | 2.0 |
| 3.3 | 0.82 | 1.45 | 0.23 | 0.04 | 0.56 | 0.11 | 6.0 |
| 3.6 | 2.69 | 4.61 | 0.73 | 0.11 | 1.84 | 0.36 | 13.5 |
| 3.8 | 4.21 | 7.50 | 1.19 | 0.18 | 2.99 | 0.58 | 23.5 |
| 4.0 | 6.29 | 12.13 | 1.91 | 0.28 | 4.74 | 0.92 | 35.0 |
| 4.3 | 8.92 | 16.87 | 2.65 | 0.38 | 6.51 | 1.27 | 47.0 |
| 4.5 | 12.91 | 23.79 | 3.60 | 0.52 | 8.94 | 1.74 | 63.5 |
| 4.7 | 19.23 | 36.42 | 5.49 | 0.79 | 14.38 | 2.67 | 95.0 |
| 5.0 | 22.23 | 47.02 | 7.34 | 1.00 | 18.26 | 3.38 | 118.0 |
| 5.2 | 23.66 | 57.77 | 9.01 | 1.21 | 21.77 | 4.12 | 133.0 |
| 5.5 | 22.12 | 63.73 | 9.92 | 1.27 | 22.85 | 4.34 | 140.0 |
| 5.7 | 20.22 | 68.06 | 10.55 | 1.31 | 23.55 | 4.48 | 144.0 |
| 5.9 | 18.19 | 70.15 | 10.79 | 1.29 | 23.11 | 4.45 | 143.5 |
| 6.2 | 16.78 | 71.70 | 10.99 | 1.28 | 23.04 | 4.37 | 143.0 |
| 6.4 | 15.87 | 74.06 | 11.34 | 1.29 | 22.91 | 4.43 | 144.5 |
| 6.7 | 15.35 | 74.74 | 11.48 | 1.27 | 22.49 | 4.42 | 144.0 |
| 6.9 | 15.04 | 75.68 | 11.43 | 1.26 | 22.23 | 4.36 | 144.0 |
| 7.1 | 14.81 | 76.43 | 11.64 | 1.25 | 22.09 | 4.36 | 144.5 |

TABLE B3

Figure 8:
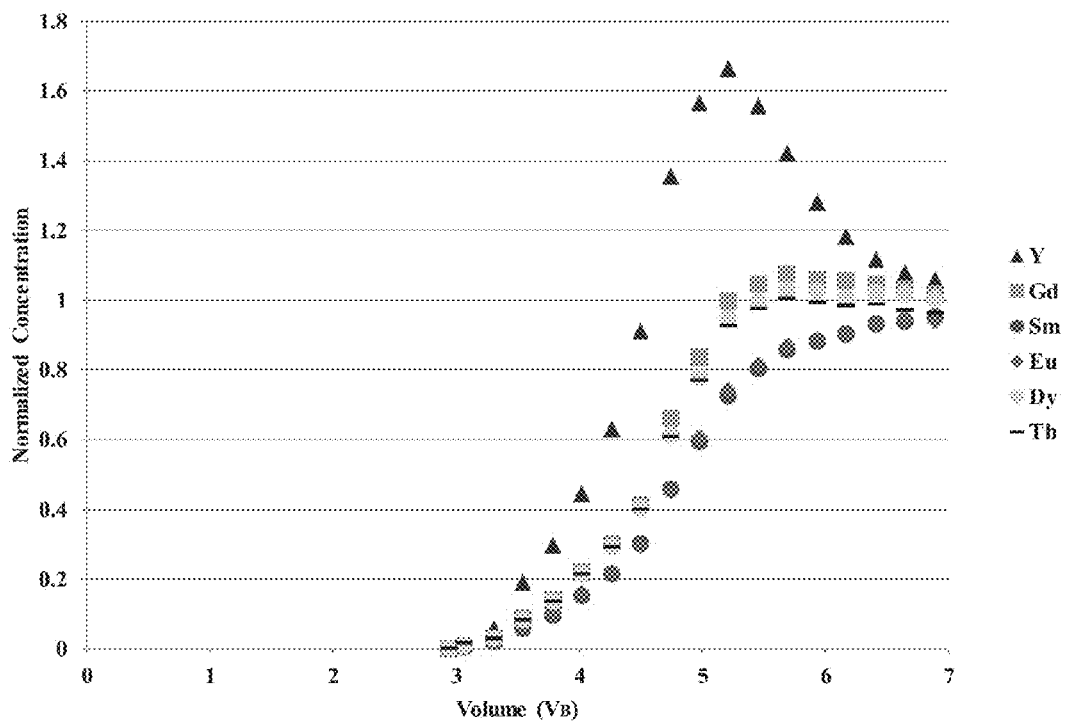
FIG. 8 depicts an Na+ Amberlite IRC748I breakthrough curve (146 mm rare earth, 86 cm$^3$ resin, pH 4, 0.06 vb/min, 30° C.).

EXPERIMENTAL CONDITIONS AND SELECTED DATA FOR FIG. 8—AMBERLITE IRC748I HEAVY RARE EARTH LOADING CURVE

Experimental Conditions

| | |
|---|---|
| Temperature | 30° C. |
| Flow Rate | 0.06 $V_B$/min |
| Volume of Resin | 90 cm³ |

Distribution Coefficient Data

| $V_B$ | Y | Sm | Eu | Tb | Gd | Dy | Total RE |
|---|---|---|---|---|---|---|---|
| | | | Concentration (mM) | | | | |
| Feed | 8.76 | 8.74 | 8.77 | 8.37 | 8.65 | 8.61 | 52.0 |
| 1.9 | 0.36 | 0.22 | 0.22 | 0.23 | 0.24 | 0.23 | 1.5 |
| 2.2 | 0.71 | 0.44 | 0.43 | 0.50 | 0.47 | 0.45 | 3.0 |
| 2.5 | 1.20 | 0.71 | 0.72 | 0.83 | 0.79 | 0.76 | 5.0 |
| 2.7 | 2.09 | 1.22 | 1.19 | 1.39 | 1.32 | 1.29 | 8.5 |
| 3.0 | 2.90 | 1.60 | 1.59 | 1.85 | 1.79 | 1.77 | 11.5 |
| 3.3 | 3.92 | 2.13 | 2.13 | 2.50 | 2.43 | 2.39 | 15.5 |
| 3.6 | 4.59 | 2.46 | 2.48 | 2.89 | 2.81 | 2.78 | 18.0 |
| 3.9 | 5.33 | 2.88 | 2.90 | 3.38 | 3.26 | 3.25 | 21.0 |
| 4.2 | 5.84 | 3.24 | 3.29 | 3.81 | 3.70 | 3.62 | 23.5 |
| 4.5 | 6.12 | 3.50 | 3.52 | 4.05 | 3.94 | 3.87 | 25.0 |
| 4.8 | 6.54 | 3.90 | 3.92 | 4.50 | 4.37 | 4.28 | 27.5 |
| 5.0 | 6.63 | 4.07 | 4.12 | 4.71 | 4.54 | 4.44 | 28.5 |
| 5.3 | 7.06 | 4.40 | 4.45 | 5.04 | 4.83 | 4.72 | 30.5 |
| 5.6 | 7.11 | 4.69 | 4.75 | 5.31 | 5.14 | 4.99 | 32.0 |
| 5.9 | 7.24 | 4.92 | 4.93 | 5.45 | 5.28 | 5.18 | 33.0 |
| 6.2 | 7.31 | 5.13 | 5.16 | 5.63 | 5.49 | 5.27 | 34.0 |
| 6.5 | 7.45 | 5.32 | 5.30 | 5.80 | 5.63 | 5.49 | 35.0 |
| 6.8 | 7.52 | 5.41 | 5.43 | 5.91 | 5.69 | 5.55 | 35.5 |
| 7.1 | 7.48 | 5.57 | 5.58 | 5.96 | 5.79 | 5.61 | 36.0 |
| 7.4 | 7.47 | 5.69 | 5.72 | 6.05 | 5.87 | 5.70 | 36.5 |
| 7.6 | 7.55 | 5.87 | 5.87 | 6.24 | 6.07 | 5.90 | 37.5 |
| 7.9 | 7.66 | 5.98 | 5.98 | 6.32 | 6.13 | 5.94 | 38.0 |
| 8.9 | 7.61 | 6.12 | 6.14 | 6.38 | 6.23 | 6.03 | 38.5 |
| 9.5 | 7.74 | 6.30 | 6.28 | 6.55 | 6.43 | 6.20 | 39.5 |
| 10.4 | 7.71 | 6.33 | 6.34 | 6.54 | 6.39 | 6.19 | 39.5 |
| 10.8 | 7.60 | 6.36 | 6.35 | 6.54 | 6.44 | 6.21 | 39.5 |
| 11.8 | 7.83 | 6.56 | 6.54 | 6.68 | 6.55 | 6.33 | 40.5 |
| 13.0 | 7.93 | 6.65 | 6.65 | 6.74 | 6.65 | 6.38 | 41.0 |
| 13.4 | 7.95 | 6.71 | 6.70 | 6.88 | 6.78 | 6.49 | 41.5 |
| 14.4 | 7.71 | 6.87 | 6.87 | 7.01 | 6.91 | 6.63 | 42.0 |
| 15.0 | 7.80 | 6.98 | 6.95 | 7.09 | 6.99 | 6.70 | 42.5 |
| 16.2 | 7.98 | 7.02 | 7.04 | 7.16 | 7.04 | 6.75 | 43.0 |
| 16.7 | 7.89 | 6.93 | 6.93 | 7.09 | 6.93 | 6.72 | 42.5 |
| 17.6 | 8.16 | 7.20 | 7.18 | 7.32 | 7.19 | 6.95 | 44.0 |
| 18.8 | 8.13 | 7.30 | 7.27 | 7.43 | 7.30 | 7.06 | 44.5 |
| 19.5 | 8.15 | 7.34 | 7.27 | 7.42 | 7.30 | 7.02 | 44.5 |
| 20.6 | 8.43 | 7.58 | 7.54 | 7.67 | 7.53 | 7.26 | 46.0 |
| 21.8 | 8.42 | 7.57 | 7.57 | 7.63 | 7.52 | 7.28 | 46.0 |
| 22.4 | 8.44 | 7.68 | 7.63 | 7.73 | 7.60 | 7.41 | 46.5 |
| 23.5 | 8.44 | 7.70 | 7.65 | 7.70 | 7.63 | 7.39 | 46.5 |
| 24.7 | 8.46 | 7.71 | 7.64 | 7.70 | 7.65 | 7.35 | 46.5 |
| 25.2 | 8.56 | 7.87 | 7.82 | 7.90 | 7.78 | 7.56 | 47.5 |
| 26.4 | 8.65 | 7.96 | 7.91 | 7.98 | 7.86 | 7.64 | 48.0 |
| 27.4 | 8.81 | 8.10 | 8.09 | 8.15 | 8.05 | 7.79 | 49.0 |

TABLE B4

Figure 9:
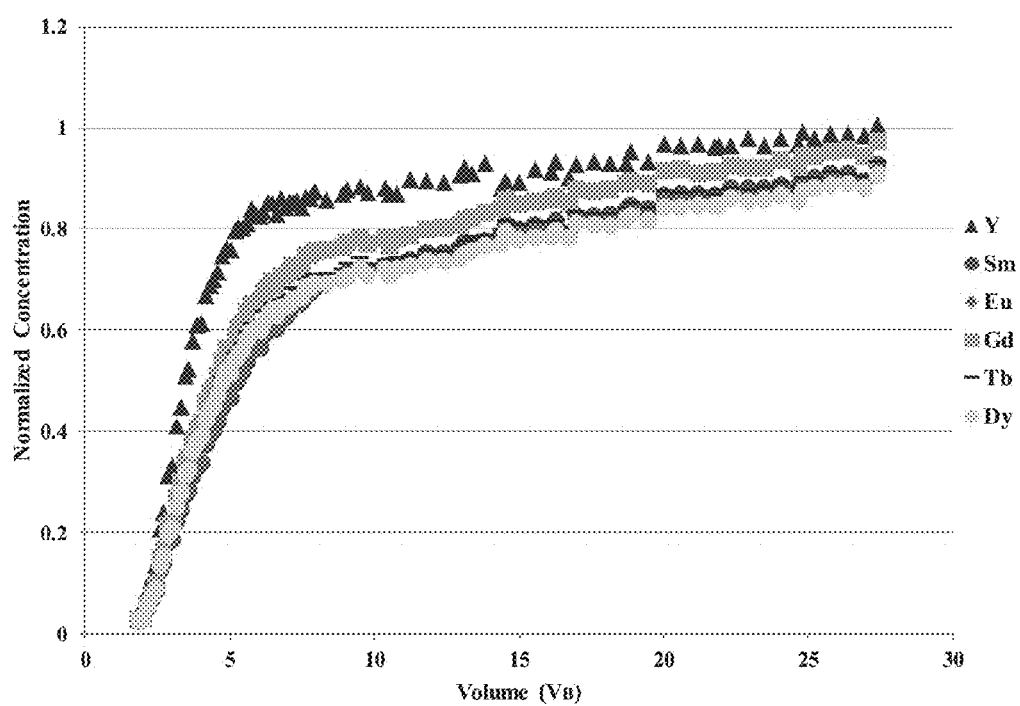
FIG. 9 depicts an Na+ Amberlite IRC748I breakthrough curve (52 mm rare earth, 90 cm$^3$ resin, pH 4, 0.06 vb/min, 30° C.).

EXPERIMENTAL CONDITIONS AND DATA FOR FIG. 9—AMBERLITE IRC748I HEAVY RARE EARTH DESORPTION CURVE

Experimental Conditions

| | | | |
|---|---|---|---|
| Temperature | 30° C. | Eluent | 2M HCl |
| Flow Rate | 0.06 $V_B$/min | | |
| Volume of Resin | 90 cm³ | | |

TABLE B4-continued

EXPERIMENTAL CONDITIONS AND DATA FOR FIG. 9—AMBERLITE IRC748I HEAVY RARE EARTH DESORPTION CURVE

Distribution Coefficient Data

| $V_B$ | Y | Sm | Eu | Gd | Tb | Dy | Total RE |
|---|---|---|---|---|---|---|---|
| | | | Concentration (mM) | | | | |
| 1.2 | 0.07 | 0.09 | 0.08 | 0.08 | 0.10 | 0.08 | 0.5 |
| 1.3 | 0.68 | 0.91 | 0.93 | 1.02 | 0.99 | 0.97 | 5.5 |
| 1.4 | 2.61 | 3.76 | 3.81 | 4.11 | 4.12 | 4.09 | 22.5 |
| 1.6 | 6.79 | 11.05 | 11.03 | 11.62 | 11.96 | 12.05 | 64.5 |
| 1.7 | 11.38 | 21.37 | 21.58 | 21.97 | 23.30 | 23.91 | 123.5 |
| 1.9 | 14.84 | 32.81 | 33.13 | 32.05 | 35.06 | 37.11 | 185.0 |
| 2.0 | 16.23 | 43.70 | 43.58 | 40.19 | 45.67 | 49.14 | 238.5 |
| 2.2 | 15.98 | 52.68 | 53.09 | 45.59 | 54.60 | 60.06 | 282.0 |
| 2.3 | 14.34 | 61.75 | 62.22 | 48.94 | 61.52 | 68.24 | 317.0 |
| 2.5 | 11.97 | 70.01 | 69.46 | 49.49 | 63.77 | 72.29 | 337.0 |
| 2.6 | 9.34 | 62.12 | 61.06 | 41.79 | 54.33 | 60.86 | 289.5 |
| 2.7 | 1.74 | 15.34 | 15.05 | 9.48 | 12.52 | 13.87 | 68.0 |
| 2.9 | 1.14 | 7.88 | 7.75 | 5.22 | 6.87 | 7.65 | 36.5 |
| 3.0 | 0.72 | 4.82 | 4.78 | 3.23 | 4.22 | 4.73 | 22.5 |
| 3.2 | 0.41 | 2.78 | 2.77 | 1.86 | 2.45 | 2.73 | 13.0 |
| 3.3 | 0.29 | 1.94 | 1.90 | 1.30 | 1.69 | 1.88 | 9.0 |
| 3.5 | 0.18 | 1.19 | 1.15 | 0.80 | 1.03 | 1.16 | 5.5 |
| 3.6 | 0.13 | 0.85 | 0.84 | 0.57 | 0.76 | 0.84 | 4.0 |
| 3.8 | 0.13 | 0.85 | 0.84 | 0.57 | 0.76 | 0.84 | 4.0 |
| 3.9 | 0.08 | 0.54 | 0.53 | 0.36 | 0.47 | 0.53 | 2.5 |
| 4.0 | 0.07 | 0.43 | 0.42 | 0.29 | 0.38 | 0.42 | 2.0 |

TABLE B5

Figure 10:
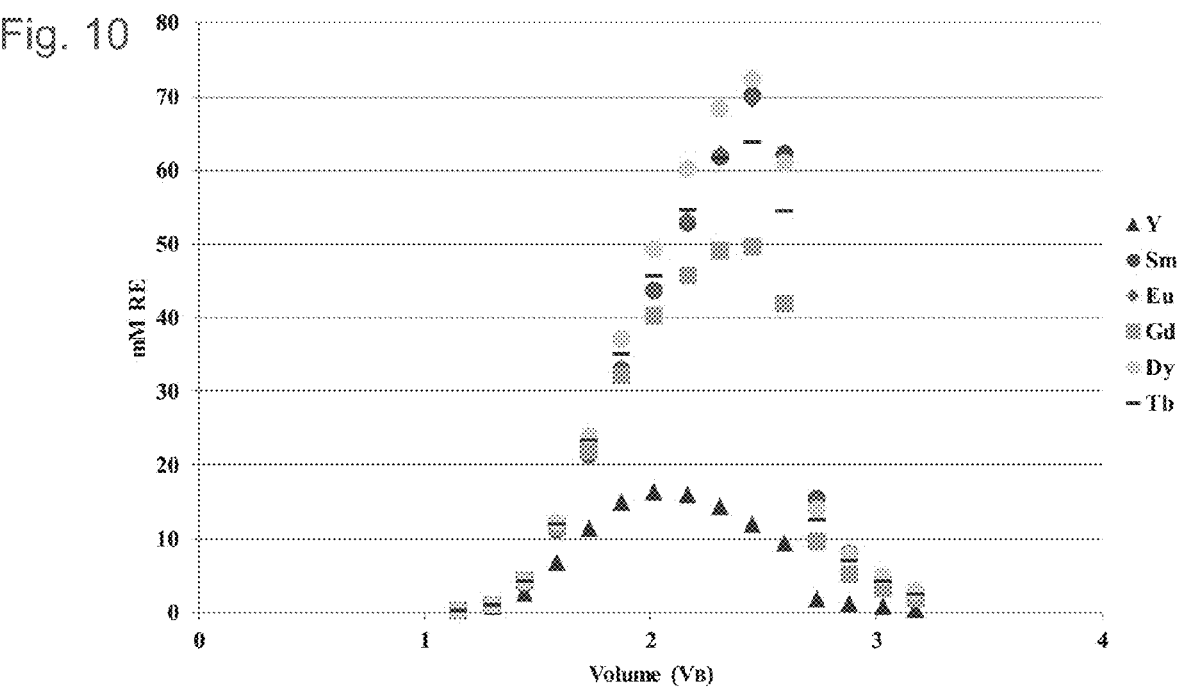
FIG. 10 depicts an Amberlite IRC748I desorption curve (2 m hcl, 0.06 vb/min)

EXPERIMENTAL CONDITIONS AND SELECTED DATA FOR FIG. 10—AMBERLITE IRC748I HEAVY RARE EARTH LOADING CURVE

Experimental Conditions

| | |
|---|---|
| Temperature | 30° C. |
| Flow Rate | 0.06 $V_B$/min |
| Volume of Resin | 90 cm³ |

Distribution Coefficient Data

| $V_B$ | Y | Sm | Eu | Gd | Tb | Dy | Total RE |
|---|---|---|---|---|---|---|---|
| | | | Concentration (mM) | | | | |
| Feed | 8.76 | 8.74 | 8.77 | 8.37 | 8.65 | 8.61 | 52.0 |
| 1.9 | 0.36 | 0.22 | 0.22 | 0.23 | 0.24 | 0.23 | 1.5 |
| 2.2 | 0.71 | 0.44 | 0.43 | 0.50 | 0.47 | 0.45 | 3.0 |
| 2.5 | 1.20 | 0.71 | 0.72 | 0.83 | 0.79 | 0.76 | 5.0 |
| 2.7 | 2.09 | 1.22 | 1.19 | 1.39 | 1.32 | 1.29 | 8.5 |
| 3.0 | 2.90 | 1.60 | 1.59 | 1.85 | 1.79 | 1.77 | 11.5 |
| 3.3 | 3.92 | 2.13 | 2.13 | 2.50 | 2.43 | 2.39 | 15.5 |
| 3.6 | 4.59 | 2.46 | 2.48 | 2.89 | 2.81 | 2.78 | 18.0 |
| 3.9 | 5.33 | 2.88 | 2.90 | 3.38 | 3.26 | 3.25 | 21.0 |
| 4.2 | 5.84 | 3.24 | 3.29 | 3.81 | 3.70 | 3.62 | 23.5 |
| 4.5 | 6.12 | 3.50 | 3.52 | 4.05 | 3.94 | 3.87 | 25.0 |
| 4.8 | 6.54 | 3.90 | 3.92 | 4.50 | 4.37 | 4.28 | 27.5 |
| 5.0 | 6.63 | 4.07 | 4.12 | 4.71 | 4.54 | 4.44 | 28.5 |
| 5.3 | 7.06 | 4.40 | 4.45 | 5.04 | 4.83 | 4.72 | 30.5 |
| 5.6 | 7.11 | 4.69 | 4.75 | 5.31 | 5.14 | 4.99 | 32.0 |
| 5.9 | 7.24 | 4.92 | 4.93 | 5.45 | 5.28 | 5.18 | 33.0 |
| 6.2 | 7.31 | 5.13 | 5.16 | 5.63 | 5.49 | 5.27 | 34.0 |
| 6.5 | 7.45 | 5.32 | 5.30 | 5.80 | 5.63 | 5.49 | 35.0 |
| 6.8 | 7.52 | 5.41 | 5.43 | 5.91 | 5.69 | 5.55 | 35.5 |
| 7.1 | 7.48 | 5.57 | 5.58 | 5.96 | 5.79 | 5.61 | 36.0 |
| 7.4 | 7.47 | 5.69 | 5.72 | 6.05 | 5.87 | 5.70 | 36.5 |
| 7.6 | 7.55 | 5.87 | 5.87 | 6.24 | 6.07 | 5.90 | 37.5 |
| 7.9 | 7.66 | 5.98 | 5.98 | 6.32 | 6.13 | 5.94 | 38.0 |
| 8.9 | 7.61 | 6.12 | 6.14 | 6.38 | 6.23 | 6.03 | 38.5 |
| 9.5 | 7.74 | 6.30 | 6.28 | 6.55 | 6.43 | 6.20 | 39.5 |
| 10.4 | 7.71 | 6.33 | 6.34 | 6.54 | 6.39 | 6.19 | 39.5 |
| 10.8 | 7.60 | 6.36 | 6.35 | 6.54 | 6.44 | 6.21 | 39.5 |
| 11.8 | 7.83 | 6.56 | 6.54 | 6.68 | 6.55 | 6.33 | 40.5 |

TABLE B5-continued

EXPERIMENTAL CONDITIONS AND SELECTED DATA FOR FIG. 10—AMBERLITE IRC748I HEAVY RARE EARTH LOADING CURVE

| | | | | | | |
|---|---|---|---|---|---|---|
| 13.0 | 7.93 | 6.65 | 6.65 | 6.74 | 6.65 | 6.38 | 41.0 |
| 13.4 | 7.95 | 6.71 | 6.70 | 6.88 | 6.78 | 6.49 | 41.5 |
| 14.4 | 7.71 | 6.87 | 6.87 | 7.01 | 6.91 | 6.63 | 42.0 |
| 15.0 | 7.80 | 6.98 | 6.95 | 7.09 | 6.99 | 6.70 | 42.5 |
| 16.2 | 7.98 | 7.02 | 7.04 | 7.16 | 7.04 | 6.75 | 43.0 |
| 16.7 | 7.89 | 6.93 | 6.93 | 7.09 | 6.93 | 6.72 | 42.5 |
| 17.6 | 8.16 | 7.20 | 7.18 | 7.32 | 7.19 | 6.95 | 44.0 |
| 18.8 | 8.13 | 7.30 | 7.27 | 7.43 | 7.30 | 7.06 | 44.5 |
| 19.5 | 8.15 | 7.34 | 7.27 | 7.42 | 7.30 | 7.02 | 44.5 |
| 20.6 | 8.43 | 7.58 | 7.54 | 7.67 | 7.53 | 7.26 | 46.0 |
| 21.8 | 8.42 | 7.57 | 7.57 | 7.63 | 7.52 | 7.28 | 46.0 |
| 22.4 | 8.44 | 7.68 | 7.63 | 7.73 | 7.60 | 7.41 | 46.5 |
| 23.5 | 8.44 | 7.70 | 7.65 | 7.70 | 7.63 | 7.39 | 46.5 |
| 24.7 | 8.46 | 7.71 | 7.64 | 7.70 | 7.65 | 7.35 | 46.5 |
| 25.2 | 8.56 | 7.87 | 7.82 | 7.90 | 7.78 | 7.56 | 47.5 |
| 26.4 | 8.65 | 7.96 | 7.91 | 7.98 | 7.86 | 7.64 | 48.0 |
| 27.4 | 8.81 | 8.10 | 8.09 | 8.15 | 8.05 | 7.79 | 49.0 |

TABLE B6

Figure 11:
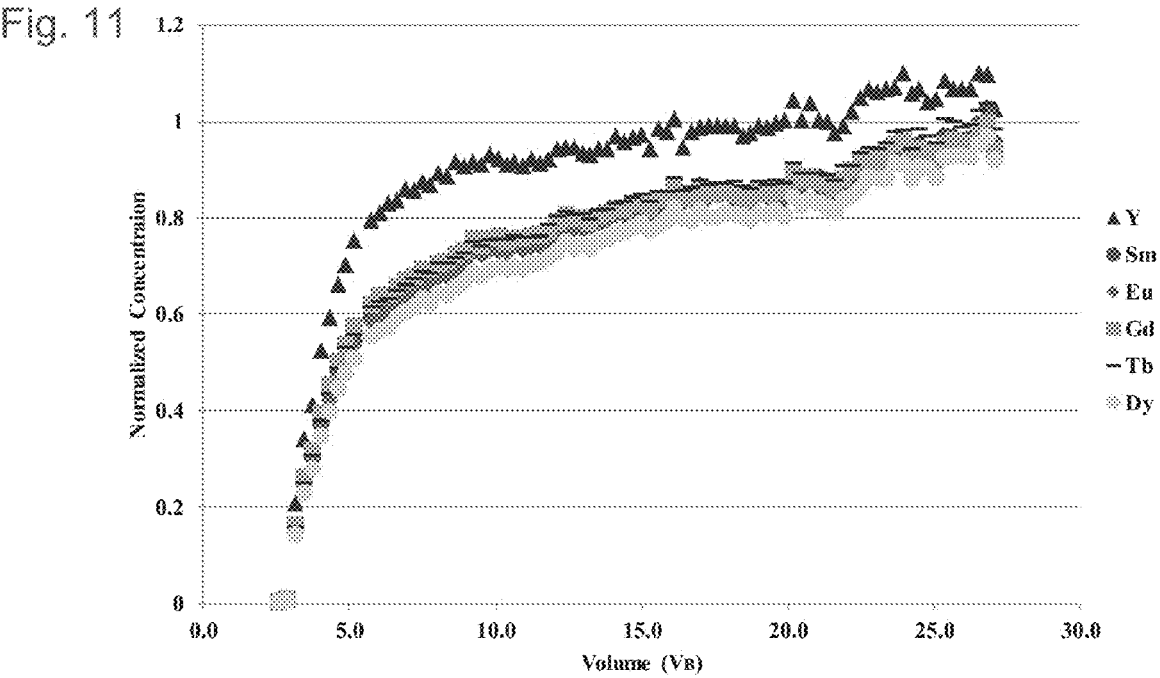
FIG. 11 depicts an Na+ Amberlite IRC748I breakthrough curve (52 mm rare earth, 90 cm$^3$ resin, pH 4, 0.06 vb/min, 70° C.).

EXPERIMENTAL CONDITIONS AND DATA FOR FIG. 11—AMBERLITE IRC748I HEAVY EARTH DESORPTION CURVE

Experimental Conditions

| | | | |
|---|---|---|---|
| Temperature | 70° C. | Eluent | 2M HCl |
| Flow Rate | 0.06 $V_B$/min | | |
| Volume of Resin | 90 cm³ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 1.2 | 0.12 | 0.24 | 0.14 | 0.17 | 0.17 | 0.16 | 1.0 |
| 1.3 | 0.62 | 3.38 | 1.48 | 1.54 | 1.76 | 1.72 | 10.5 |
| 1.4 | 4.35 | 6.35 | 6.40 | 6.69 | 6.80 | 6.92 | 37.5 |
| 1.6 | 9.45 | 15.23 | 15.34 | 15.65 | 16.29 | 16.54 | 88.5 |
| 1.7 | 14.09 | 25.75 | 26.09 | 25.91 | 27.56 | 28.60 | 148.0 |
| 1.9 | 17.19 | 37.94 | 37.14 | 35.47 | 39.16 | 41.10 | 208.0 |
| 2.0 | 18.40 | 47.57 | 47.52 | 42.90 | 49.72 | 53.39 | 259.5 |
| 2.2 | 18.26 | 55.22 | 55.63 | 47.47 | 58.45 | 64.47 | 299.5 |
| 2.3 | 18.21 | 64.17 | 65.05 | 52.12 | 67.56 | 76.39 | 343.5 |
| 2.5 | 16.90 | 73.29 | 75.18 | 54.92 | 76.19 | 88.01 | 384.5 |
| 2.6 | 13.80 | 66.72 | 68.13 | 48.21 | 68.45 | 79.18 | 344.5 |
| 2.7 | 3.59 | 21.21 | 20.83 | 14.04 | 20.28 | 24.05 | 104.0 |
| 2.9 | 0.86 | 5.06 | 5.20 | 3.38 | 5.04 | 5.96 | 25.5 |
| 3.0 | 0.28 | 1.59 | 1.62 | 1.07 | 1.58 | 1.87 | 8.0 |

TABLE C1

Figure 13:
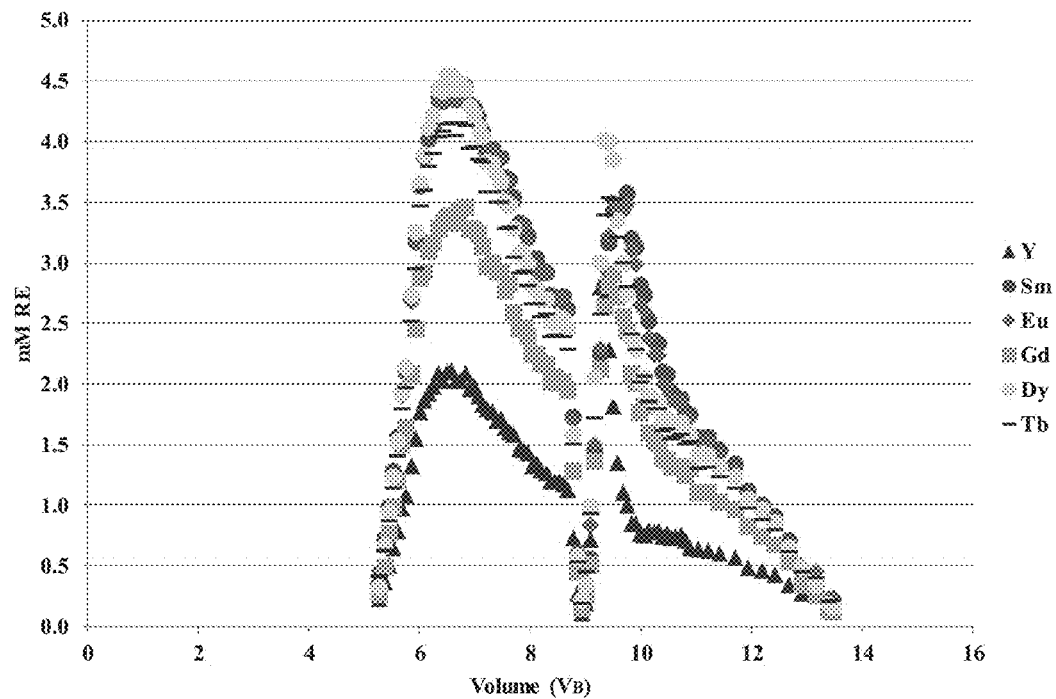
FIG. 13 depicts an Amberlite IRC748I chromatogram (150 cm$^3$ loading section, 450 cm$^3$ separation section, 0.1 m hcl, 0.01 vb/min, 30° C.).

EXPERIMENTAL CONDITIONS AND SELECTED DATA FOR FIG. 13—AMBERLITE IRC748I ELUTION CHROMATOGRAPH

Experimental Conditions

| | | | |
|---|---|---|---|
| Temperature | 30° C. | Eluent | 0.1M HCl |
| Flow Rate | 0.01 $V_B$/min | | |
| Volume of Resin | 600 cm³ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 5.3 | 0.23 | 0.34 | 0.46 | 0.26 | 0.41 | 0.31 | 2.0 |
| 5.4 | 0.51 | 0.98 | 0.95 | 0.76 | 0.87 | 0.93 | 5.0 |
| 5.6 | 0.78 | 1.55 | 1.53 | 1.20 | 1.41 | 1.53 | 8.0 |
| 5.8 | 1.08 | 2.10 | 2.09 | 1.64 | 1.96 | 2.13 | 11.0 |
| 5.9 | 1.54 | 3.16 | 3.15 | 2.45 | 2.94 | 3.25 | 16.5 |
| 6.1 | 1.86 | 3.87 | 3.86 | 2.92 | 3.59 | 3.88 | 20.0 |
| 6.3 | 1.97 | 4.12 | 4.14 | 3.16 | 3.90 | 4.21 | 21.5 |
| 6.4 | 2.03 | 4.32 | 4.32 | 3.32 | 4.08 | 4.42 | 22.5 |
| 6.6 | 2.10 | 4.41 | 4.42 | 3.38 | 4.15 | 4.54 | 23.0 |
| 6.7 | 2.03 | 4.46 | 4.46 | 3.42 | 4.15 | 4.48 | 23.0 |
| 6.9 | 1.95 | 4.29 | 4.26 | 3.27 | 3.94 | 4.28 | 22.0 |
| 7.1 | 1.90 | 4.20 | 4.21 | 3.23 | 3.85 | 4.11 | 21.5 |
| 7.2 | 1.78 | 3.91 | 3.93 | 2.97 | 3.58 | 3.83 | 20.0 |
| 7.4 | 1.70 | 3.86 | 3.81 | 2.93 | 3.49 | 3.71 | 19.5 |
| 7.6 | 1.64 | 3.70 | 3.63 | 2.76 | 3.27 | 3.50 | 18.5 |
| 7.7 | 1.58 | 3.54 | 3.48 | 2.59 | 3.05 | 3.27 | 17.5 |
| 7.9 | 1.45 | 3.30 | 3.29 | 2.45 | 2.93 | 3.08 | 16.5 |
| 8.0 | 1.32 | 3.03 | 2.96 | 2.24 | 2.66 | 2.80 | 15.0 |
| 8.2 | 1.28 | 2.93 | 2.89 | 2.16 | 2.55 | 2.69 | 14.5 |
| 8.4 | 1.19 | 2.72 | 2.70 | 2.01 | 2.38 | 2.50 | 13.5 |
| 8.5 | 1.19 | 2.70 | 2.69 | 2.00 | 2.38 | 2.53 | 13.5 |
| 8.7 | 1.12 | 2.61 | 2.59 | 1.94 | 2.28 | 2.45 | 13.0 |
| 8.9 | 0.27 | 0.60 | 0.59 | 0.45 | 0.53 | 0.57 | 3.0 |
| 9.0 | 0.18 | 0.32 | 0.46 | 0.25 | 0.45 | 0.34 | 2.0 |
| 9.2 | 1.45 | 1.44 | 1.49 | 1.35 | 1.72 | 2.05 | 9.5 |
| 9.3 | 2.72 | 2.8 | 2.94 | 2.64 | 3.4 | 4.00 | 18.5 |
| 9.5 | 1.81 | 3.42 | 3.50 | 2.91 | 3.52 | 3.85 | 19.0 |
| 9.7 | 1.10 | 3.45 | 3.45 | 2.55 | 2.99 | 2.98 | 16.5 |
| 9.8 | 0.85 | 3.19 | 3.10 | 2.09 | 2.41 | 2.37 | 14.0 |
| 10.0 | 0.76 | 2.81 | 2.64 | 1.76 | 2.01 | 2.01 | 12.0 |
| 10.2 | 0.78 | 2.52 | 2.37 | 1.59 | 1.85 | 1.89 | 11.0 |
| 10.3 | 0.78 | 2.33 | 2.24 | 1.51 | 1.79 | 1.85 | 10.5 |
| 10.5 | 0.76 | 2.07 | 1.97 | 1.37 | 1.62 | 1.71 | 9.5 |
| 10.7 | 0.73 | 1.90 | 1.85 | 1.31 | 1.56 | 1.65 | 9.0 |
| 10.8 | 0.70 | 1.77 | 1.72 | 1.24 | 1.50 | 1.58 | 8.5 |
| 11.1 | 0.63 | 1.55 | 1.52 | 1.10 | 1.30 | 1.40 | 7.5 |
| 11.4 | 0.60 | 1.45 | 1.40 | 1.02 | 1.22 | 1.30 | 7.0 |
| 12.0 | 0.48 | 1.11 | 1.08 | 0.81 | 0.98 | 1.04 | 5.5 |
| 12.4 | 0.42 | 0.90 | 0.87 | 0.67 | 0.79 | 0.85 | 4.5 |
| 12.9 | 0.27 | 0.47 | 0.51 | 0.34 | 0.44 | 0.48 | 2.5 |
| 13.4 | 0.13 | 0.16 | 0.22 | 0.12 | 0.20 | 0.17 | 1.0 |

TABLE D1

Figure 14:
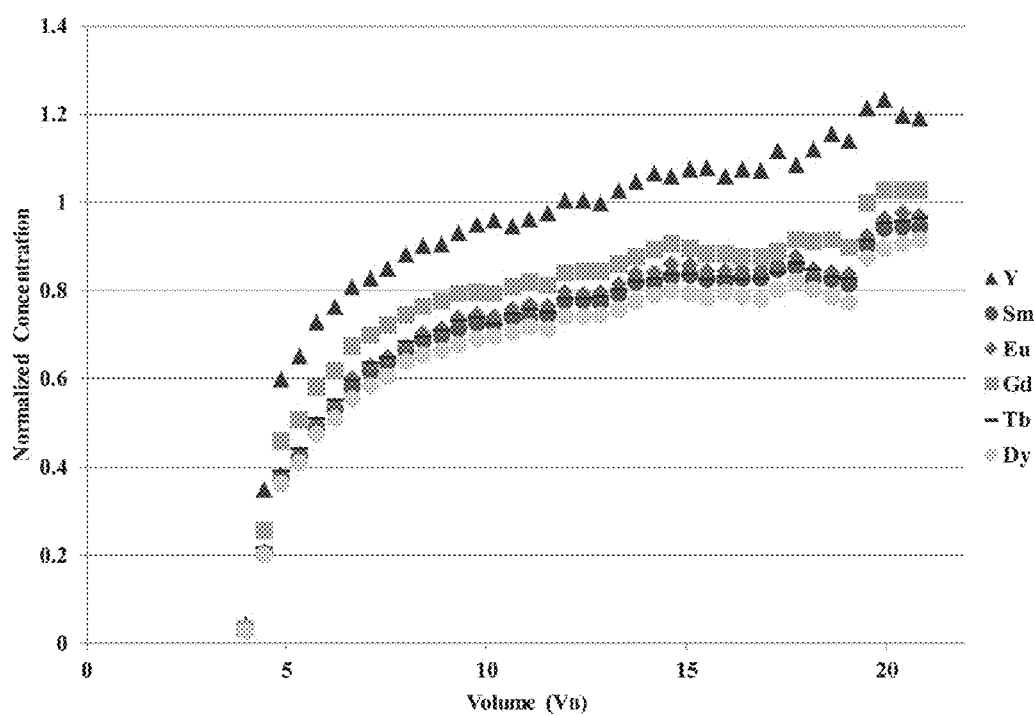
FIG. 14 depicts an Na+ Amberlite IRC748I breakthrough curve; column 1 (50 mm rare earth, 150 cm$^3$ resin, pH 4, 0.03 vb/min, 30° C.).

EXPERIMENTAL CONDITIONS AND SELECTED DATA FOR FIG. 14—AMBERLITE IRC748I COLUMN 1 LOADING

Experimental Conditions

| | | | |
|---|---|---|---|
| Temperature | 30° C. | Feed pH | 4.0 |
| Flow Rate | 0.03 $V_B$/min | | |
| Volume of Resin | 150 cm³ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| Feed | 8.54 | 8.57 | 8.21 | 8.21 | 8.45 | 8.52 | 50.5 |
| 4.0 | 0.37 | 0.22 | 0.21 | 0.27 | 0.22 | 0.21 | 1.5 |
| 4.9 | 5.11 | 3.17 | 3.11 | 3.75 | 3.29 | 3.07 | 21.5 |
| 5.8 | 6.20 | 4.16 | 4.06 | 4.76 | 4.29 | 4.03 | 27.5 |
| 6.7 | 6.89 | 4.95 | 4.90 | 5.53 | 5.02 | 4.72 | 32.0 |
| 7.5 | 7.26 | 5.43 | 5.30 | 5.91 | 5.45 | 5.15 | 34.5 |
| 8.4 | 7.68 | 5.87 | 5.76 | 6.26 | 5.88 | 5.56 | 37.0 |
| 9.3 | 7.94 | 6.10 | 6.04 | 6.51 | 6.16 | 5.76 | 38.5 |
| 10.2 | 8.18 | 6.20 | 6.08 | 6.51 | 6.12 | 5.92 | 39.0 |
| 11.1 | 8.23 | 6.32 | 6.27 | 6.71 | 6.38 | 6.11 | 40.0 |
| 12.0 | 8.57 | 6.63 | 6.52 | 6.89 | 6.59 | 6.29 | 41.5 |
| 12.9 | 8.50 | 6.62 | 6.53 | 6.91 | 6.61 | 6.32 | 41.5 |
| 13.8 | 8.93 | 6.98 | 6.86 | 7.19 | 6.93 | 6.60 | 43.5 |
| 14.7 | 9.04 | 7.12 | 7.06 | 7.42 | 7.07 | 6.80 | 44.5 |
| 15.5 | 9.19 | 7.05 | 6.91 | 7.23 | 6.94 | 6.66 | 44.0 |

TABLE D1-continued

EXPERIMENTAL CONDITIONS AND SELECTED DATA FOR FIG. 14—AMBERLITE IRC748I COLUMN 1 LOADING

| | | | | | | | |
|---|---|---|---|---|---|---|---|
| 16.4 | 9.17  | 7.08 | 6.93 | 7.18 | 6.96 | 6.68 | 44.0 |
| 17.3 | 9.52  | 7.24 | 7.05 | 7.28 | 7.09 | 6.82 | 45.0 |
| 18.2 | 9.55  | 7.07 | 6.94 | 7.47 | 7.14 | 6.83 | 45.0 |
| 19.1 | 9.73  | 6.96 | 6.87 | 7.37 | 6.99 | 6.59 | 44.5 |
| 20.0 | 10.52 | 8.04 | 7.89 | 8.42 | 8.03 | 7.61 | 50.5 |
| 20.9 | 10.16 | 8.07 | 7.94 | 8.41 | 8.12 | 7.79 | 50.5 |

TABLE D2

Figure 15:
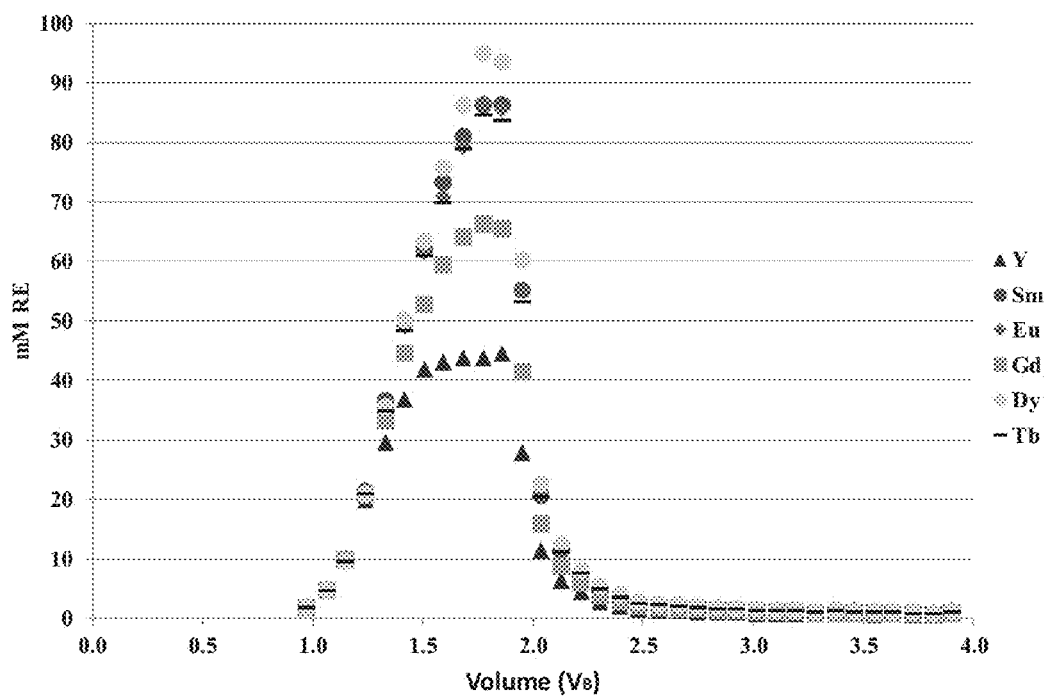
FIG. 15 depicts an Amberlite IRC748I desorption curve (column 1, 2 m hcl, 0.03 vb/min).

EXPERIMENTAL CONDITIONS AND SELECTED DATA FOR FIG. 15—AMBERLITE IRC748I COLUMN 1 DESORPTION

Experimental Conditions

| | | | |
|---|---|---|---|
| Temperature | 30° C. | Eluent | 2M HCl |
| Flow Rate | 0.03 $V_g$/min | | |
| Volumn of Resin | 150 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 1.0 | 1.81  | 1.65  | 1.60  | 1.69  | 1.63  | 1.62  | 10.0  |
| 1.1 | 4.87  | 4.56  | 4.47  | 4.56  | 4.57  | 4.47  | 27.5  |
| 1.2 | 9.82  | 9.60  | 9.60  | 9.55  | 9.49  | 9.45  | 57.5  |
| 1.2 | 19.89 | 21.25 | 20.89 | 20.39 | 20.77 | 20.80 | 124.0 |
| 1.3 | 29.37 | 36.44 | 35.22 | 33.08 | 34.83 | 35.58 | 204.5 |
| 1.4 | 36.65 | 50.07 | 49.00 | 44.39 | 48.37 | 50.02 | 278.5 |
| 1.5 | 41.69 | 61.82 | 61.44 | 52.62 | 60.74 | 63.19 | 341.5 |
| 1.6 | 42.86 | 73.03 | 70.82 | 59.47 | 69.80 | 75.52 | 391.5 |
| 1.7 | 43.72 | 80.97 | 79.11 | 64.00 | 78.63 | 86.07 | 432.5 |
| 1.8 | 43.66 | 86.28 | 86.50 | 66.22 | 84.58 | 94.76 | 462.0 |
| 1.9 | 44.31 | 86.28 | 85.48 | 65.50 | 83.43 | 93.51 | 458.5 |
| 2.0 | 27.68 | 54.97 | 55.11 | 41.30 | 53.22 | 60.23 | 292.5 |
| 2.0 | 11.25 | 20.54 | 20.82 | 15.64 | 20.27 | 22.48 | 111.0 |
| 2.1 | 6.32  | 11.24 | 11.49 | 8.56  | 11.18 | 12.20 | 61.0  |
| 2.2 | 4.24  | 7.47  | 7.62  | 5.70  | 7.40  | 8.07  | 40.5  |
| 2.3 | 2.74  | 4.72  | 4.92  | 3.69  | 4.75  | 5.18  | 26.0  |
| 2.4 | 1.99  | 3.49  | 3.61  | 2.70  | 3.47  | 3.75  | 19.0  |
| 2.5 | 1.40  | 2.47  | 2.59  | 1.92  | 2.49  | 2.63  | 13.5  |
| 2.6 | 1.19  | 2.13  | 2.22  | 1.64  | 2.11  | 2.22  | 11.5  |
| 2.7 | 1.20  | 2.02  | 2.14  | 1.54  | 2.00  | 2.10  | 11.0  |
| 2.8 | 1.05  | 1.74  | 1.85  | 1.32  | 1.73  | 1.81  | 9.5   |
| 2.8 | 0.98  | 1.56  | 1.64  | 1.17  | 1.55  | 1.60  | 8.5   |
| 2.9 | 0.90  | 1.47  | 1.57  | 1.11  | 1.46  | 1.50  | 8.0   |
| 3.0 | 0.79  | 1.28  | 1.37  | 0.96  | 1.27  | 1.32  | 7.0   |

TABLE D3

Figure 16:
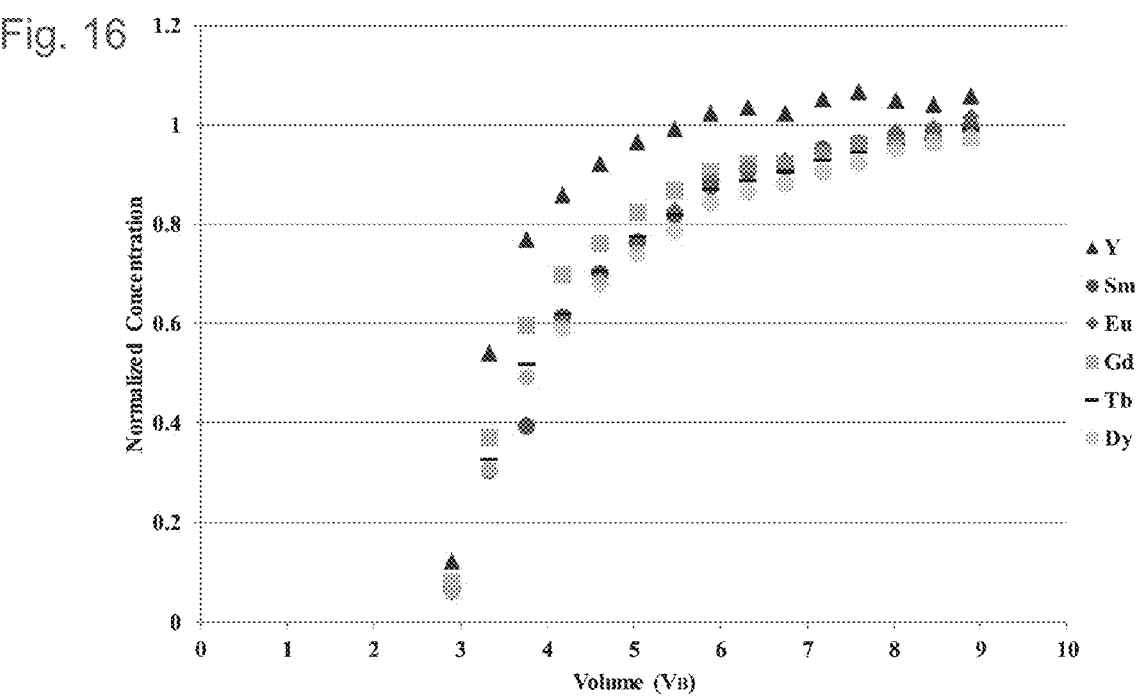
FIG. 16 depicts an Na+ Amberlite IRC748I breakthrough curve; column 2 (150 mm rare earth, 150 cm$^3$ resin, pH 4, 0.03 vb/min, 30° C.).

EXPERIMENTAL CONDITIONS AND SELECTED DATA FOR FIG. 16—AMBERLITE IRC748I COLUMN 2 LOADING

Experimental Conditions

| | | | |
|---|---|---|---|
| Temperature | 30° C. | Feed pH | 4.0 |
| Flow Rate | 0.03 $V_g$/min | | |
| Volumn of Resin | 150 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| Feed | 24.95 | 25.02 | 23.98 | 23.99 | 24.67 | 24.90 | 147.5 |
| 2.9 | 3.04  | 1.49  | 1.47  | 1.84  | 1.63  | 1.53  | 11.0  |
| 3.3 | 13.47 | 7.55  | 7.42  | 8.89  | 8.05  | 7.63  | 53.0  |
| 3.8 | 19.18 | 9.80  | 11.76 | 14.27 | 12.74 | 12.24 | 80.0  |
| 4.2 | 21.38 | 15.29 | 14.66 | 16.70 | 15.28 | 14.70 | 98.0  |

TABLE D3-continued

EXPERIMENTAL CONDITIONS AND SELECTED DATA FOR FIG. 16—AMBERLITE IRC748I COLUMN 2 LOADING

| | | | | | | | |
|---|---|---|---|---|---|---|---|
| 4.6 | 22.99 | 17.50 | 16.53 | 18.24 | 17.35 | 16.89 | 109.5 |
| 5.0 | 24.06 | 19.07 | 18.16 | 19.74 | 19.06 | 18.40 | 118.5 |
| 5.5 | 24.74 | 20.44 | 19.83 | 20.78 | 20.13 | 19.58 | 125.5 |
| 5.9 | 25.51 | 22.09 | 20.87 | 21.68 | 21.45 | 20.90 | 132.5 |
| 6.3 | 25.78 | 22.76 | 21.51 | 22.07 | 21.85 | 21.53 | 135.5 |
| 6.8 | 25.52 | 22.84 | 22.25 | 22.12 | 22.31 | 21.96 | 137.0 |
| 7.2 | 26.20 | 23.75 | 22.57 | 22.60 | 22.89 | 22.49 | 140.5 |
| 7.6 | 26.60 | 24.07 | 23.08 | 22.98 | 23.30 | 22.97 | 143.0 |
| 8.0 | 26.15 | 24.41 | 23.62 | 23.01 | 23.68 | 23.63 | 144.5 |
| 8.5 | 25.93 | 24.70 | 23.85 | 23.14 | 23.95 | 23.93 | 145.5 |
| 8.9 | 26.39 | 24.86 | 24.34 | 23.34 | 24.35 | 24.21 | 147.5 |

TABLE D4

Figure 17:
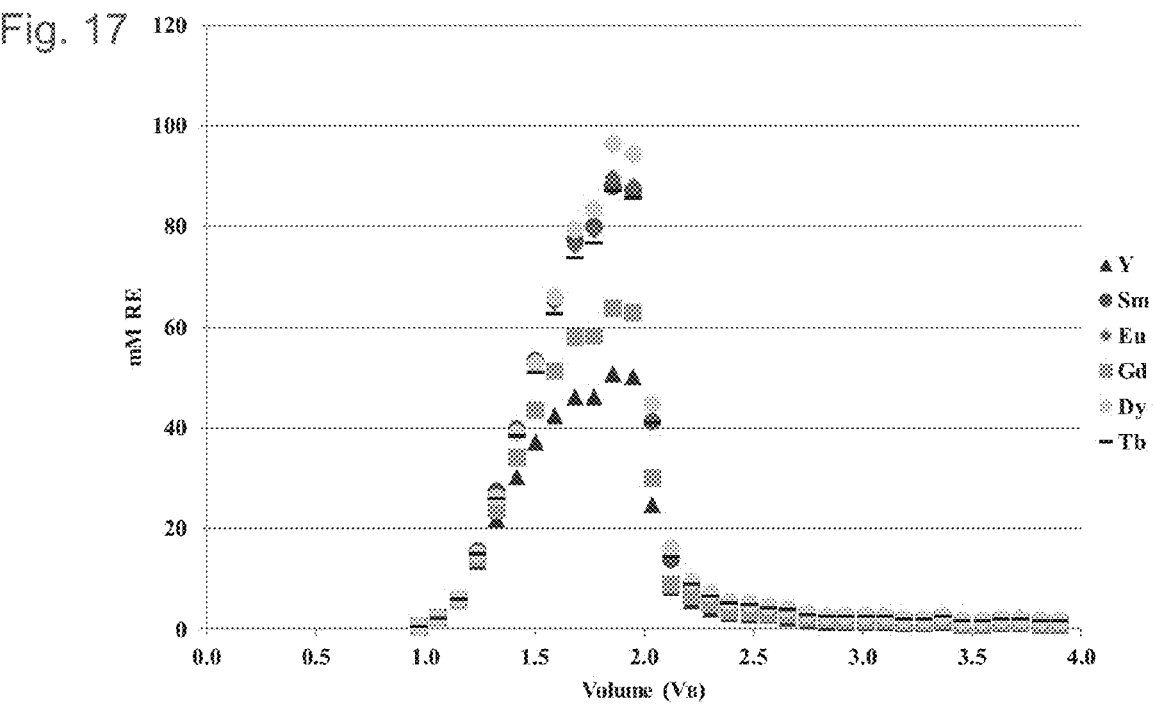
FIG. 17 depicts an Amberlite IRC748I desorption curve (column 2, 2 m hcl, 0.03 vb/min).

EXPERIMENTAL CONDITIONS AND SELECTED DATA FOR FIG. 17—AMBERLITE IRC748I COLUMN 2 DESORPTION

Experimental Conditions

| | | | |
|---|---|---|---|
| Temperature | 30° C. | Eluent | 2M HCl |
| Flow Rate | 0.03 $V_g$/min | | |
| Volumn of Resin | 150 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 1.0 | 0.50  | 0.35  | 0.48  | 0.33  | 0.50  | 0.34  | 2.5   |
| 1.1 | 2.20  | 2.11  | 2.10  | 2.00  | 2.06  | 2.02  | 12.5  |
| 1.2 | 5.99  | 5.96  | 5.90  | 5.55  | 5.82  | 5.78  | 35.0  |
| 1.2 | 13.46 | 15.52 | 14.87 | 13.98 | 14.76 | 14.90 | 87.5  |
| 1.3 | 21.74 | 27.10 | 26.09 | 23.34 | 25.75 | 25.98 | 150.0 |
| 1.4 | 30.14 | 39.72 | 39.45 | 33.83 | 38.22 | 38.65 | 220.0 |
| 1.5 | 37.04 | 53.14 | 52.95 | 43.36 | 50.92 | 52.58 | 290.0 |
| 1.6 | 42.31 | 65.50 | 64.83 | 51.31 | 62.50 | 66.05 | 352.5 |
| 1.7 | 46.11 | 77.08 | 76.12 | 57.75 | 73.59 | 79.34 | 410.0 |
| 1.8 | 45.97 | 79.66 | 78.82 | 58.16 | 76.51 | 83.38 | 422.5 |
| 1.9 | 50.64 | 87.75 | 89.59 | 63.67 | 87.13 | 96.22 | 475.0 |
| 2.0 | 49.97 | 87.13 | 87.89 | 62.63 | 85.60 | 94.28 | 467.5 |
| 2.0 | 24.50 | 40.98 | 41.69 | 29.80 | 40.91 | 44.62 | 222.5 |
| 2.1 | 8.25  | 13.63 | 14.11 | 8.85  | 14.26 | 15.89 | 75.0  |
| 2.2 | 5.47  | 8.63  | 9.01  | 6.34  | 8.68  | 9.37  | 47.5  |
| 2.3 | 3.93  | 6.29  | 6.67  | 4.68  | 6.52  | 6.91  | 35.0  |
| 2.4 | 3.08  | 4.95  | 5.28  | 3.68  | 5.11  | 5.40  | 27.5  |
| 2.5 | 2.77  | 4.46  | 4.80  | 3.36  | 4.70  | 4.91  | 25.0  |
| 2.6 | 2.53  | 4.10  | 4.36  | 2.96  | 4.16  | 4.39  | 22.5  |
| 2.7 | 2.18  | 3.63  | 3.90  | 2.66  | 3.75  | 3.89  | 20.0  |
| 2.8 | 1.63  | 2.73  | 2.94  | 1.99  | 2.80  | 2.91  | 15.0  |
| 2.8 | 1.34  | 2.29  | 2.45  | 1.67  | 2.34  | 2.41  | 12.5  |
| 2.9 | 1.33  | 2.30  | 2.47  | 1.66  | 2.32  | 2.42  | 12.5  |
| 3.0 | 1.32  | 2.34  | 2.47  | 1.66  | 2.32  | 2.39  | 12.5  |

TABLE D5

Figure 18:
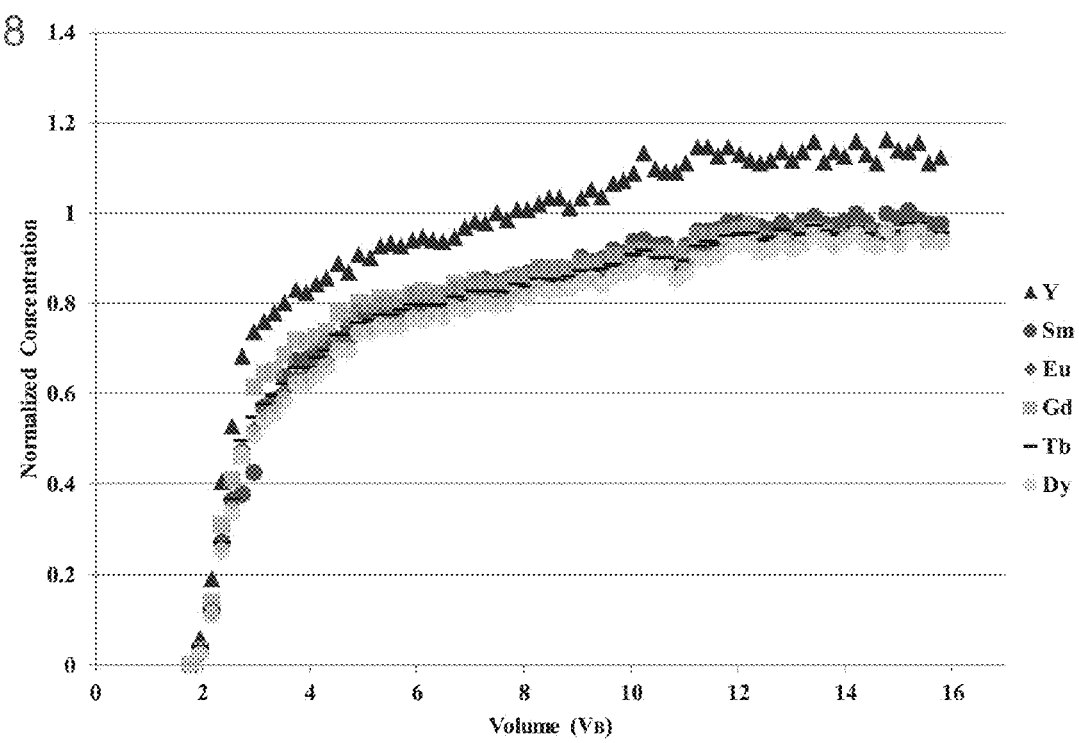
FIG. 18 depicts an Na+ Amberlite IRC748I breakthrough curve; column 3 (150 mm rare earth, 300 cm$^3$ resin, pH 4, 0.03 vb/min, 30° C.)

EXPERIMENTAL CONDITIONS AND SELECTED DATA FOR FIG. 18—AMBERLITE IRC748I COLUMN 3 LOADING

Experimental Conditions

| | | | |
|---|---|---|---|
| Temperature | 30° C. | Feed pH | 4.0 |
| Flow Rate | 0.03 $V_g$/min | | |
| Volumn of Resin | 300 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| Feed | 25.79 | 25.87 | 24.79 | 24.80 | 25.51 | 25.74 | 152.5 |
| 2.0 | 1.44  | 0.66  | 0.56  | 0.77  | 0.96  | 0.60  | 5.0   |
| 2.4 | 10.47 | 6.98  | 6.53  | 7.66  | 6.92  | 6.45  | 45.0  |

TABLE D5-continued

EXPERIMENTAL CONDITIONS AND SELECTED DATA FOR FIG. 18—AMBERLITE IRC748I COLUMN 3 LOADING

| | | | | | | |
|---|---|---|---|---|---|---|
| 2.8 | 17.56 | 9.72 | 11.77 | 11.47 | 12.59 | 11.88 | 75.0 |
| 3.2 | 19.57 | 14.69 | 13.76 | 15.91 | 14.67 | 13.89 | 92.5 |
| 3.6 | 20.67 | 16.50 | 14.97 | 16.95 | 15.86 | 15.05 | 100.0 |
| 3.9 | 21.23 | 17.46 | 15.86 | 17.73 | 16.69 | 16.03 | 105.0 |
| 4.3 | 22.06 | 18.45 | 16.65 | 18.23 | 17.67 | 16.93 | 110.0 |
| 4.7 | 22.40 | 19.35 | 17.66 | 19.09 | 18.59 | 17.91 | 115.0 |
| 5.1 | 23.20 | 20.22 | 18.45 | 19.79 | 19.43 | 18.91 | 120.0 |
| 5.5 | 24.06 | 20.58 | 18.97 | 19.94 | 19.76 | 19.19 | 122.5 |
| 5.9 | 24.18 | 21.10 | 19.34 | 20.32 | 20.37 | 19.69 | 125.0 |
| 6.3 | 24.22 | 21.03 | 19.32 | 20.30 | 20.25 | 19.89 | 125.0 |
| 6.7 | 24.35 | 21.44 | 19.82 | 20.88 | 20.73 | 20.28 | 127.5 |
| 7.1 | 25.26 | 21.91 | 20.18 | 21.06 | 21.04 | 20.56 | 130.0 |
| 7.5 | 25.83 | 21.86 | 20.02 | 20.81 | 21.04 | 20.43 | 130.0 |
| 7.9 | 25.92 | 22.20 | 20.55 | 21.37 | 21.47 | 20.99 | 132.5 |
| 8.3 | 26.28 | 22.74 | 21.01 | 21.78 | 21.77 | 21.43 | 135.0 |
| 8.7 | 26.59 | 22.72 | 20.99 | 21.77 | 21.63 | 21.31 | 135.0 |
| 9.1 | 26.64 | 23.33 | 21.36 | 22.12 | 22.26 | 21.79 | 137.5 |
| 9.5 | 26.73 | 23.18 | 21.55 | 22.12 | 22.29 | 21.63 | 137.5 |
| 9.9 | 27.62 | 23.57 | 21.80 | 22.31 | 22.48 | 22.22 | 140.0 |
| 10.3 | 29.22 | 24.29 | 22.69 | 22.66 | 23.38 | 22.77 | 145.0 |
| 10.7 | 28.10 | 24.02 | 22.20 | 22.68 | 22.94 | 22.56 | 142.5 |
| 11.1 | 28.63 | 23.98 | 21.95 | 22.74 | 22.82 | 22.38 | 142.5 |
| 11.4 | 29.52 | 24.79 | 22.81 | 23.44 | 23.88 | 23.05 | 147.5 |
| 11.8 | 29.57 | 25.26 | 23.44 | 23.72 | 24.17 | 23.84 | 150.0 |
| 12.2 | 28.81 | 25.22 | 23.63 | 24.06 | 24.39 | 23.89 | 150.0 |
| 12.6 | 28.75 | 24.85 | 23.16 | 23.08 | 24.08 | 23.58 | 147.5 |
| 13.0 | 28.77 | 24.97 | 23.28 | 23.00 | 23.84 | 23.65 | 147.5 |
| 13.4 | 29.87 | 25.65 | 23.95 | 23.86 | 24.78 | 24.39 | 152.2 |
| 13.8 | 29.31 | 25.15 | 23.17 | 23.27 | 24.24 | 23.86 | 149.0 |
| 14.2 | 29.85 | 25.80 | 24.01 | 23.68 | 24.68 | 24.47 | 152.5 |
| 14.6 | 28.57 | 24.77 | 23.16 | 23.11 | 24.04 | 23.84 | 147.5 |
| 15.0 | 29.34 | 25.50 | 23.44 | 23.34 | 24.44 | 23.95 | 150.0 |
| 15.4 | 29.79 | 25.44 | 23.79 | 23.89 | 24.95 | 24.64 | 152.5 |
| 15.8 | 28.96 | 25.18 | 23.54 | 23.39 | 24.33 | 24.10 | 149.5 |

TABLE D6

EXPERIMENTAL CONDITIONS AND SELECTED DATA FOR FIG. 19—AMBERLITE IRC748I COLUMN 3 DESORPTION

Experimental Conditions

| Temperature | 30° C. | Eluent | 2M HCl |
|---|---|---|---|
| Flow Rate | 0.03 $V_g$/min | | |
| Volumn of Resin | 300 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 0.8 | 0.98 | 0.83 | 0.79 | 0.79 | 0.81 | 0.80 | 5.0 |
| 1.0 | 9.70 | 9.45 | 8.96 | 8.51 | 9.14 | 9.23 | 55.0 |
| 1.2 | 29.81 | 32.87 | 30.41 | 28.19 | 31.20 | 32.52 | 185.0 |
| 1.3 | 46.38 | 59.75 | 55.53 | 48.58 | 57.54 | 59.72 | 327.5 |
| 1.5 | 52.68 | 76.68 | 72.81 | 59.59 | 75.86 | 82.38 | 420.0 |
| 1.6 | 55.58 | 86.76 | 85.20 | 64.84 | 88.49 | 99.13 | 480.0 |
| 1.8 | 48.57 | 81.02 | 79.09 | 58.18 | 84.66 | 98.48 | 450.0 |
| 2.0 | 7.93 | 13.26 | 13.75 | 7.99 | 14.79 | 17.28 | 75.0 |
| 2.1 | 4.07 | 6.65 | 6.85 | 4.72 | 7.16 | 8.05 | 37.5 |
| 2.3 | 2.59 | 4.50 | 4.64 | 3.20 | 4.80 | 5.27 | 25.0 |
| 2.5 | 2.02 | 3.62 | 3.76 | 2.58 | 3.85 | 4.18 | 20.0 |
| 2.6 | 1.50 | 2.75 | 2.82 | 1.92 | 2.88 | 3.13 | 15.0 |
| 2.8 | 1.71 | 3.24 | 3.31 | 2.26 | 3.37 | 3.61 | 17.5 |
| 3.0 | 1.67 | 3.23 | 3.33 | 2.26 | 3.41 | 3.60 | 17.5 |

TABLE D7

EXPERIMENTAL CONDITIONS AND SELECTED DATA FOR FIG. 20—AMBERLITE IRC748I COLUMN 4 LOADING

Experimental Conditions

| Temperature | 30° C. | Feed pH | 2.0 |
|---|---|---|---|
| Flow Rate | 0.03 $V_g$/min | | |
| Volumn of Resin | 150 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| Feed | 8.29 | 8.31 | 7.96 | 7.97 | 8.20 | 8.27 | 49.0 |
| 3.9 | 2.28 | 1.71 | 1.55 | 1.79 | 1.63 | 1.54 | 10.5 |
| 4.9 | 5.20 | 4.06 | 3.80 | 4.18 | 3.98 | 3.78 | 25.0 |
| 5.9 | 6.55 | 5.32 | 5.02 | 5.37 | 5.21 | 5.03 | 32.5 |
| 6.9 | 7.06 | 5.98 | 5.66 | 5.92 | 5.78 | 5.61 | 36.0 |
| 7.9 | 7.42 | 6.41 | 6.05 | 6.28 | 6.25 | 6.09 | 38.5 |
| 8.9 | 7.57 | 6.67 | 6.34 | 6.54 | 6.55 | 6.33 | 40.0 |
| 9.9 | 7.50 | 6.70 | 6.36 | 6.51 | 6.57 | 6.36 | 40.0 |
| 10.9 | 7.56 | 6.71 | 6.32 | 6.50 | 6.54 | 6.38 | 40.0 |
| 11.8 | 7.77 | 6.85 | 6.50 | 6.66 | 6.71 | 6.51 | 41.0 |
| 12.8 | 8.03 | 7.01 | 6.63 | 6.85 | 6.81 | 6.67 | 42.0 |
| 13.8 | 8.00 | 7.02 | 6.63 | 6.84 | 6.82 | 6.69 | 42.0 |
| 14.8 | 8.28 | 7.39 | 7.00 | 7.16 | 7.17 | 6.99 | 44.0 |
| 15.8 | 8.16 | 7.40 | 7.00 | 7.07 | 7.28 | 7.08 | 44.0 |
| 16.8 | 8.31 | 7.49 | 7.13 | 7.14 | 7.29 | 7.14 | 44.5 |
| 17.8 | 8.35 | 7.58 | 7.20 | 7.19 | 7.40 | 7.28 | 45.0 |
| 18.8 | 8.42 | 7.69 | 7.28 | 7.30 | 7.48 | 7.34 | 45.5 |
| 19.7 | 8.35 | 7.58 | 7.19 | 7.22 | 7.40 | 7.26 | 45.0 |
| 20.7 | 8.76 | 7.91 | 7.51 | 7.53 | 7.73 | 7.56 | 47.0 |
| 21.7 | 8.67 | 7.83 | 7.40 | 7.45 | 7.63 | 7.52 | 46.5 |
| 22.7 | 8.73 | 7.95 | 7.54 | 7.48 | 7.71 | 7.59 | 47.0 |
| 23.7 | 8.84 | 8.18 | 7.80 | 7.78 | 8.03 | 7.88 | 48.5 |
| 24.7 | 8.87 | 8.08 | 7.74 | 7.62 | 7.90 | 7.79 | 48.0 |

TABLE D8

Figure 21:
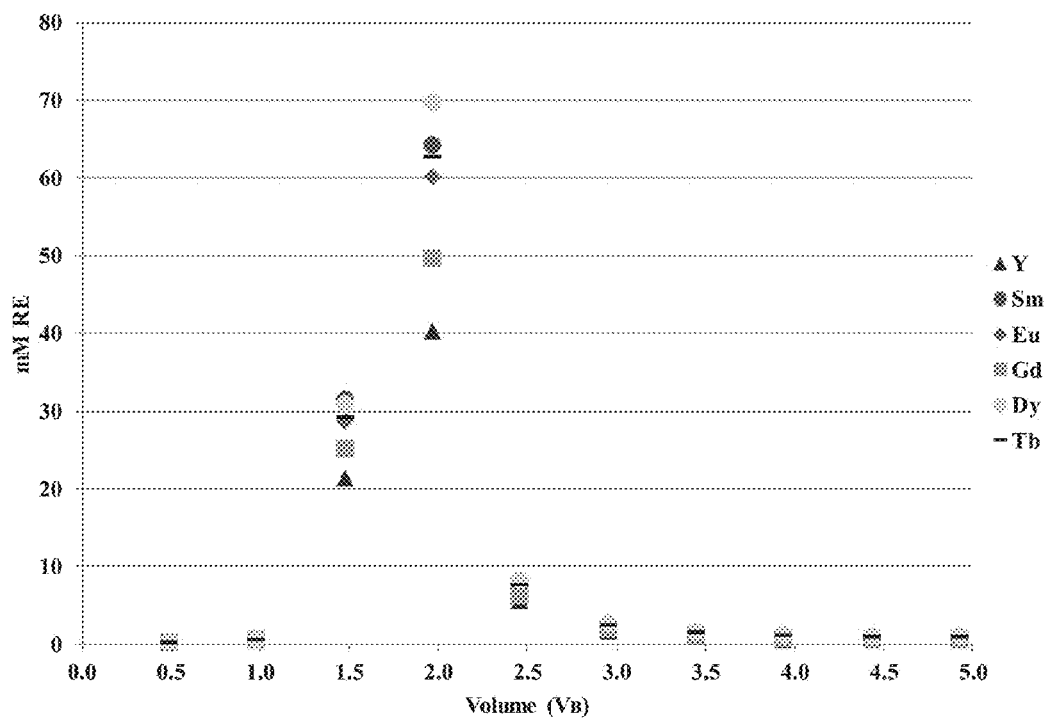
FIG. 21 depicts an Amberlite IRC748I desorption curve (column 4, 2 m hcl, 0.03 vb/min).

EXPERIMENTAL CONDITIONS AND SELECTED DATA FOR FIG. 21—AMBERLITE IRC748I COLUMN 4 DESORPTION

Experimental Conditions

| Temperature | 30° C. | Eluent | 2M HCl |
|---|---|---|---|
| Flow Rate | 0.03 $V_g$/min | | |
| Volumn of Resin | 150 cm$^3$ | | |

Distribution Coefficient Data

| $V_B$ | Y | Sm | Eu | Gd | Tb | Dy | Total RE |
|---|---|---|---|---|---|---|---|
| | | | Concentration (mM) | | | | |
| 0.5 | 0.17 | 0.18 | 0.16 | 0.17 | 0.17 | 0.16 | 1.0 |
| 1.0 | 0.49 | 0.53 | 0.49 | 0.48 | 0.50 | 0.50 | 3.0 |
| 1.5 | 21.39 | 31.47 | 28.54 | 25.10 | 29.13 | 30.87 | 166.5 |
| 2.0 | 40.31 | 64.18 | 60.14 | 49.58 | 62.62 | 69.67 | 346.5 |
| 2.5 | 5.57 | 7.59 | 7.37 | 6.08 | 7.72 | 8.17 | 42.5 |
| 3.0 | 1.61 | 2.45 | 2.45 | 1.89 | 2.48 | 2.61 | 13.5 |
| 3.5 | 0.93 | 1.47 | 1.49 | 1.10 | 1.47 | 1.53 | 8.0 |
| 3.9 | 0.62 | 1.02 | 1.04 | 0.75 | 1.02 | 1.05 | 5.5 |
| 4.4 | 0.51 | 0.84 | 0.86 | 0.61 | 0.83 | 0.86 | 4.5 |
| 4.9 | 0.50 | 0.85 | 0.86 | 0.60 | 0.83 | 0.86 | 4.5 |
| 5.4 | 0.33 | 0.57 | 0.58 | 0.39 | 0.55 | 0.57 | 3.0 |
| 5.9 | 0.39 | 0.67 | 0.68 | 0.46 | 0.64 | 0.66 | 3.5 |
| 6.4 | 0.27 | 0.48 | 0.49 | 0.33 | 0.46 | 0.48 | 2.5 |
| 6.9 | 0.27 | 0.48 | 0.49 | 0.32 | 0.46 | 0.48 | 2.5 |
| 7.4 | 0.16 | 0.29 | 0.29 | 0.19 | 0.28 | 0.29 | 1.5 |

TABLE D9

Figure 22:
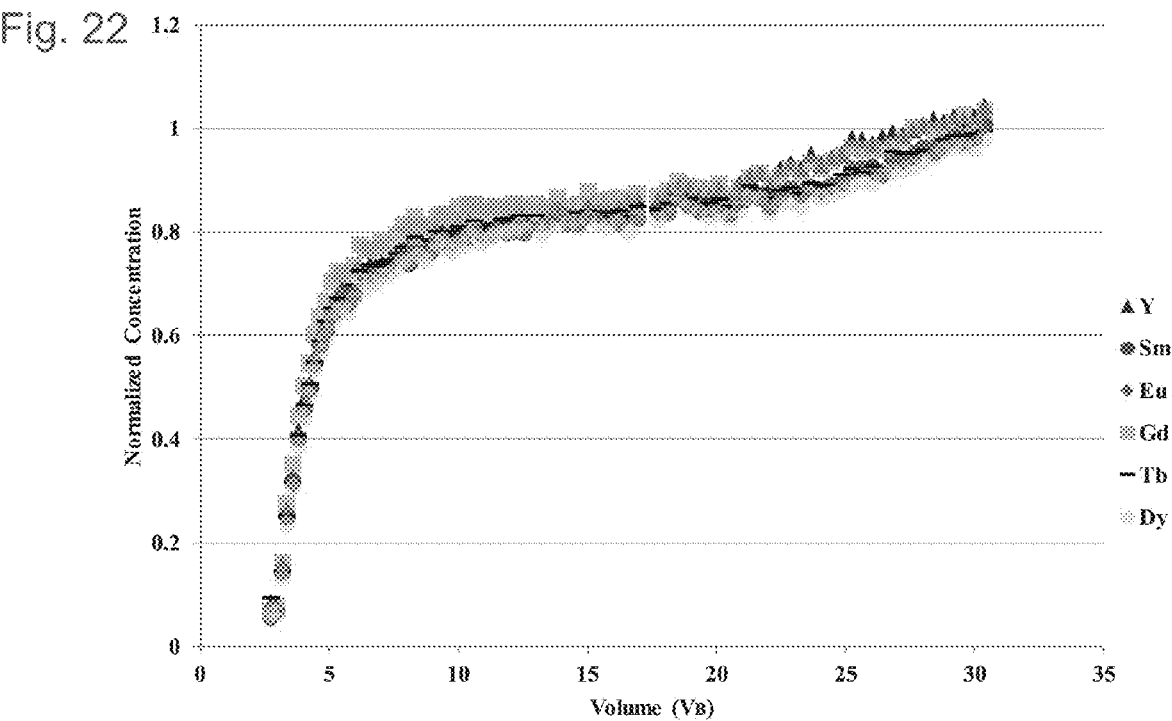
FIG. 22 depicts an Na+ Amberlite IRC748I breakthrough curve; column 5 (50 mm rare earth, 300 cm$^3$ resin, pH 2, 0.03 vb/min, 30° C.).

EXPERIMENTAL CONDITIONS AND SELECTED DATA FOR FIG. 22—AMBERLITE IRC748I COLUMN 5 LOADING

Experimental Conditions

| | | | |
|---|---|---|---|
| Temperature | 30° C. | Feed pH | 2.0 |
| Flow Rate | 0.03 $V_g$/min | | |
| Volumn of Resin | 300 cm³ | | |

Distribution Coefficient Data

| $V_B$ | Y | Sm | Eu | Gd | Tb | Dy | Total RE |
|---|---|---|---|---|---|---|---|
| | | Concentration (mM) | | | | | |
| Feed | 9.74 | 8.70 | 8.23 | 7.84 | 8.44 | 8.55 | 51.5 |
| 3.0 | 0.71 | 0.58 | 0.54 | 0.59 | 0.56 | 0.52 | 3.5 |
| 3.4 | 2.55 | 2.16 | 2.02 | 2.15 | 2.10 | 2.01 | 13.0 |
| 3.8 | 4.04 | 3.49 | 3.28 | 3.47 | 3.43 | 3.28 | 21.0 |
| 4.3 | 4.95 | 4.33 | 4.05 | 4.27 | 4.27 | 4.13 | 26.0 |
| 4.7 | 5.86 | 5.05 | 4.80 | 4.97 | 4.98 | 4.84 | 30.5 |
| 5.1 | 6.35 | 5.56 | 5.24 | 5.50 | 5.51 | 5.34 | 33.5 |
| 5.6 | 6.72 | 5.88 | 5.55 | 5.62 | 5.65 | 5.58 | 35.0 |
| 6.0 | 6.65 | 5.90 | 5.59 | 5.77 | 5.87 | 5.72 | 35.5 |
| 6.4 | 7.03 | 6.23 | 5.88 | 5.97 | 6.01 | 5.88 | 37.0 |
| 6.8 | 7.14 | 6.27 | 5.94 | 6.01 | 6.18 | 5.96 | 37.5 |
| 7.3 | 7.17 | 6.38 | 6.02 | 6.02 | 6.29 | 6.13 | 38.0 |
| 7.9 | 7.40 | 6.63 | 6.24 | 6.38 | 6.49 | 6.35 | 39.5 |
| 8.3 | 7.52 | 6.81 | 6.43 | 6.50 | 6.66 | 6.57 | 40.5 |
| 8.8 | 7.45 | 6.64 | 6.32 | 6.31 | 6.42 | 6.36 | 39.5 |
| 9.2 | 7.89 | 6.80 | 6.44 | 6.49 | 6.75 | 6.64 | 41.0 |
| 9.6 | 7.75 | 6.86 | 6.55 | 6.53 | 6.75 | 6.56 | 41.0 |
| 10.0 | 7.75 | 6.93 | 6.70 | 6.64 | 6.82 | 6.66 | 41.5 |
| 10.5 | 7.99 | 7.02 | 6.70 | 6.66 | 6.84 | 6.79 | 42.0 |
| 10.9 | 7.91 | 6.94 | 6.57 | 6.58 | 6.85 | 6.65 | 41.5 |
| 11.3 | 7.89 | 6.99 | 6.55 | 6.54 | 6.77 | 6.76 | 41.5 |
| 11.8 | 7.87 | 7.04 | 6.70 | 6.63 | 6.94 | 6.81 | 42.0 |
| 12.2 | 7.95 | 6.96 | 6.66 | 6.68 | 6.89 | 6.85 | 42.0 |
| 12.6 | 8.05 | 6.93 | 6.67 | 6.59 | 6.91 | 6.85 | 42.0 |
| 13.3 | 7.97 | 7.08 | 6.69 | 6.55 | 6.90 | 6.80 | 42.0 |
| 13.9 | 8.15 | 7.31 | 6.91 | 6.77 | 6.92 | 6.95 | 43.0 |
| 14.7 | 8.01 | 7.09 | 6.75 | 6.67 | 7.06 | 6.91 | 42.5 |
| 15.4 | 8.16 | 7.24 | 6.90 | 6.72 | 6.99 | 6.98 | 43.0 |
| 16.2 | 8.24 | 7.11 | 6.79 | 6.77 | 7.09 | 6.99 | 43.0 |
| 17.0 | 8.38 | 7.18 | 6.88 | 6.85 | 7.15 | 7.06 | 43.5 |
| 17.8 | 8.38 | 7.33 | 6.86 | 6.80 | 7.11 | 7.02 | 43.5 |
| 18.6 | 8.64 | 7.49 | 7.13 | 7.02 | 7.34 | 7.37 | 45.0 |
| 19.4 | 8.45 | 7.30 | 7.00 | 6.92 | 7.18 | 7.15 | 44.0 |
| 20.2 | 8.63 | 7.40 | 7.09 | 6.98 | 7.28 | 7.13 | 44.5 |
| 21.0 | 8.70 | 7.48 | 7.02 | 6.94 | 7.16 | 7.20 | 44.5 |
| 21.8 | 8.88 | 7.52 | 7.11 | 7.16 | 7.45 | 7.39 | 45.5 |
| 22.5 | 8.96 | 7.59 | 7.14 | 7.11 | 7.41 | 7.29 | 45.5 |
| 23.3 | 8.97 | 7.57 | 7.20 | 7.14 | 7.37 | 7.25 | 45.5 |
| 24.1 | 9.06 | 7.65 | 7.20 | 7.22 | 7.49 | 7.38 | 46.0 |
| 24.9 | 9.26 | 7.78 | 7.36 | 7.41 | 7.68 | 7.52 | 47.0 |
| 25.7 | 9.51 | 8.02 | 7.60 | 7.51 | 7.71 | 7.65 | 48.0 |
| 26.5 | 9.57 | 7.91 | 7.54 | 7.51 | 7.73 | 7.74 | 48.0 |
| 27.3 | 9.60 | 8.17 | 7.70 | 7.65 | 8.03 | 7.86 | 49.0 |
| 28.1 | 9.79 | 8.35 | 7.93 | 7.86 | 8.08 | 7.98 | 50.0 |
| 28.9 | 9.86 | 8.46 | 7.91 | 7.83 | 8.25 | 8.19 | 50.5 |
| 29.7 | 9.90 | 8.45 | 8.08 | 8.02 | 8.32 | 8.23 | 51.0 |
| 30.4 | 10.14 | 8.78 | 8.24 | 8.10 | 8.38 | 8.37 | 52.0 |

TABLE D10

Figure 23:
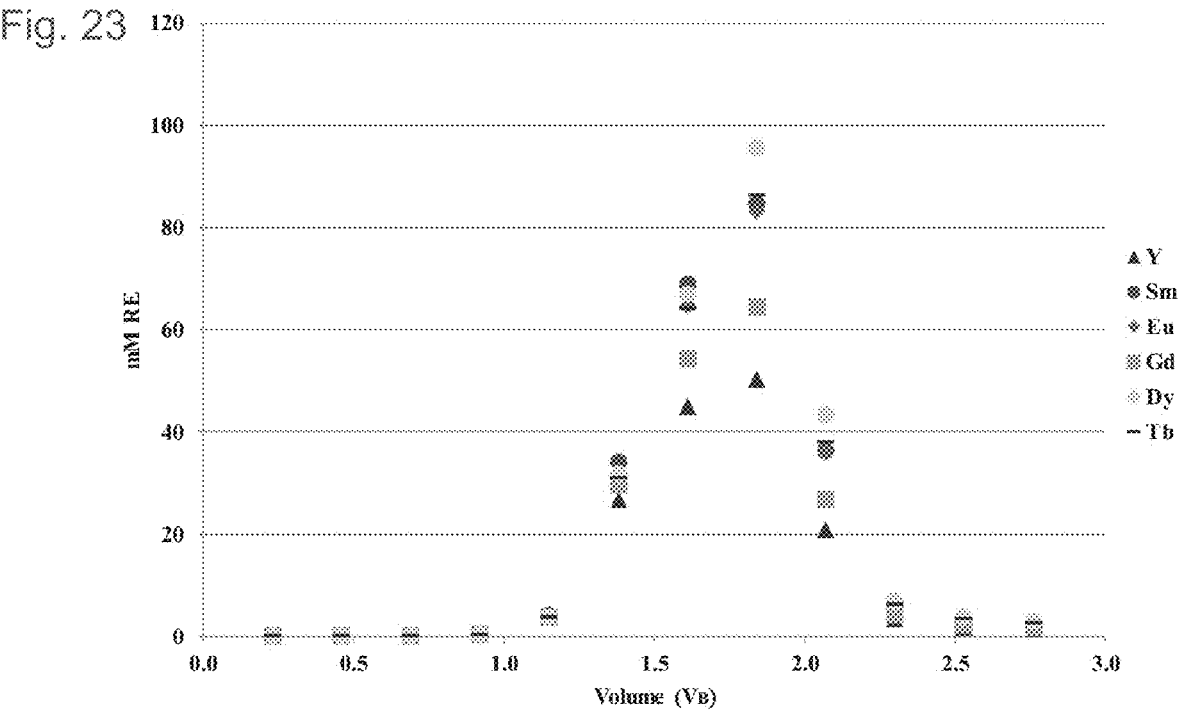
FIG. 23 depicts an Amberlite IRC748I desorption curve (column 5, 2 m hcl, 0.03 vb/min).

EXPERIMENTAL CONDITIONS AND SELECTED DATA FOR FIG. 23—AMBERLITE IRC748I COLUMN 5 DESORPTION

Experimental Conditions

| | | | |
|---|---|---|---|
| Temperature | 30° C. | Eluent | 2M HCl |
| Flow Rate | 0.03 $V_g$/min | | |
| Volumn of Resin | 300 cm³ | | |

Distribution Coefficient Data

| $V_B$ | Y | Sm | Eu | Gd | Tb | Dy | Total RE |
|---|---|---|---|---|---|---|---|
| | | Concentration (mM) | | | | | |
| 0.9 | 0.33 | 0.35 | 0.33 | 0.33 | 0.33 | 0.33 | 2.0 |
| 1.2 | 3.74 | 3.79 | 3.61 | 3.59 | 3.65 | 3.62 | 22.0 |
| 1.4 | 26.51 | 34.05 | 31.23 | 29.57 | 30.98 | 31.66 | 184.0 |
| 1.6 | 44.79 | 68.84 | 64.42 | 54.19 | 63.94 | 66.82 | 363.0 |
| 1.8 | 50.24 | 84.55 | 83.10 | 64.34 | 86.18 | 95.59 | 464.0 |
| 2.1 | 20.65 | 36.23 | 35.85 | 26.58 | 37.86 | 43.32 | 200.5 |
| 2.3 | 3.24 | 5.60 | 5.81 | 4.14 | 6.04 | 6.67 | 31.5 |
| 2.5 | 1.70 | 3.04 | 3.19 | 2.23 | 3.28 | 3.55 | 17.0 |
| 2.8 | 1.27 | 2.34 | 2.47 | 1.71 | 2.51 | 2.70 | 13.0 |

TABLE D11

Figure 24:
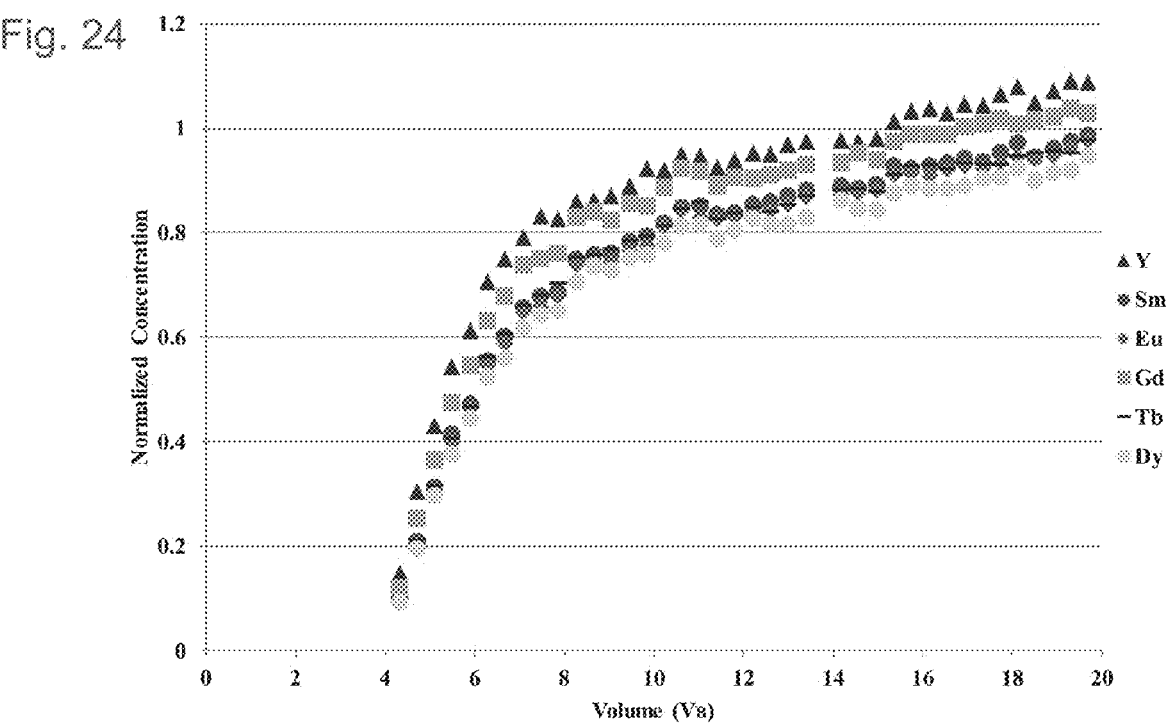
FIG. 24 depicts an Na+ Amberlite IRC748I breakthrough curve; column 6 (50 mm rare earth, 300 cm$^3$ resin, pH 4, 0.03 vb/min, 30° C.).

EXPERIMENTAL CONDITIONS AND SELECTED DATA FOR FIG. 24—AMBERLITE IRC748I COLUMN 6 LOADING

Experimental Conditions

| | | | |
|---|---|---|---|
| Temperature | 30° C. | Feed pH | 4.0 |
| Flow Rate | 0.03 $V_g$/min | | |
| Volumn of Resin | 300 cm³ | | |

Distribution Coefficient Data

| $V_B$ | Y | Sm | Eu | Gd | Tb | Dy | Total RE |
|---|---|---|---|---|---|---|---|
| | | Concentration (mM) | | | | | |
| Feed | 7.73 | 7.88 | 7.56 | 7.18 | 7.81 | 7.84 | 46.0 |
| 4.7 | 2.47 | 1.62 | 1.52 | 1.79 | 1.60 | 1.49 | 10.5 |
| 5.5 | 4.45 | 3.12 | 2.98 | 3.36 | 3.16 | 2.93 | 20.0 |
| 6.3 | 5.71 | 4.31 | 4.13 | 4.55 | 4.31 | 4.00 | 27.0 |
| 7.1 | 6.51 | 5.04 | 4.85 | 5.29 | 5.05 | 4.77 | 31.5 |
| 7.9 | 6.66 | 5.36 | 5.06 | 5.49 | 5.34 | 5.08 | 33.0 |
| 8.7 | 6.99 | 5.88 | 5.65 | 6.02 | 5.94 | 5.53 | 36.0 |
| 9.5 | 7.17 | 6.10 | 5.82 | 6.09 | 6.03 | 5.78 | 37.0 |
| 10.3 | 7.38 | 6.38 | 6.09 | 6.34 | 6.31 | 6.00 | 38.5 |
| 11.1 | 7.49 | 6.61 | 6.34 | 6.58 | 6.59 | 6.39 | 40.0 |
| 11.8 | 7.53 | 6.63 | 6.23 | 6.42 | 6.45 | 6.24 | 39.5 |
| 12.6 | 7.50 | 6.60 | 6.38 | 6.61 | 6.53 | 6.38 | 40.0 |
| 13.4 | 7.66 | 6.84 | 6.50 | 6.72 | 6.81 | 6.47 | 41.0 |
| 14.2 | 7.71 | 7.02 | 6.61 | 6.76 | 6.78 | 6.62 | 41.5 |
| 15.0 | 7.77 | 6.95 | 6.58 | 6.83 | 6.78 | 6.59 | 41.5 |
| 15.8 | 8.08 | 7.29 | 7.01 | 7.04 | 7.19 | 6.90 | 43.5 |
| 16.6 | 8.00 | 7.35 | 6.96 | 7.07 | 7.18 | 6.93 | 43.5 |
| 17.4 | 8.18 | 7.39 | 6.97 | 7.11 | 7.27 | 7.08 | 44.0 |
| 18.2 | 8.31 | 7.61 | 7.28 | 7.30 | 7.40 | 7.10 | 45.0 |
| 18.9 | 8.25 | 7.55 | 7.20 | 7.40 | 7.44 | 7.16 | 45.0 |
| 19.7 | 8.43 | 7.71 | 7.36 | 7.52 | 7.62 | 7.36 | 46.0 |

TABLE D12

Figure 25:
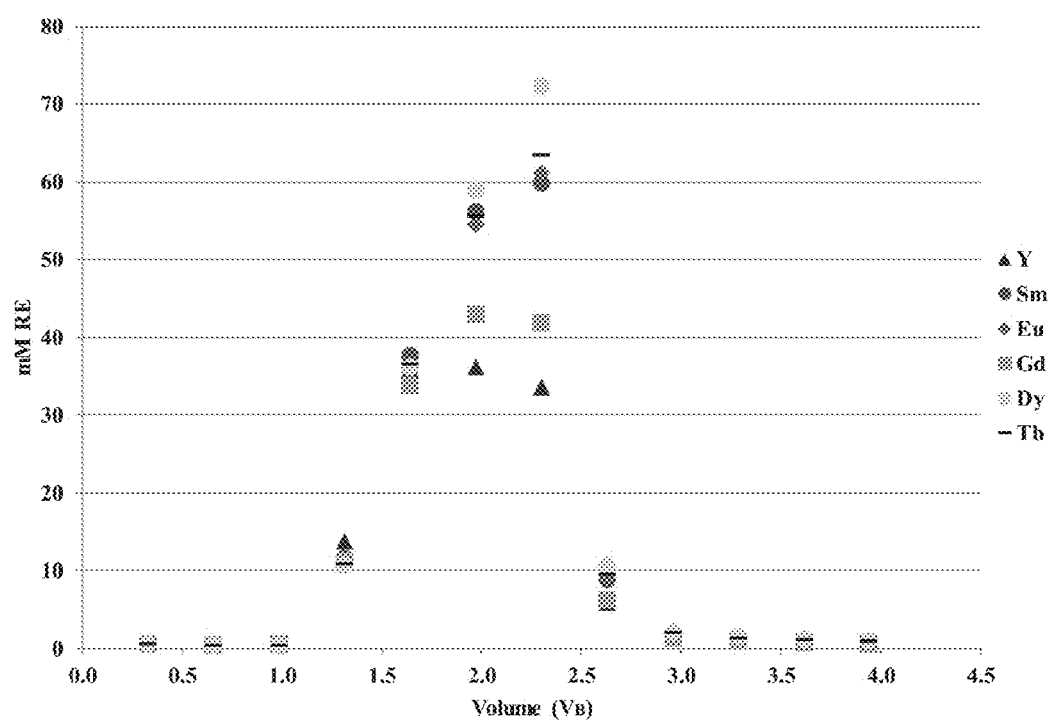
FIG. 25 depicts an Amberlite IRC748I desorption curve (column 6, 2 m hcl, 0.03 vb/min).

EXPERIMENTAL CONDITIONS AND SELECTED DATA FOR FIG. 25—AMBERLITE IRC748I COLUMN 6 DESORPTION

Experimental Conditions

| | | | |
|---|---|---|---|
| Temperature | 30° C. | Eluent | 2M HCl |
| Flow Rate | 0.03 $V_g$/min | | |
| Volumn of Resin | 300 cm³ | | |

Distribution Coefficient Data

| $V_B$ | Y | Sm | Eu | Gd | Tb | Dy | Total RE |
|---|---|---|---|---|---|---|---|
| | | Concentration (mM) | | | | | |
| 0.3 | 0.70 | 0.58 | 0.55 | 0.59 | 0.56 | 0.52 | 3.5 |
| 0.7 | 0.41 | 0.33 | 0.31 | 0.34 | 0.32 | 0.29 | 2.0 |
| 1.0 | 0.54 | 0.41 | 0.38 | 0.43 | 0.38 | 0.36 | 2.5 |

TABLE D12-continued

EXPERIMENTAL CONDITIONS AND SELECTED DATA FOR
FIG. 25—AMBERLITE IRC748I COLUMN 6 DESORPTION

| 1.3 | 12.61 | 11.85 | 10.77 | 11.71 | 11.02 | 10.54 | 68.5 |
|---|---|---|---|---|---|---|---|
| 1.6 | 33.90 | 38.64 | 35.75 | 35.15 | 36.53 | 35.53 | 215.5 |
| 2.0 | 33.91 | 56.79 | 54.33 | 44.94 | 55.84 | 58.20 | 304.0 |
| 2.3 | 32.20 | 61.30 | 60.34 | 42.89 | 63.21 | 72.06 | 332.0 |
| 2.6 | 5.33 | 8.94 | 9.14 | 6.39 | 9.62 | 10.58 | 50.0 |
| 3.0 | 1.10 | 1.77 | 1.87 | 1.30 | 1.91 | 2.04 | 10.0 |
| 3.3 | 0.78 | 1.24 | 1.32 | 0.89 | 1.34 | 1.43 | 7.0 |
| 3.6 | 0.60 | 0.97 | 1.04 | 0.70 | 1.06 | 1.13 | 5.5 |
| 3.9 | 0.49 | 0.80 | 0.86 | 0.57 | 0.86 | 0.91 | 4.5 |

TABLE D13

Figure 26:
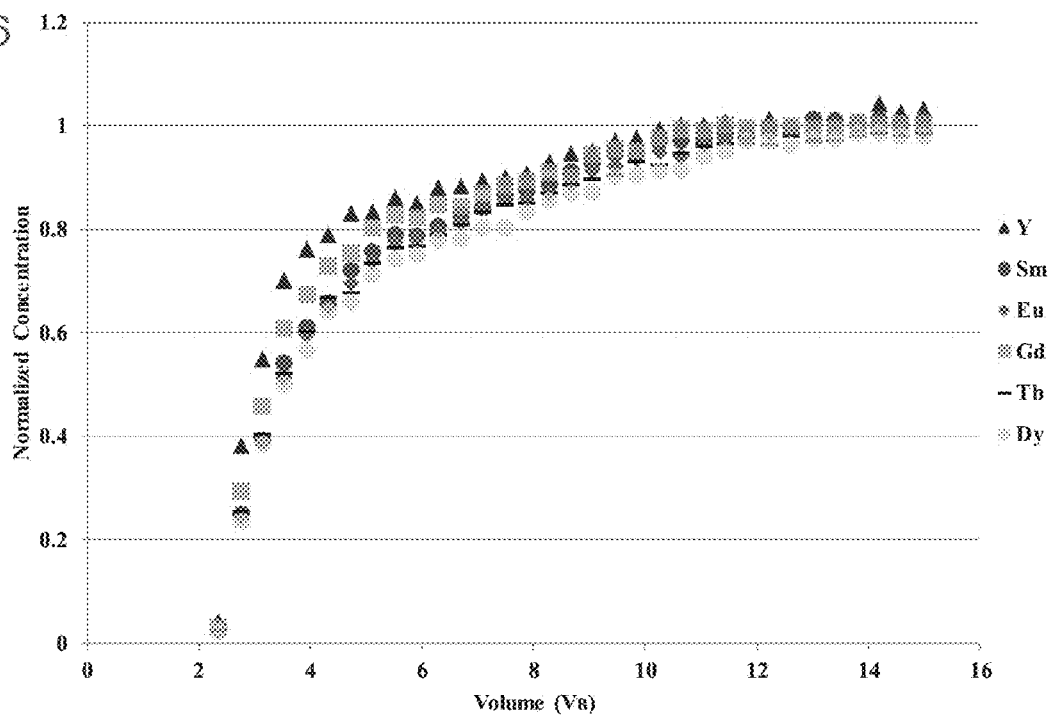
FIG. 26 depicts an Na+ Amberlite IRC748I breakthrough curve; column 7 (150 mm rare earth, 150 cm$^3$ resin, pH 2, 0.03 vb/min, 30° C.).

EXPERIMENTAL CONDITIONS AND SELECTED DATA FOR
FIG. 26—AMBERLITE IRC748I COLUMN 7 LOADING

| Experimental Conditions | | | |
|---|---|---|---|
| Temperature | 30° C. | Feed pH | 2.0 |
| Flow Rate | 0.03 $V_g$/min | | |
| Volumn of Resin | 150 cm³ | | |

| | | | Distribution Coefficient Data | | | |
|---|---|---|---|---|---|---|
| $V_B$ | Y | Sm | Eu | Gd | Tb | Dy | Total RE |
| | | | Concentration (mM) | | | |
| Feed | 26.24 | 25.07 | 23.87 | 22.81 | 25.24 | 25.77 | 149.0 |
| 2.4 | 1.04 | 0.59 | 0.54 | 0.65 | 0.60 | 0.58 | 4.0 |
| 2.8 | 9.94 | 6.18 | 5.79 | 6.67 | 6.36 | 6.06 | 41.0 |
| 3.2 | 14.37 | 9.82 | 9.34 | 10.46 | 10.15 | 9.87 | 64.0 |
| 3.6 | 18.34 | 13.53 | 12.26 | 13.85 | 13.17 | 12.84 | 84.0 |
| 3.9 | 19.97 | 15.25 | 14.19 | 15.36 | 15.19 | 14.54 | 94.5 |
| 4.3 | 20.69 | 16.44 | 15.43 | 16.59 | 16.85 | 16.49 | 102.5 |
| 4.7 | 21.74 | 18.01 | 16.58 | 17.16 | 17.04 | 16.96 | 107.5 |
| 5.1 | 21.87 | 18.89 | 17.58 | 18.28 | 18.53 | 18.35 | 113.5 |
| 5.5 | 22.55 | 19.77 | 18.46 | 18.84 | 19.27 | 19.10 | 118.0 |
| 5.9 | 22.29 | 19.68 | 18.67 | 18.74 | 19.31 | 19.31 | 118.0 |
| 6.7 | 23.15 | 20.73 | 19.41 | 19.26 | 20.37 | 20.07 | 123.0 |
| 7.1 | 23.44 | 21.05 | 20.06 | 19.81 | 21.00 | 20.64 | 126.0 |
| 7.5 | 23.60 | 21.64 | 20.55 | 20.17 | 21.37 | 20.68 | 128.0 |
| 8.3 | 24.36 | 22.20 | 20.74 | 20.74 | 21.90 | 22.04 | 132.0 |
| 9.1 | 24.97 | 23.20 | 21.75 | 21.50 | 22.62 | 22.46 | 136.5 |
| 9.9 | 25.63 | 23.65 | 22.30 | 21.67 | 23.44 | 23.31 | 140.0 |
| 10.7 | 26.25 | 24.34 | 22.43 | 22.61 | 23.90 | 23.49 | 143.0 |
| 11.4 | 26.39 | 24.59 | 23.34 | 22.82 | 24.35 | 24.52 | 146.0 |
| 12.2 | 26.57 | 24.99 | 23.50 | 22.70 | 24.28 | 24.96 | 147.0 |
| 13.0 | 25.86 | 25.35 | 22.62 | 22.44 | 25.09 | 24.70 | 147.0 |
| 13.8 | 26.28 | 25.17 | 24.04 | 22.94 | 24.70 | 25.37 | 148.5 |
| 14.6 | 26.93 | 25.12 | 23.73 | 22.87 | 24.66 | 25.19 | 148.5 |
| 15.0 | 27.06 | 25.39 | 23.65 | 22.89 | 24.82 | 25.18 | 149.0 |

TABLE D14

Figure 27:
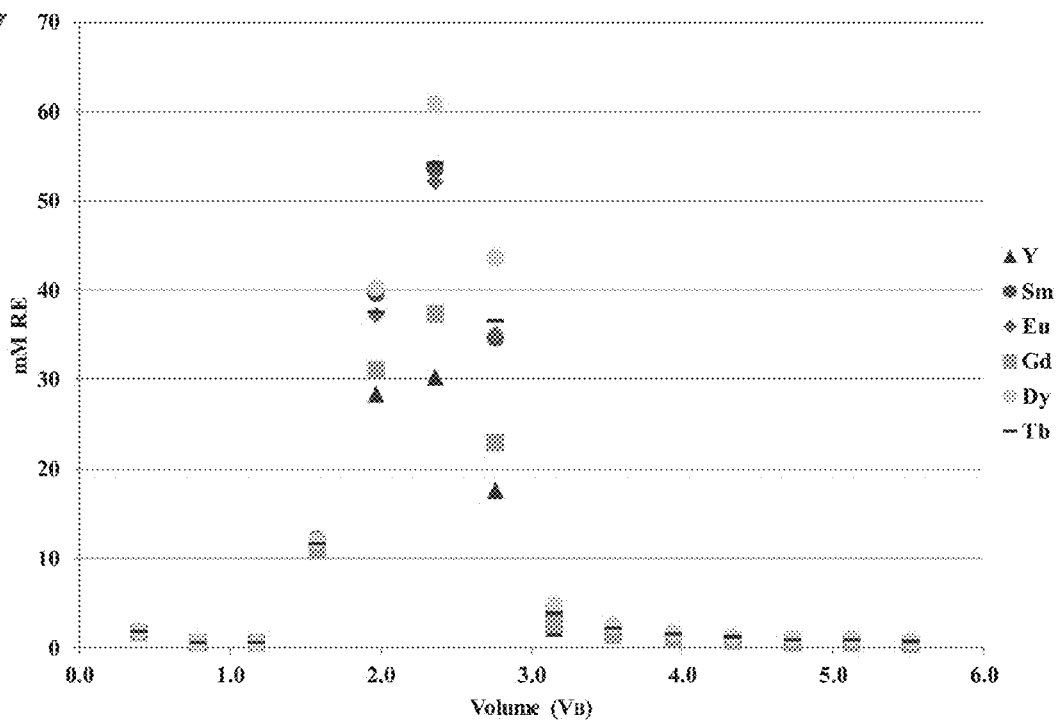
FIG. 27 depicts an Amberlite IRC748I desorption curve (column 7, 2 m hcl, 0.03 vb/min).

EXPERIMENTAL CONDITIONS AND SELECTED DATA FOR
FIG. 27—AMBERLITE IRC748I COLUMN 7 DESORPTION

| Experimental Conditions | | | |
|---|---|---|---|
| Temperature | 30° C. | Eluent | 2M HCl |
| Flow Rate | 0.03 $V_g$/min | | |
| Volumn of Resin | 150 cm³ | | |

| | | | Distribution Coefficient Data | | | |
|---|---|---|---|---|---|---|
| $V_B$ | Y | Sm | Eu | Gd | Tb | Dy | Total RE |
| | | | Concentration (mM) | | | |
| 0.4 | 1.76 | 1.72 | 1.61 | 1.52 | 1.68 | 1.71 | 10.0 |
| 0.8 | 0.52 | 0.52 | 0.48 | 0.47 | 0.50 | 0.51 | 3.0 |
| 1.2 | 0.53 | 0.50 | 0.49 | 0.47 | 0.51 | 0.51 | 3.0 |

TABLE D14-continued

EXPERIMENTAL CONDITIONS AND SELECTED DATA FOR
FIG. 27—AMBERLITE IRC748I COLUMN 7 DESORPTION

| 1.6 | 11.00 | 12.09 | 11.23 | 10.74 | 11.57 | 11.87 | 68.5 |
|---|---|---|---|---|---|---|---|
| 2.0 | 28.30 | 39.50 | 37.07 | 31.03 | 37.45 | 40.15 | 213.5 |
| 2.4 | 30.17 | 53.48 | 52.04 | 37.32 | 54.21 | 60.78 | 288.0 |
| 2.8 | 17.59 | 34.49 | 35.03 | 22.84 | 36.42 | 43.63 | 190.0 |
| 3.2 | 2.10 | 3.68 | 3.75 | 2.48 | 3.92 | 4.58 | 20.5 |
| 3.6 | 1.24 | 1.95 | 2.03 | 1.31 | 2.08 | 2.39 | 11.0 |
| 3.9 | 0.89 | 1.33 | 1.37 | 0.87 | 1.41 | 1.62 | 7.5 |
| 4.3 | 0.64 | 0.99 | 1.02 | 0.65 | 1.03 | 1.16 | 5.5 |
| 4.7 | 0.54 | 0.79 | 0.83 | 0.53 | 0.85 | 0.96 | 4.5 |
| 5.1 | 0.55 | 0.80 | 0.85 | 0.52 | 0.84 | 0.94 | 4.5 |
| 5.5 | 0.36 | 0.54 | 0.57 | 0.35 | 0.56 | 0.62 | 3.0 |

TABLE D15

Figure 28:
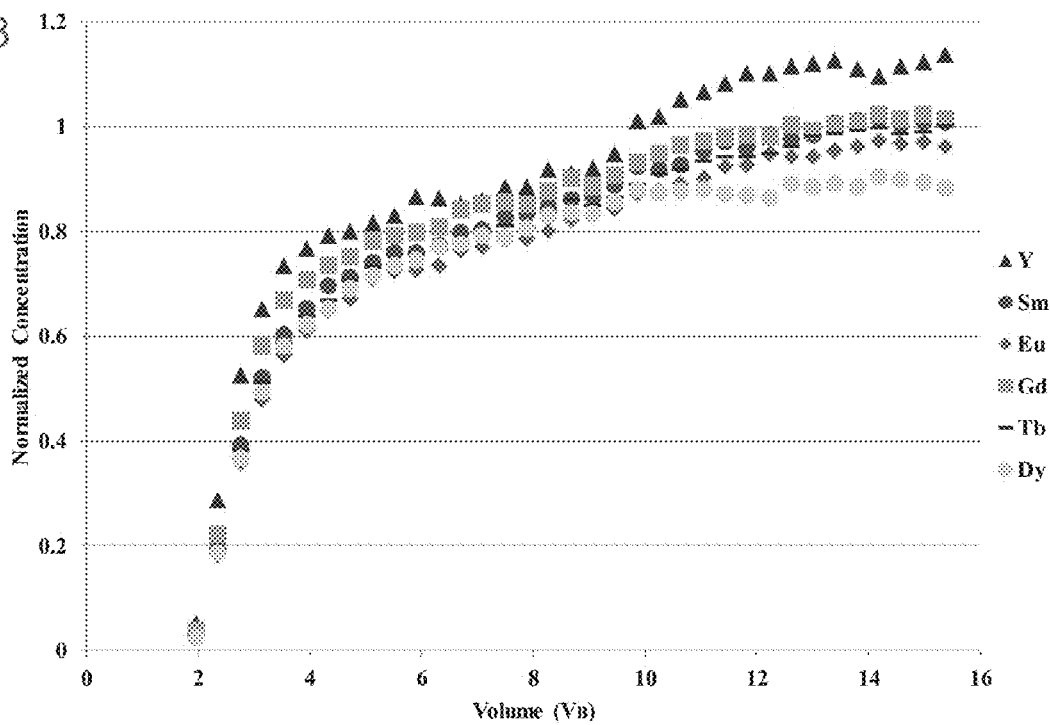
FIG. 28 depicts an Na+ Amberlite IRC748I breakthrough curve; column 8 (150 mm rare earth, 300 cm$^3$ resin, pH 2, 0.03 vb/min, 30° C.).

EXPERIMENTAL CONDITIONS AND SELECTED DATA FOR
FIG. 28—AMBERLITE IRC748I COLUMN 8 LOADING

| Experimental Conditions | | | |
|---|---|---|---|
| Temperature | 30° C. | Feed pH | 2.0 |
| Flow Rate | 0.03 $V_g$/min | | |
| Volumn of Resin | 300 cm³ | | |

| | | | Distribution Coefficient Data | | | |
|---|---|---|---|---|---|---|
| $V_B$ | Y | Sm | Eu | Gd | Tb | Dy | Total RE |
| | | | Concentration (mM) | | | |
| Feed | 25.46 | 25.44 | 25.53 | 23.33 | 25.36 | 25.38 | 150.5 |
| 2.0 | 1.28 | 0.79 | 0.74 | 0.88 | 0.71 | 0.60 | 5.0 |
| 2.8 | 13.36 | 9.93 | 9.14 | 10.17 | 9.64 | 9.25 | 61.5 |
| 3.6 | 18.68 | 15.29 | 14.38 | 15.55 | 14.88 | 14.72 | 93.5 |
| 4.3 | 20.16 | 17.69 | 16.58 | 17.08 | 16.94 | 16.55 | 105.0 |
| 5.1 | 20.75 | 18.79 | 18.09 | 18.22 | 18.56 | 18.10 | 112.5 |
| 5.9 | 22.06 | 19.31 | 18.50 | 18.61 | 19.14 | 18.88 | 116.5 |
| 6.7 | 21.65 | 20.26 | 19.53 | 19.58 | 19.80 | 19.68 | 120.5 |
| 7.5 | 22.49 | 21.02 | 19.97 | 19.94 | 20.54 | 20.03 | 124.0 |
| 8.3 | 23.32 | 21.54 | 20.38 | 20.46 | 21.27 | 21.03 | 128.0 |
| 9.1 | 23.45 | 22.04 | 21.29 | 20.60 | 21.52 | 21.09 | 130.0 |
| 9.9 | 25.72 | 23.46 | 22.25 | 21.70 | 22.56 | 22.31 | 138.0 |
| 10.7 | 26.78 | 23.53 | 22.72 | 22.49 | 23.27 | 22.21 | 141.0 |
| 11.4 | 27.54 | 24.63 | 23.55 | 22.78 | 23.91 | 22.09 | 144.5 |
| 12.2 | 28.06 | 24.99 | 24.19 | 22.86 | 24.03 | 21.87 | 146.0 |
| 13.0 | 28.54 | 25.02 | 24.05 | 23.13 | 24.87 | 22.41 | 148.0 |
| 13.8 | 28.24 | 25.69 | 24.53 | 23.48 | 25.13 | 22.43 | 149.5 |
| 14.6 | 28.38 | 25.52 | 24.70 | 23.65 | 24.99 | 22.76 | 150.0 |
| 15.4 | 28.96 | 25.64 | 24.54 | 23.65 | 25.32 | 22.40 | 150.5 |

TABLE D16

EXPERIMENTAL CONDITIONS AND SELECTED DATA FOR
FIG. 29—AMBERLITE IRC748I COLUMN 8 DESORPTION

| Experimental Conditions | | | |
|---|---|---|---|
| Temperature | 30° C. | Eluent | 2M HCl |
| Flow Rate | 0.03 $V_g$/min | | |
| Volumn of Resin | 300 cm³ | | |

| | | | Distribution Coefficient Data | | | |
|---|---|---|---|---|---|---|
| $V_B$ | Y | Sm | Eu | Gd | Tb | Dy | Total RE |
| | | | Concentration (mM) | | | |
| 1.2 | 1.02 | 0.84 | 0.79 | 0.81 | 0.81 | 0.72 | 5.0 |
| 1.4 | 11.41 | 9.82 | 9.35 | 9.38 | 9.50 | 8.54 | 58.0 |
| 1.6 | 25.61 | 26.58 | 25.09 | 24.18 | 24.48 | 22.06 | 148.0 |
| 1.8 | 30.51 | 42.36 | 40.02 | 36.22 | 39.39 | 35.50 | 224.0 |
| 2.0 | 29.38 | 52.45 | 50.59 | 39.95 | 48.26 | 45.87 | 266.5 |
| 2.2 | 27.13 | 55.48 | 53.90 | 39.01 | 55.24 | 55.24 | 286.0 |

TABLE D16-continued

EXPERIMENTAL CONDITIONS AND SELECTED DATA FOR
FIG. 29—AMBERLITE IRC748I COLUMN 8 DESORPTION

| 2.4 | 25.18 | 56.78 | 57.24 | 37.07 | 59.64 | 64.10 | 300.0 |
| 2.6 | 17.07 | 40.45 | 41.37 | 26.47 | 44.58 | 48.07 | 218.0 |
| 2.8 | 2.37 | 4.56 | 4.86 | 3.12 | 5.13 | 5.46 | 25.5 |
| 3.0 | 1.27 | 2.30 | 2.50 | 1.58 | 2.59 | 2.75 | 13.0 |
| 3.2 | 0.87 | 1.50 | 1.63 | 1.02 | 1.71 | 1.77 | 8.5 |
| 3.4 | 0.66 | 1.15 | 1.24 | 0.78 | 1.31 | 1.37 | 6.5 |
| 3.6 | 0.57 | 0.97 | 1.07 | 0.66 | 1.10 | 1.13 | 5.5 |

We claim:

1. A method of partially upgrading yttrium comprising:

obtaining a first volume of liquid mixture comprising three or more rare earth elements, including at least yttrium, gadolinium, samarium, europium and terbium, wherein yttrium is at a first % of the total amount of earth elements (mol yttrium/mol total rare earth);

applying the first volume of liquid mixture at a top of a vertical column of a resin, the resin and liquid mixture at a temperature of about 30-70° C., wherein the resin comprises a solid support having an iminodiacetic acid functional group and a volume of resin liquid;

allowing the liquid mixture to travel through the solid resin toward a bottom of the column and displace the resin liquid from the bottom of the column at the bottom as effluent liquid;

collecting a first volume of the effluent liquid from the bottom of the vertical column as the first volume of liquid mixture is applied to the column, wherein the first volume of effluent liquid is equivalent to the volume of liquid mixture applied to the column;

applying an eluent liquid at the top of the vertical column of the resin, wherein the volume of eluent liquid is greater than the first volume of liquid mixture;

collecting a second volume of effluent liquid from the bottom of the vertical column, wherein the second volume of effluent liquid is equivalent to the first volume of effluent liquid, and wherein the second volume of effluent liquid comprises yttrium at a second % of the total amount of earth elements that is increased at least about 1.5 times relative to the first %;

and thereby upgrading at least one rare earth element.

2. The method of claim 1, wherein the resin is treated before combining with the liquid mixture.

3. The method of claim 2, wherein the treatment is with an acid or base.

4. The method of claim 3, wherein the acid is 6 M HCl and the base is 2 M NaOH.

5. The method of claim 1, wherein the resin is loaded into a column prior to combining with the liquid mixture.

6. The method of claim 1, wherein the resin liquid and/or first volume of liquid mixture has a pH value of between 0.5 and 4.5.

7. The method of claim 6, wherein the pH value is 4.5.

8. The method of claim 1, wherein the solid support comprises a styrene and measures about 0.50 mm and 0.65 mm.

9. The method of claim 1, wherein the resin has a yttrium separation coefficient of greater than 2.0 for gadolinium, samarium, europium, terbium, and/or dysprosium.

* * * * *